United States Patent [19]

Tompkins et al.

[11] Patent Number: 5,014,267
[45] Date of Patent: May 7, 1991

[54] VIDEO CONFERENCING NETWORK

[75] Inventors: E. Neal Tompkins, Atlanta, Ga.; Thomas C. Arends, Eugene, Oreg.; Michael W. Barry, Duluth, Ga.

[73] Assignee: Datapoint Corporation, San Antonio, Tex.

[21] Appl. No.: 335,211

[22] Filed: Apr. 6, 1989

[51] Int. Cl.$^5$ ............................................. H04Q 11/04
[52] U.S. Cl. ..................................................... 370/62
[58] Field of Search ...................... 370/62; 379/53, 54, 379/201, 202, 206, 217, 142, 353, 76, 73, 96

[56] References Cited

U.S. PATENT DOCUMENTS

| | | |
|---|---|---|
| 2,314,471 | 3/1943 | Wright . |
| 2,510,046 | 5/1950 | Ellett et al. . |
| 2,787,669 | 4/1957 | Flan et al. . |
| 2,868,447 | 1/1959 | Wright et al. . |
| 2,974,188 | 3/1961 | Diambra . |
| 3,073,906 | 1/1963 | Lee . |
| 3,079,589 | 2/1963 | Mol . |
| 3,133,268 | 5/1964 | Avakian et al. . |
| 3,181,123 | 4/1965 | Wright et al. . |
| 3,263,027 | 7/1966 | Beltrami . |
| 3,275,746 | 9/1966 | Beltrami . |
| 3,299,210 | 1/1967 | Bandy . |
| 3,333,198 | 7/1967 | Mandell et al. . |
| 3,344,401 | 9/1967 | MacDonald et al. . |
| 3,352,966 | 11/1967 | Sawazaki et al. . |
| 3,405,457 | 10/1968 | Bitzer . |
| 3,408,749 | 11/1968 | Brudner . |
| 3,435,421 | 3/1969 | Sharples . |
| 3,441,140 | 11/1968 | Halina et al. . |
| 3,500,336 | 3/1970 | Cuccio . |
| 3,502,812 | 3/1970 | Litofsky . |
| 3,504,447 | 4/1970 | Brudner . |
| 3,519,744 | 7/1970 | Dorros . |
| 3,526,709 | 9/1970 | Butterworth et al. . |
| 3,534,161 | 10/1970 | Friesen et al. . |
| 3,567,848 | 3/1971 | Thies . |
| 3,573,377 | 4/1971 | Anderson . |
| 3,584,142 | 6/1971 | Schoeffler . |
| 3,587,053 | 6/1971 | Horzepa . |
| 3,588,834 | 6/1971 | Pedersen . |
| 3,612,767 | 10/1971 | Anderson . |
| 3,617,637 | 11/1971 | Gorman . |
| 3,618,035 | 11/1971 | Simms . |
| 3,636,265 | 1/1972 | Kikuchi et al. . |
| 3,654,708 | 4/1972 | Brudner . |
| 3,660,599 | 5/1972 | Wiedmann . |
| 3,678,207 | 7/1972 | Schon . |
| 3,684,833 | 8/1972 | Bush et al. . |
| 3,691,295 | 9/1972 | Fisk . |
| 3,692,938 | 9/1972 | Addeo . |
| 3,705,269 | 12/1972 | Audesirk et al. . |
| 3,711,648 | 1/1973 | Whitney . |
| 3,718,770 | 2/1973 | Reese . |
| 3,725,587 | 4/1973 | Klein . |
| 3,729,581 | 4/1973 | Anderson . |
| 3,757,225 | 9/1973 | Ulicki . |
| 3,766,324 | 10/1973 | Budrys et al. . |
| 3,775,563 | 11/1973 | Klein . |
| 3,781,477 | 12/1973 | Johannesson . |
| 3,798,610 | 3/1974 | Bliss et al. . |
| 3,806,649 | 4/1974 | Jinguji et al. . |
| 3,806,658 | 4/1974 | Anderson et al. . |
| 3,816,662 | 6/1974 | Shaver et al. . |
| 3,822,363 | 7/1974 | Moyer et al. . |
| 3,843,835 | 10/1974 | Mosca et al. . |
| 3,873,771 | 3/1975 | Kleinerman et al. . |
| 3,917,904 | 11/1975 | Macrander et al. . |
| 3,922,491 | 11/1975 | Bjork et al. . |
| 3,933,233 | 1/1976 | Randemere et al. . |
| 3,939,306 | 2/1976 | Mosca . |
| 3,946,158 | 3/1976 | Leclercq . |
| 3,974,329 | 8/1976 | Zenzefilis . |
| 3,974,337 | 8/1976 | Tatsuzawa . |
| 3,975,594 | 8/1976 | Guntersdorfer . |
| 4,004,084 | 1/1977 | Brown et al. . |

(List continued on next page.)

Primary Examiner—Douglas W. Olms
Assistant Examiner—Wellington Chin
Attorney, Agent, or Firm—Baker & Botts

[57] ABSTRACT

The present invention pertains in general to communication networks and, more particularly, to communication networks for interfacing between remote video terminals to provide video, audio and data paths therebetween.

8 Claims, 23 Drawing Sheets

U.S. PATENT DOCUMENTS

| | | |
|---|---|---|
| 4,015,115 | 3/1977 | Corcoran . |
| 4,028,727 | 6/1977 | Skrydstrup . |
| 4,054,908 | 10/1977 | Poirier et al. . |
| 4,071,697 | 1/1978 | Bushnell et al. . |
| 4,191,969 | 3/1980 | Briand et al. . |
| 4,232,196 | 11/1980 | Filipe . |
| 4,289,930 | 9/1981 | Connolly et al. . |
| 4,328,557 | 5/1982 | Gastinel . |
| 4,349,701 | 9/1982 | Snopko . |
| 4,356,509 | 10/1982 | Skerlos et al. . |
| 4,360,827 | 11/1982 | Braun . |
| 4,367,548 | 1/1983 | Cotten, Jr. et al. . |
| 4,386,365 | 5/1983 | Gargini . |
| 4,388,489 | 6/1983 | Wigan et al. . |
| 4,390,900 | 6/1983 | VanKampen . |
| 4,418,424 | 11/1983 | Kawamoto et al. . |
| 4,425,581 | 1/1984 | Schweppe et al. . |
| 4,425,586 | 1/1984 | Miller . |
| 4,425,642 | 1/1984 | Moses et al. . |
| 4,441,180 | 4/1984 | Schussler . |
| 4,451,701 | 5/1984 | Bendig . |
| 4,456,925 | 6/1984 | Skerlos et al. . |
| 4,479,195 | 10/1984 | Herr et al. . |
| 4,574,374 | 3/1986 | Scordo . |

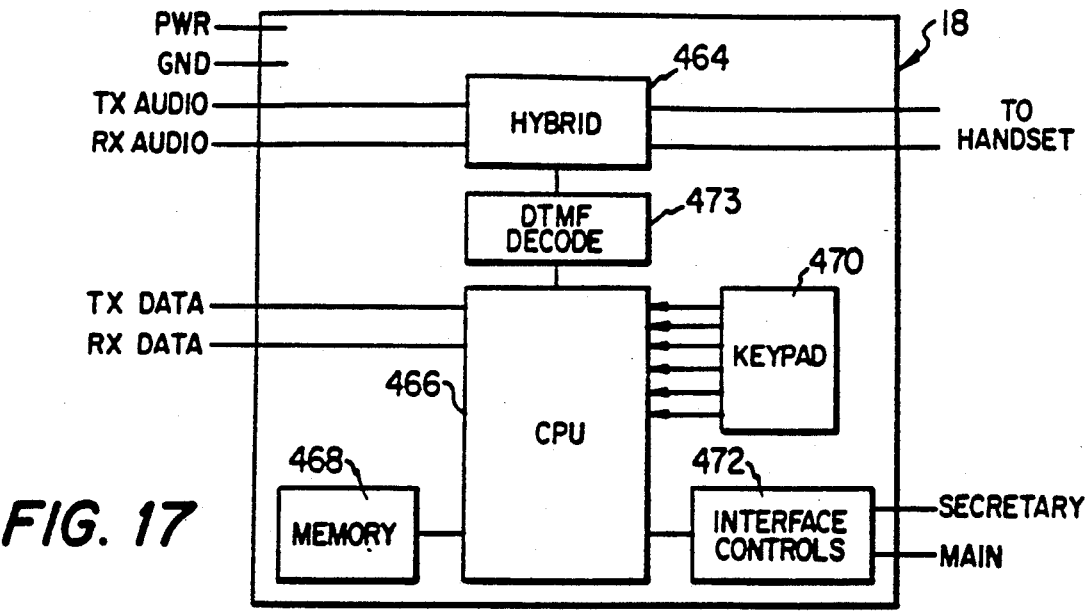
FIG. 17
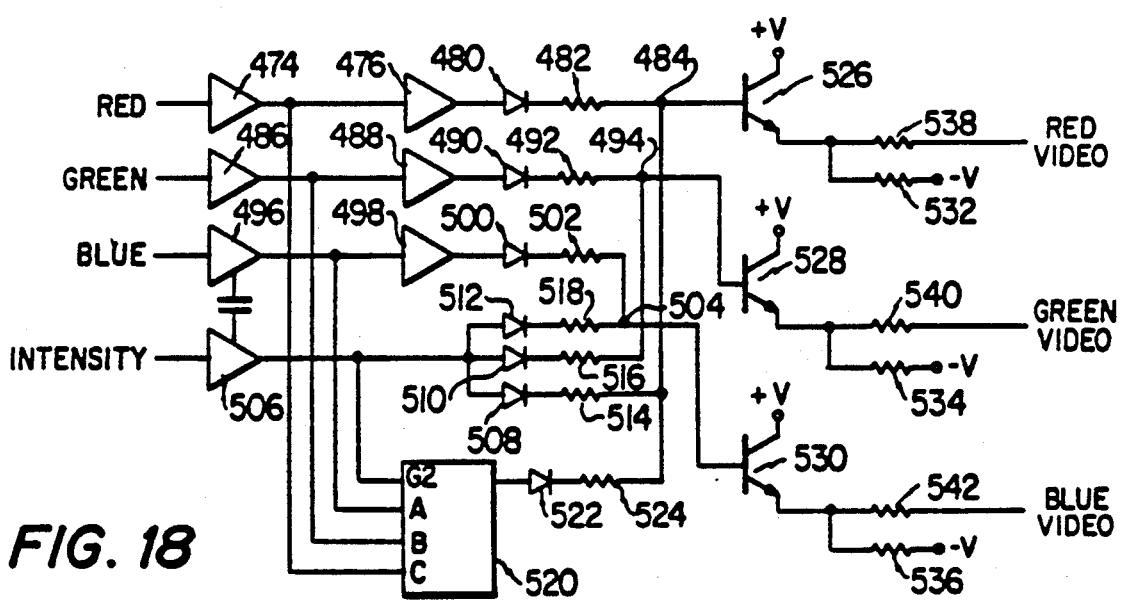
FIG. 18
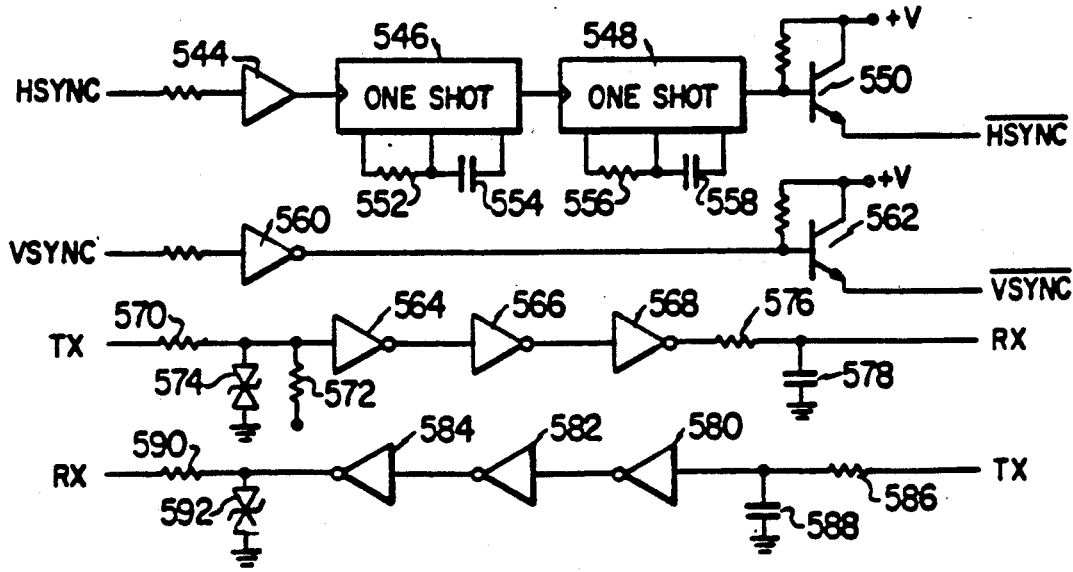

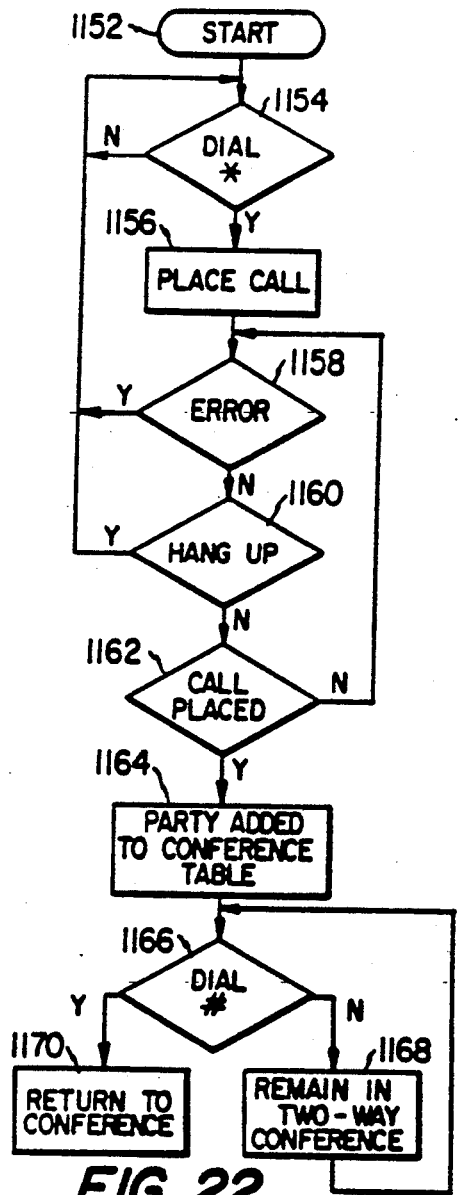
FIG. 22
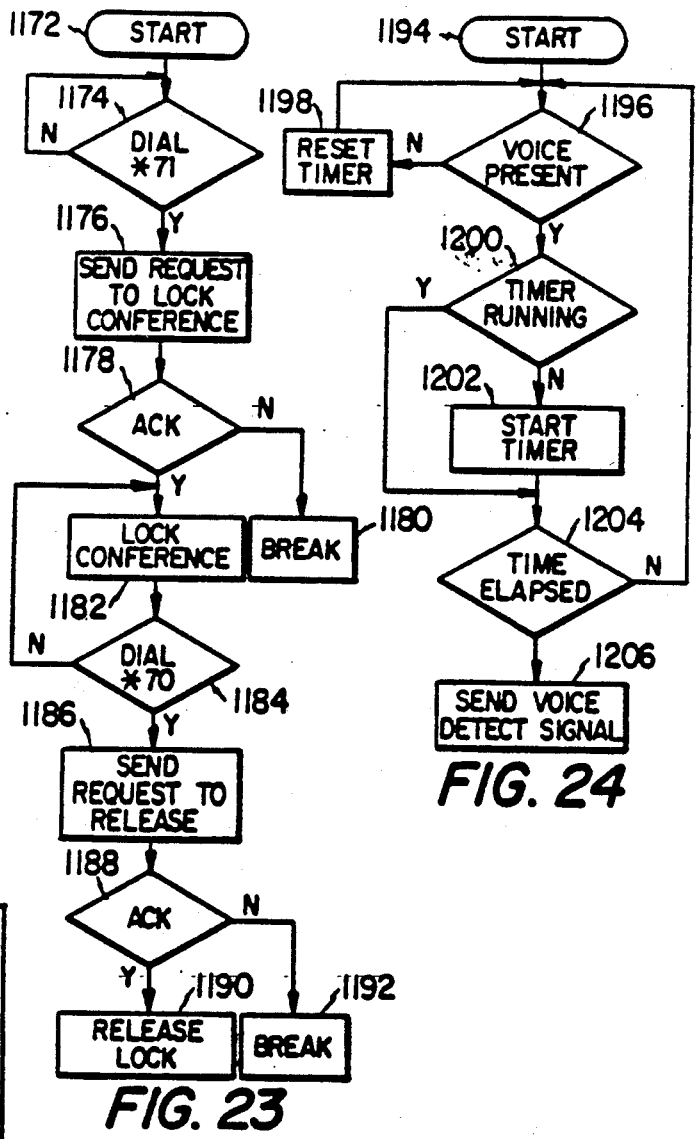
FIG. 23
FIG. 24
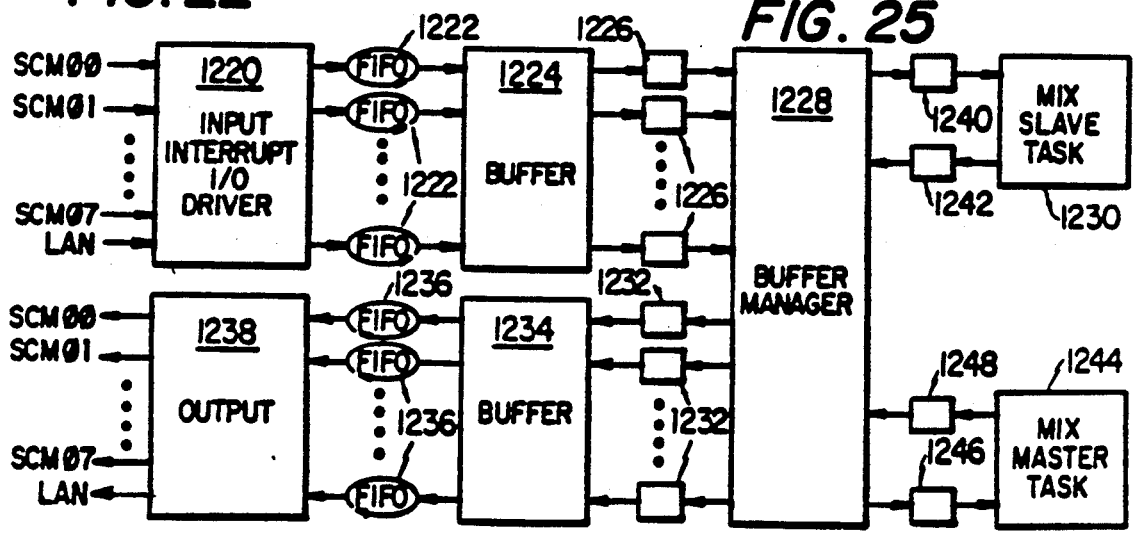
FIG. 25

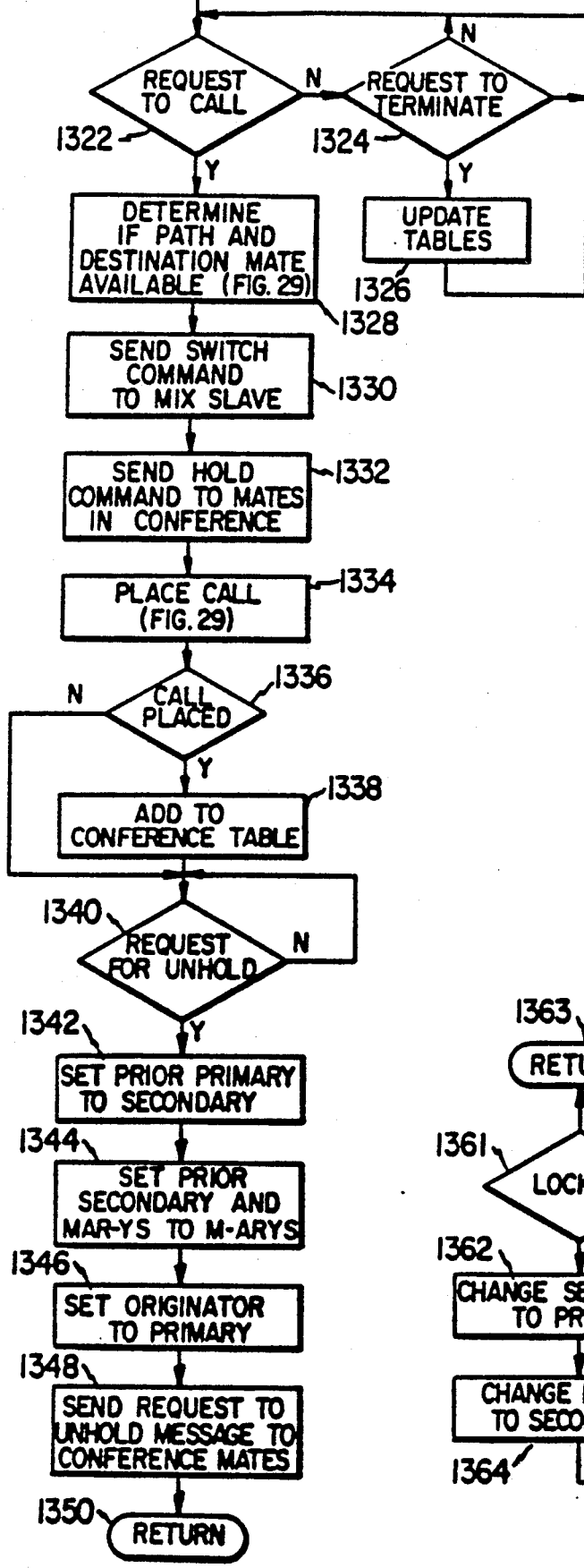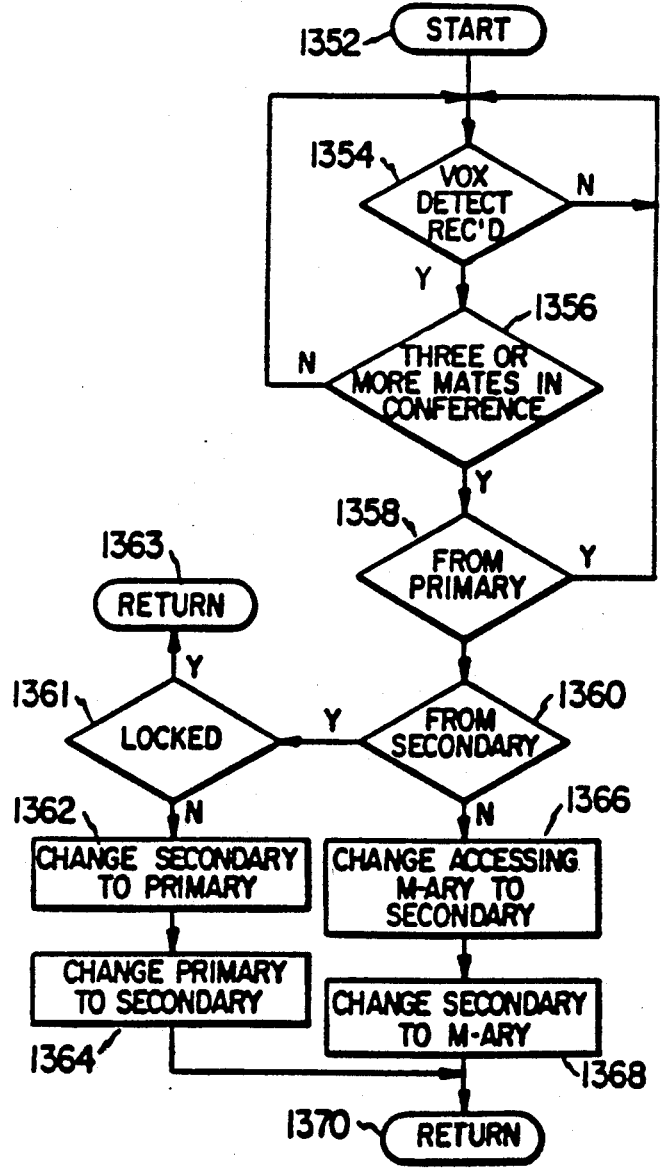

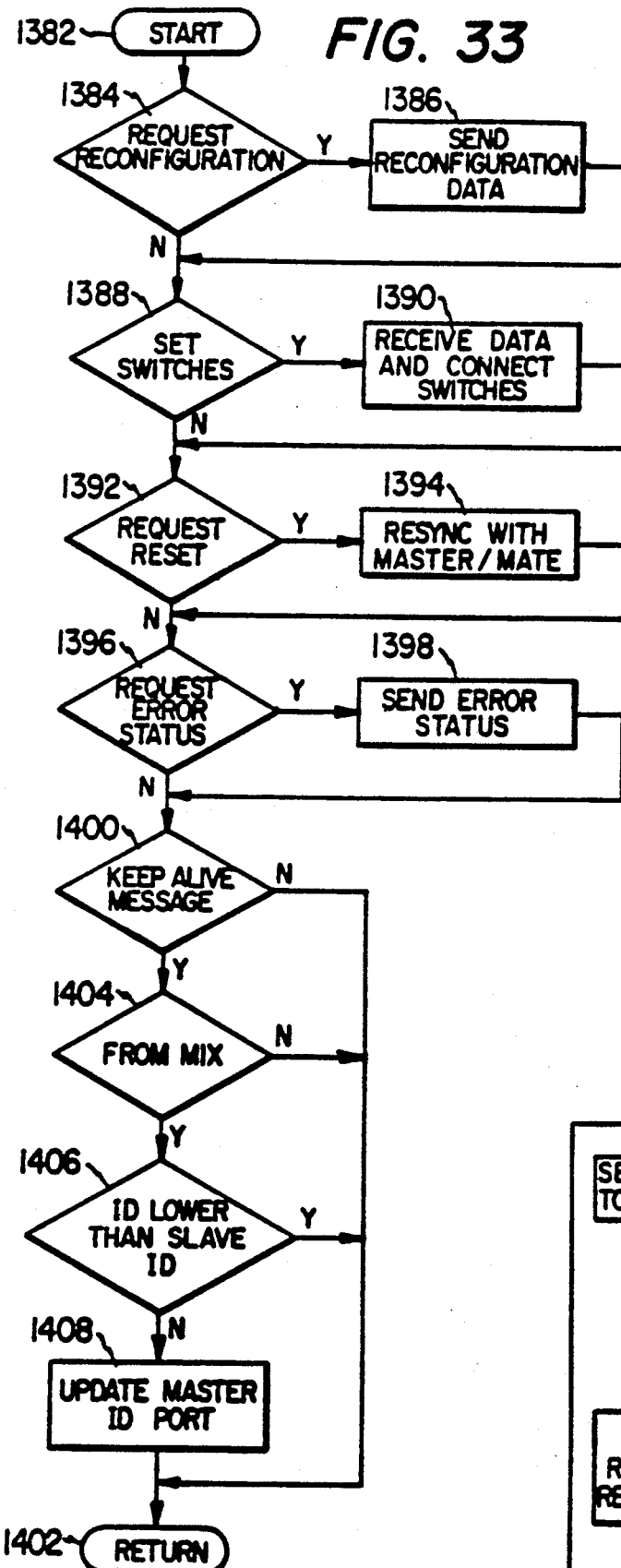
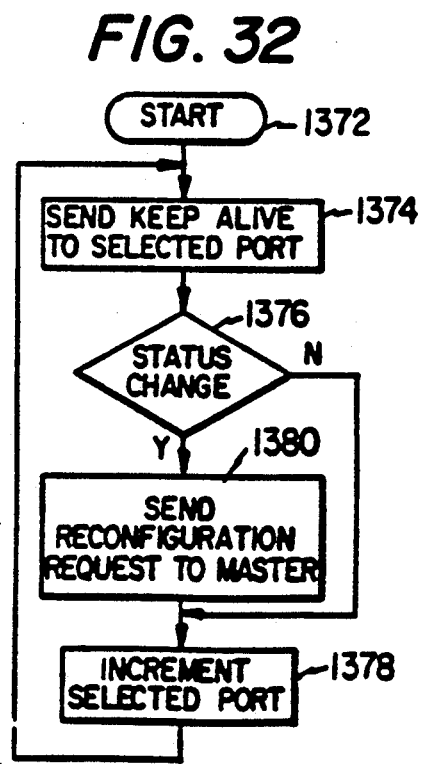

VIDEO CONFERENCING NETWORK

This is a divisional application of prior application Ser. No. 07/126,845 originally filed on Nov. 25, 1987, and entitled "Video Conferencing Network", now U.S. Pat. No. 4,847,829, issued July 11, 1989, which was a continuation application of prior application Ser. No. 06/721,281, filed Apr. 8, 1985, and entitled "Video Conferencing Network", now U.S. Pat. No. 4,710,917, issued Dec. 1, 1987, which is related to patent application Ser. No. 720,507, filed Apr. 5, 1985, now U.S. Pat. No. 4,686,698, issued Aug. 11, 1987.

TECHNICAL FIELD OF THE INVENTION

The present invention pertains in general to communication networks and, more particularly, to communication networks for interfacing between remote video terminals to provide video, audio and data paths therebetween.

CROSS REFERENCE TO RELATED APPLICATION

This application is related to patent application Ser. No. 721,083, and patent application Ser. No. 720,507.

BACKGROUND OF THE INVENTION

Video communication has evolved over the years from a simple video telephone concept to a sophisticated network for allowing multiple parties to enter into a video conference. A number of factors have prevented total success of such prior video systems, including public acceptance, excessive cost, system complexity and inadequate video quality. Although these factors can be manipulated somewhat to provide an improved system for video communications, inherent constraints such as standardized video formats and presently existing communications systems minimize the design flexibility which may be utilized in achieving a feasible system.

Video communications can be utilized for a number of applications. In some applications, only transmission of a hard copy is required, such as a picture or graphics representation. Such hard copy transmission is normally accomplished by such techniques as facsimile transmission to enable transmission of such things as x-rays, flow charts, and the like. However, for a full video conferencing system wherein individuals desire both an audible communication path and a real time visual communication path, it is necessary to provide full motion color video. The transmission of full motion color video normally requires a much greater bandwidth than the transmission of facsimile data. This is due to the fact that the video is transmitted in "real time" to allow an interactive conference.

Non real time video systems have been previously developed for teleconferencing which operate on lower bandwidth communication links. One type of non real time system is often referred to as the slow scan video system which is programmed to send new pictures at regular intervals, whether the image is changed or not. In this type of system, movement is prohibited in order to provide a relatively clear picture. An alternate to the slow scan system is the freeze-frame system which records a clear picture of the speaker and transmits this clear picture to the remote terminals in the conference at regular intervals. However, the slow scan and freeze-frame systems are not real time and the parties viewing the conference are only provided a sequence of stepped poses for the speaker.

Full motion video, heretofore the most preferred for video conferencing, is accomplished by a number of techniques. The most effective full motion video conferencing systems transmit over 1.544-megabits/s T1 telephone lines. Although the picture quality on these high bandwidth systems is high, so are the operational costs per hour for nationwide point-to-point connections.

To decrease the cost, data compressed video conferencing systems have been developed which operate on a 56-kb/s packet-switched network. Data compression is required to operate on these 56-kb/s systems, since direct digitization of standard NTSC broadcast video color signals requires approximately 80 megabits per second, far beyond the capacity of most transmission lines. To transmit full-motion color at lower bandwidths, the digital signal must be compressed by the removal of redundant information.

Two main data compression approaches have been heretofore developed, namely interframe coding and intraframe coding. In interframe coding, successive video frames are compared, pixel by pixel, and only changed values are transmitted. In intraframe coding, values for entire blocks of pixels within a frame are transmitted as mathematical transforms. These techniques are useful for transmitting at 1.544-Mb/s over T1 lines. However, transmission at 56-kb/s requires further data compression. This is accomplished by squeezing out data on luminescence, hue, resolution and scan rate. A cosine transform is utilized to compress the data efficiently, with the negative result being breakup of the picture into blocks of pixels when the transform needs time for each recalculation and the system has too many bits to send. Other prior 56-kb/s systems use a binary algorithm that degrades by losing resolution when overwhelmed by too much motion.

The disadvantages to the 56-kb/s systems and similar digital systems are that they first require the availability of a digital network and, secondly, they require a relatively expensive codec to interface between the video terminal and the network. These systems are seldom available or financially feasible for local or intrafacility use.

In prior video conferencing systems, another major disadvantage has been the initial cost of the remote terminals which are, at present, dedicated to video conferences. The longer a video terminal remains idle, the higher the cost-per-hour. Therefore, it would be desirous to integrate the remote video terminal with other functions to lower the effective cost per hour of the video conferencing feature.

In view of the above disadvantages of prior video conferencing systems, there exists a need for a full motion, color video conferencing network that overcomes the deficiencies of the present systems and is more adapted to economical local and intrafacility use.

SUMMARY OF THE INVENTION

The present invention disclosed and claimed herein comprises a video conferencing network for providing video, audio and data communication between remotely disposed video terminals. Each of the video terminals transmits and receives video, audio and data information through the network. The network includes a centrally disposed switching network for receiving audio and video information on one of a plurality of audio/video ports and selectively interconnecting this information to one or more of the remaining audio/video ports. This interconnection provides an audio and video path between two or more of the video terminals. A centralized controller is in data communication with each of the video terminals and the switching network and controls the configuration of the switching network to provide the appropriate audio and video paths in response to data received by the controller from the video terminals. A communication link is provided for interconnecting each of the video terminals with one of the audio/video ports of the switching network for audio and video transmission. The communication link also provides a data link between the video terminals and the controller.

The communication link is comprised of a single coaxial cable disposed between each of the video terminals and the switching and control networks. Audio and video is transmitted to the switching network and data is transmitted to the controller, with the audio, video and data being transmitted by frequency division multiplexing. At the video terminal end of the coaxial cable, a multiplex/demultiplex circuit is provided for distinguishing between transmitted and received audio, video and data by receiving the audio, video and data and multiplexing it onto the cable and receiving the multiplexed data from the cable and demultiplexing it for processing by the associated video terminal. A second multiplex/demultiplex circuit is provided at the other end of the coaxial cable for receiving transmitted data from the coaxial cable and demultiplexing the received audio, video and data for processing by the switching network and the controller and also multiplexing audio, video and data for transmission on the cable.

In yet another embodiment of the present invention, the controller is comprised of a Network Master, a Slave and a Data manager. The Network Master processes the data received from the video terminals and generates configuration data in response to the processing of this data. The configuration data contains information for configuring the switching network. The slave receives the configuration data and configures the switching network in response to receiving the configuration data. The data manager has a plurality of data ports for receiving data from each of the video terminals and the Network Master and routing the received data from the video terminals to the Network Master and the reconfiguration data to the slave.

The slave generates messages for transmission to the video terminals, the messages directed to the data manager for determination of which of the data ports the generated messages are to be transmitted from. After making this determination, the data manager routes the messages from the slave to each of the video terminals and the video terminals generate messages for transmission back to the slave in response to receiving the slave messages. The data manager receives these messages and routes them to the slave, the data manager making a determination that the messages are directed toward the slave. These messages have encoded therein unique IDs that correspond to the devices such as the video terminals or, the slaves or the Network Master.

The communication between the slave and the video terminals provides status information of the devices attached to the data ports. This status information is stored in an internal storage medium associated with the slave and is periodically updated in order to maintain Network status.

The Network Master also communicates with the slave by generating the status messages for transmission to the data manager and routing to the slave. These messages request status information from the slave, which information is encoded into a message and transmitted to the buffer manager for routing to the Network Master. This status information is stored in an internal storage medium associated with the Network Master. Therefore, the Network Master contains a separate status table apart from the status information stored by the slave.

BRIEF DESCRIPTION OF THE DRAWINGS

For a more complete understanding of the present invention and the advantages thereof, reference is now made to the following description taken in conjunction with the accompanying Drawings in which:

FIG. 17 illustrates a block diagram of the interface board for the remote video terminal;

FIG. 18 illustrates a schematic of the interface network for interfacing the video terminal with a local processor;

FIG. 22 illustrates a flowchart for adding a party to a video conference at the Mate remote video terminal;

FIG. 23 illustrates a flowchart for locking a conference onto the gate remote video terminal;

FIG. 24 illustrates a flowchart for generating the voice detect signal;

FIG. 25 illustrates a schematic block diagram of task scheduling in the Mix switching network;

FIG. 30 illustrates a flowchart for the master task when adding a party to the conference;

FIG. 31 illustrates a flowchart for determining the priority of parties in a conference in the master task of the network;

FIG. 32 illustrates a flowchart for the keep alive function between the master and slave tasks in the switching networks; and FIG. 33 illustrates a flowchart for communication between the master and slave tasks in the switching network.

DETAILED DESCRIPTION OF THE INVENTION

Multifunction Work Station

Figure 1:
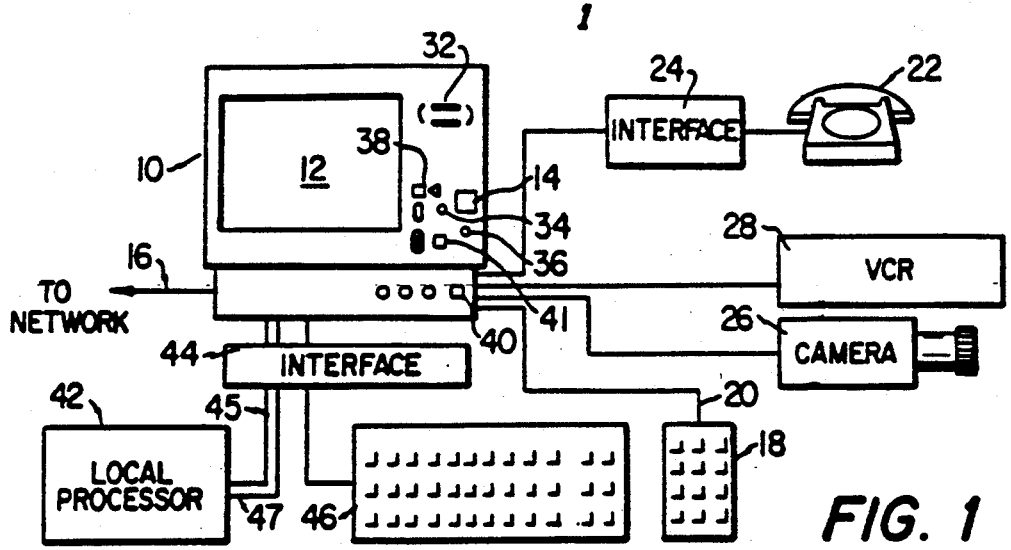
FIG. 1 illustrates a diagrammatic view of the Mate remote video terminal and work station combination.

Referring now to FIG. 1, there is illustrated a diagrammatic view of a multifunction work station. The work station includes a video terminal 10 which includes a monitor display screen 12 and a viewfinder or secondary display screen 14 for displaying video. The video terminal 10 is hereinafter referred to as "Multimedia Terminal Equipment" or "Mate". The Mate 10 is utilized for processing audio and video information and also data. The audio/video/data can be output to a video communication network through a single cable 16 to interface with other Mates at remote points. The audio/video/data is multiplexed onto the cable 16 which is hereinafter referred to as the "SCM cable". In this mode, the Mate 10 can comprise a portion of a video communication network which can be connected in a video conferencing mode, as will be described hereinbelow.

The Mate 10 interfaces with the user through a station set interface box (SSIB) 18 through a serial data link 20. The SSIB 18 includes an integral key pad for allowing the user to input data thereto in the form of key strokes. In addition, a standard telephone 22 with its associated key pad can be interfaced to the Mate 10 through an interface box 24. In the preferred embodiment, the interface box 24 may be integrated with the SSIB 18 such that the telephone 22 may plug into the SSIB 18. Hereinafter, the interface box 24 will be considered a part of the SSIB 18.

The Mate 10 includes internal thereto a video camera 32 for generating a local video signal. In addition, an external camera 26 can be interfaced to the Mate 10 as well as other auxiliary audio/video devices such as a video recorder (VCR) 28. As will be described hereinbelow, the video from either the internal video camera or the auxiliary devices 26 and 28 can be utilized to either display video on the monitor 12, the viewfinder 14 or generate a video signal for transmission on the SCM cable 16.

The internal camera 32 shoots color television images using a fixed focus wide angle lens. A microphone 34 is mounted on the front panel of the Mate 10 to allow audible interaction between the user and the Mate 10. The video displayed on the monitor 12 is controlled by a mode switch 36, the operation of which will be described hereinbelow. Indicators 38 are provided to determine when video is being transmitted over the SCM cable 16 when power is applied and also when a privacy mode is selected. The privacy mode is enabled through a privacy switch 40. A mode switch 41 is also provided that enables the user to select various functions of the Mate 10 in a sequential manner, as will b described hereinbelow.

The. Mate 10 is operable to interface with a local processor 42 through an interface circuit 44. A keyboard 46 is provided which is interfaced to the local processor 42. In the preferred embodiment, the type of local processor 42 utilized requires the keyboard 46 to interface through a separate monitor Since the Mate 10 serves as the interface monitor, the interface circuit 44 provides this interface in addition to interfacing the video and data output of the local processor 42 with the Mate 10. When the local processor 42 is utilized, the Mate 10 can operate in the Slave mode and act as the monitor for the local processor 42. In the Slave mode, the local processor 42 controls the majority of the functions of the Mate 10 wherein the Mate 10 operates as a monitor with the additional capability of maintaining contact with the network through the SCM cable 16. The interface circuit 44 is dependent upon the type of local processor 42 utilized and is designed for each specific local processor.

The local processor 42 interfaces its video and data through a line 45 to the interface box 44. The video is normally in the form of three signals constituting the red, green and blue signals that drive the monitor and also the Vertical and horizontal sync signals. The data is normally comprised of some form of standardized serial link such as an RS-232 format. This data link can contain both control data and also audio data in the form of synthesized sounds etc.

Local processors or other peripheral equipment which are utilized in conjunction with the Mate 10 to form the overall workstation normally include the capability to interface with a baseband network such as a local area network (LAN). The network of the present invention accommodates transmission of baseband information which is dedicated to operation of the local processor 42 in a separate and distinct network from that for video conferencing by allowing transmission of baseband information over the SCM cable 16. The local processor 42 is interfaced with the interface box 44 through a baseband transmission line 47 which is internally coupled to the SCM cable 16. The audio/video/data that corresponds to the video conferencing network is separate and distinct from the baseband information that is transmitted and received by the local processor 42. In this manner, only a single cable is required to accommodate both a video conferencing network and also maintain the baseband communication link, which is inherent to most localized facilities. In this manner, the video teleconferencing feature can be added to an already existing LAN system with the operation of both systems remaining separate and distinct.

Figure 2:
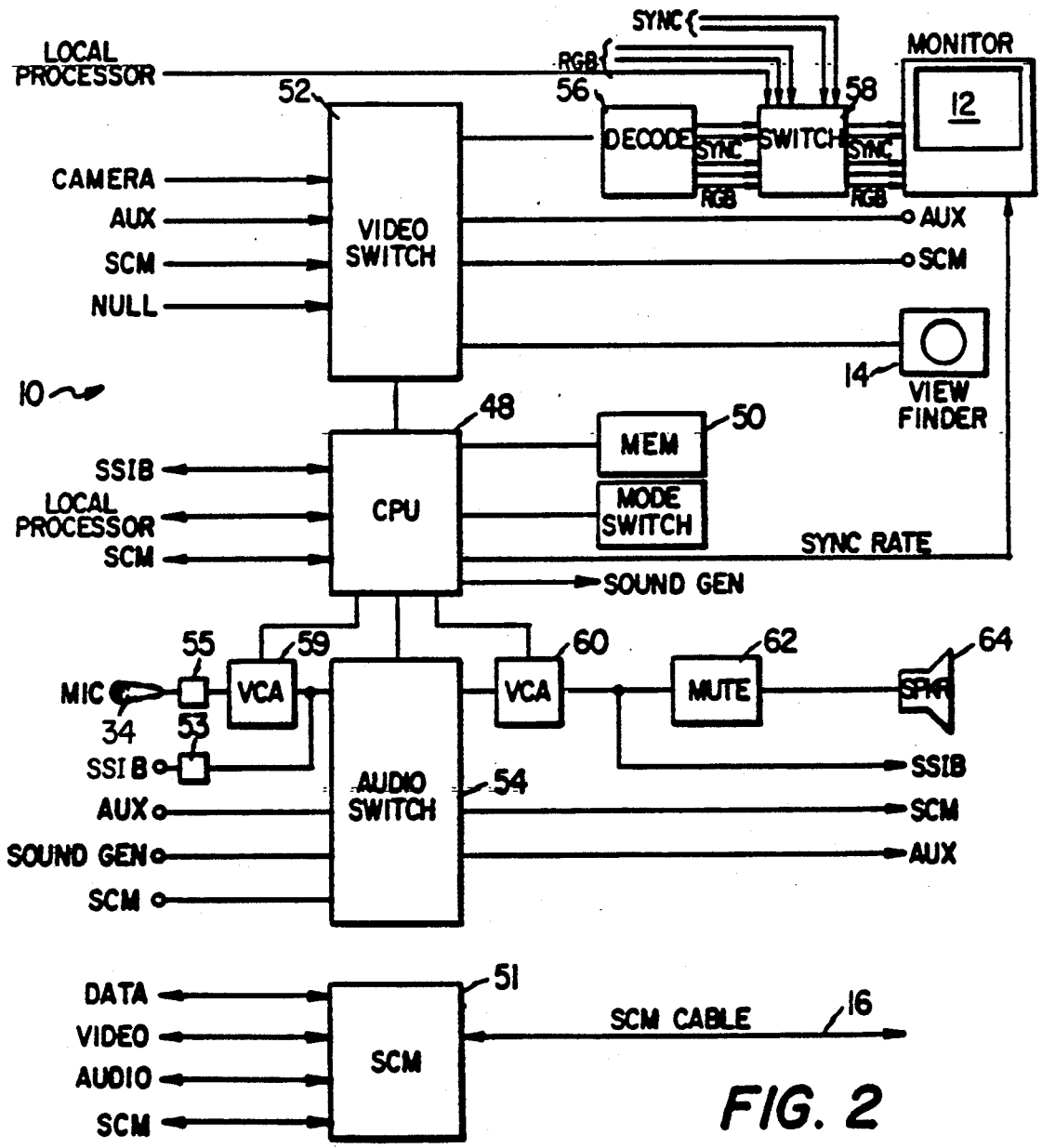
FIG. 2 illustrates a schematic block diagram of the Mate remote video terminal.

Referring now to FIG. 2, there is illustrated a schematic block diagram of the Mate 10. All of the data processing in the Mate 10 is performed by a Central Processing Unit (CPU) 48. The CPU 48 carries out video and audio switching and controls audio levels in the Mate 10. The processor has three 9600 baud serial ports that direct the actions of the Mate 10 such that the functions thereof can be directly or indirectly controlled by external devices communicating through these ports. Programs utilized by the CPU 48 are stored in a memory 50 which is comprised of both volatile and nonvolatile memory. The SCM cable 16 is connected to the input of a single cable multiplexer (SCM) 51 that both transmits and receives data on the SCM cable 16 and interfaces with a data port, a video port and an audio port. There is a separate port for data input, video input and audio input and a separate port for data output, video output and audio output. As will be described hereinbelow, the audio/video/data is modulated onto a first RF carrier for transmission from the Mate 10 and demodulated from a second RF carrier for received audio/video/data. The baseband information is input to the SCM 51 and transmitted over the SCM cable 16 at baseband for normal baseband communication.

The video signals from the VCR auxiliary device 28, the SCM 51 and the internal camera 32 are input to a video switch 52 for selective connection to the various outputs of the Mate 10. One switched output is connected to the viewfinder 14, one output is connected to the video input of the SCM and another output is provided for connection to an auxiliary circuit labeled AUX. A fourth output is provided for connection to the input of a decode circuit 56 which has its output connected through a switch 58 to the monitor 12. The decoder 56 is operable to decode the video transmitted through the video switch 52 into a format compatible with the operation of the monitor 12. In the preferred embodiment, the monitor 12 operates in a "RGB" mode requiring only information regarding the red, green and blue color levels with the addition of horizontal and vertical sync, whereas the video switch 52 is operable to process video in a format that complies with RS-170 NTSC levels. However, depending upon the decoder that is used, other types of video can be processed by the video switch 52 as long as the viewfinder 14 is compatible therewith. The switch 58 is operable to switch between the local processor 42 and the decoder 56. Although the local processor 42 could be processed by the video switch 52, the preferred embodiment utilizes the interface circuit 44 in FIG. 1 to reformat the output of the local processor 42 into the RGB format. Therefore, when video is received from the local processor 42, the switch 58 is activated to apply the appropriate video signals to the monitor 12. The video switch 52 is controlled by the CPU 48.

An audio switch 54 is provided for receiving the audio output of the SCM 51, a synthesized sound output from the CPU 48 labeled "Sound Gen", an auxiliary input labeled AUX and the audio output of the SSIB 18. The microphone 34 is also interfaced with one input of an audio switch 54 through a voltage controlled amplifier (VCA) 59. The microphone 34 is controlled by a switch 55 which can selectively disconnect the microphone 34 from the input of the VCA 59. A similar switch 53 is provided for selectively disconnecting the SSIB 18 from the circuit. The microphone 34 and the SSIB 18 are never connected at the same time.

The audio switch 54 can route any of the inputs to either an auxiliary output labeled AUX or to the audio input of the SCM 51. A third output is connected to the input of a VCA 60, the output of which is connected to the audio input of the SSIB 18. The output of the VCA 60 is also connected through a mute switch 62 to the input of a speaker 64. The VCA's 59 and 60 are controlled by the CPU 48 to determine the gain of both the input audio and the output audio. As will be described hereinbelow, there is no cross coupling of audio in the Mate 10 during a video conference. This allows the VCA's 59 and 60 to separately control the outgoing audio level and the incoming audio level, thus providing local control of the round trip audio path, as will be described in more detail hereinbelow. The various connections of the audio switch 54 are controlled by the CPU 48.

Switched Rate Monitor

The monitor 12 is an analog input, 135 volt color RGB monitor that has the capability to accept two horizontal rates. It operates at a first rate for displaying NTSC rate video, thus operating at a horizontal rate of 15.73426 Hz and a vertical rate of 59.94 Hz. This horizontal rate requires a horizontal blanking interval of 10.9 microsec. The vertical blanking interval is 1.27 msec. Although the rate matches standard NTSC, the video supplied to the monitor will be RGB plus composite sync, RS-178 levels.

The monitor 12 operates at a second rate to provide it with a capability of displaying computer generated data which could conceivably originate from a variety of different local processors or computers. These computers typically generate data with a horizontal rate from 15.73426 Hz to 31.5 Hz with a vertical rate ranging from 45 Hz to 60 Hz. However, each different computer generates data at only one horizontal and vertical frequency, thereby only requiring one additional scanning rate in addition to the standard NTSC rate. The video supplied to the monitor is the same format as for the NTSC rate video; that is, RGB at the RS-170A level (1.0 volt peak to peak) but the sync could be separate horizontal and vertical syncs.

NTSC video has a composite sync associated with it which is a composite of horizontal and vertical sync. Computers usually have separate horizontal and vertical outputs. In order to be able to display either type of data on the monitor requires the ability to use either type of sync. A signal is output from the CPU 48 to control the type of sync that the monitor 12 will receive. In one mode, composite syncs will be utilized and in the second mode, separate horizontal and vertical syncs are present on respective inputs.

There are five inputs associated with the video input of the monitor 12. Three of them are the RGB video inputs, one for red, one for green and one for blue, and the other two inputs are horizontal sync and vertical sync. When composite sync is utilized, it will be present on the vertical sync input and the horizontal sync input will be ignored.

NTSC video expects a ten percent horizontal and vertical overscan of the cathode-ray tube (CRT). Computer generated data frequently does not require overscanning of the CRT and, in fact, some data would be lost if overscanning were used. The monitor 12 provides a control line input from the CPU 48 to allow selection of an overscanning mode when necessary. The amount of overscanning is adjustable by an internal control in the monitor 12. Overscan is defined as the raster being larger than the face of the CRT.

When switching from one video source to another in the Mate 10, there will be a finite amount of time before the monitor acquires sync and the picture stabilizes. This time is minimized, but it is not reduced to zero. To make the switch appear less obtrusive to the viewer, the video is ramped down quickly before the switch is made. The video is then ramped back up after a specified amount of time has elapsed. This process usually occurs in less than 0.5 seconds. A monitor which will provide the switchable scanning frequencies is manufactured by Victor Company of Japan, Ltd., part No. SD-H2114DP.

Mate Master/Slave Operations

In operation, the Mate 10 can operate in a Master or Slave mode. It services either the local processor 42, the SSIB 18 or the network. In the Master mode, the Mate 10 is utilized to select data and audio from the SSIB 18 and execute instructions in response thereto. The SSIB 18 is utilized to allow a user to enter keystroke instructions to the Mate 10 to perform such functions as determining whether video should be displayed on a monitor 12 or the viewfinder 14 and deciding where the video is to be received, i.e., the local processor, the auxiliary port, the camera port or the network. Additionally, keystrokes can be input on the SSIB 18 to input unique identifiers (ID's) of other remote terminals or work stations for initiating a video conference therebetween, as will be described hereinbelow.

In the Slave mode, the Mate 10 accepts input only from the local processor and passes through all other communications. It serves as the audio and video input/output and communications terminal for the application program running in the local processor. In this mode, the Mate passes messages received from the SSIB 18 to the local processor and only switches in response to receiving a command from the local processor. By providing for a separate local processor, a more versatile remote terminal is provided This allows for a given remote terminal to be compatible with already existing equipment in an office.

For example, if one office utilizes a local processing system of a first type and a second office utilizes a local processing system of a second type, both processing types can be interfaced to the Mate 10 merely by selecting a different interface circuit 44. In this manner, both the type and the size of the local processor 42 can vary and still be accommodated by the Mate 10. When utilized with a separate local processor 42, the Mate 10 provides the necessary processing capability to further extend the versatility of the remote terminal, in that the Mate 10 enables the local processor 42 to interact with the network. However, only the Mate can initiate and maintain a communication link with the network. The local processor 42 cannot directly communicate with the network but, rather, it requests the Mate to communicate for it.

First Level Conferencing Network

Figure 3:
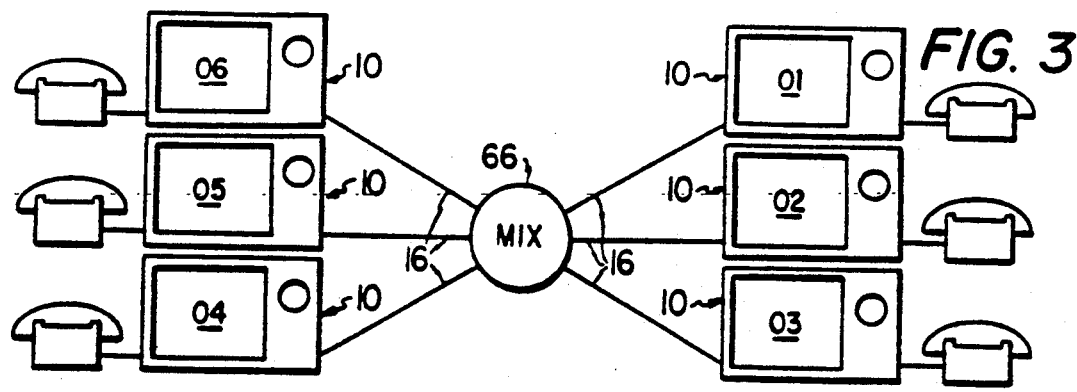
FIG. 3 illustrates a cluster of Mate video terminals connected together in the basis switching network.

Referring now to FIG. 3, there is illustrated a diagrammatic view of the simplest form of a video conferencing network which is designated as a First Level Conferencing Network. This network is comprised of a central switching network 66 referred to as a Multimedia Information Exchange (hereinafter referred to as Mix). The Mix 66 has six ports connected to six Mates 10 labeled "01", "02", "03", "04", "05" and "06" through associated SCM cables 16. However, the Mix 66 could be connected to additional Mates 10, depending upon the internal configuration thereof. In the preferred embodiment, the Mix 66 is interfaced with eight Mates 10, but for simplicity purposes, only six Mates 10 are illustrated.

Internally the Mix has a full nXn crosspoint switch for the audio and video paths of each port, n being equal to the number of Mates interfaced with the Mix. The switch is independently controllable to provide non-blocking operation. A serial data control path is associated with each Mate 10 and these are routed independently to a control processor internal to the Mix 66.

Two Way Conference

In operation of the configuration shown in FIG. 3, the Mix 66 is in communication with each of the Mates 10 on the network through a serial data path in the SCM cables 16. Upon receiving a request from any of the Mates 10 to place a call to another Mate in the network, the Mix 66 determines if that Mate is available and, if so, "places the call." The call is placed by providing a video and an audio path between the two Mates 10 in the conference. The basic procedure for placing a call is to first send a message to the Mix 66 requesting a call. This message contains information regarding both the ID of the originating Mate and also the ID of the destination Mate and is transmitted along the data path. The Mix 66 then acknowledges to the originating Mate that it has received this information and then determines if a path is available to the destination Mate. This is determined from an internal status table which the Mix 66 maintains such that the status of all Mates on the network is known.

If a line is available, the Mix 66 then determines if the destination Mate is "busy". If so, the originating Mate is notified by an appropriate message. If the destination Mate is not busy, a message is sent from the Mix 66 to the destination Mate indicating that there is an incoming call. Prior to sending of the incoming call message, the switch connection is made to provide a video and audio path between the originating and destination Mates. The destination Mate then provides a ringback signal to the originating Mate to indicate that it is locally outputting an audible ring or "chime". When the call is received by inputting an appropriate key stroke at the destination Mate, video and audio is received by the destination Mate and, simultaneously, video and audio is transmitted from the destination Mate. The video and audio path provided by the SCM cable 16 and the Mix 66 is a full duplex two-way path wherein both paths are isolated such that there is no cross-coupling between video or audio. This isolated two-way transmission is provided by a frequency division multiplexer, as will be described hereinbelow.

Multi-Way Conference

To connect more than two Mates in the system shown in FIG. 3 together in a video conference, it is necessary for an originating Mate to first place a call with a destination Mate and then place this destination Mate on hold and contact another Mate. For example, if Mate 01 wishes to set up a video conference with Mates 04 and 05, a call is first placed to destination Mate 04, as described above. A hold signal is then transmitted from the originating Mate 01 to the Mix 66. Upon receipt of this hold signal, a message is sent to destination Mate 04 to place it on hold. Destination Mate 04 then "loops" back the internal video such that the party at the destination Mate 04 receives his own video transmission. A call is then placed to destination Mate 05 and a two-way conference initiated. This two-way conference between originating Mate 01 and destination Mate 05 is maintained and destination Mate 04 maintained on hold until a message is sent from the originating Mate 01 to the Mix 66 to bring all the parties back into the conference. A conference table is maintained internal to the Mix 66 to determine which Mates are a part of the conference.

During a video conference, each Mate receives audio from all of the other Mates in the conference, this audio being summed at the Mix 66. Each Mate's own audio is not summed to prevent feedback. However, only one video transmission can be made from the Mix 66 to any of the Mates. The video that is displayed on any of the monitors 12 of the Mates 10 in the conference is determined by a priority system, which will be described in detail hereinbelow.

Mix Switching Network

Figure 4A:
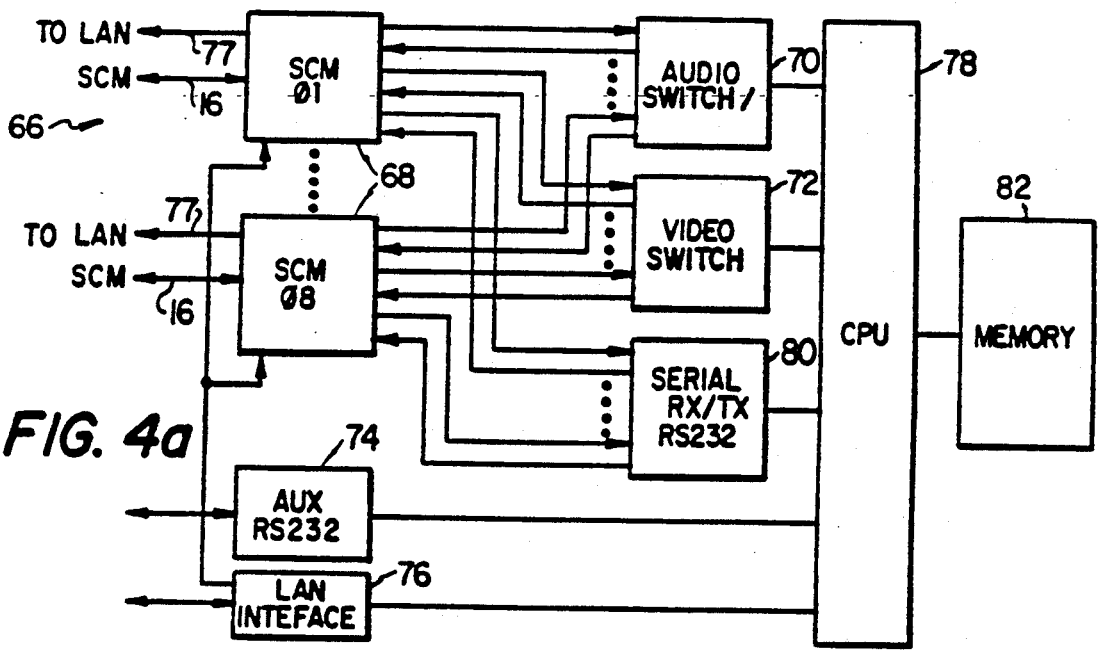
FIG. 4a illustrates a schematic block diagram of the Mix switching network.

Referring now to FIG. 4a, there is illustrated a block diagram of the Mix 66 of FIG. 3. Each of the input ports are connected to one of the SCM cables 16 and are interfaced to a separate SCM module 68 labeled "SCM 01" through "SCM 08", corresponding to Mates with ID numbers 01 through 08. Since, as described above, the preferred number of Mates associated with each Mix is eight, the Mix of FIG. 4 is illustrated as being interfaced with eight SCM's 68. The SCM's 68 are similar to the SCM 51 of FIG. 1 in that they strip off the baseband information and demodulate the received audio/video/data and, for transmission, modulate audio/video/data and sum this with baseband information.

Each of the SCM's 68 provides a data output and a data input, a video output and a video input, an audio output and an audio input and a baseband bidirectional input. The audio inputs and outputs of the SCM's 68 are connected to the inputs of an audio switch/summer 70. The audio switch/summer 70 receives eight inputs and provides eight outputs, all of which can be selectively summed with each other. The video outputs and inputs of the SCM 68 are interfaced with a video switch 72 which is controlled to selectively switch video between the SCM's 68. However, the video switch 72 does not sum the videos such that only one of the video inputs to the video switch 72 can be connected to any one of the video outputs at any given time. However, one video input can be connected to all eight outputs. As a practical consideration, video would only be output to a maximum of seven outputs since the originator of the video would not require its video to be fed back.

The Mix 66 has a bidirectional serial data port and an auxiliary serial receiver/transmitter circuit 74 (AUX) for receiving and transmitting the serial data. This is utilized to interface with a serial format such as RS-232 in processing data. In addition, a local area network (LAN) data interface circuit 76 is provided for receiving baseband data from and transmitting data to a LAN network. The received baseband data is processed by the LAN circuit 76 and placed in a format for internal use by the Mix 66 whereas data transmitted from the LAN data interface 76 is converted to baseband data. Although the LAN data interface 76 is illustrated as being connected to a baseband LAN, it should be understood that any type of LAN format can be accommodated. The LAN circuit 76 is utilized only to provide a data interface between a central processing unit and the Mix for control data. Therefore, the LAN circuit 76 forms a ninth port. However, this ninth port is only a data port and does not have video or audio associated therewith. From the standpoint of data communications, the LAN circuit 76 operates similar to the SCM 68 in that it terminates one of the ports of the Mix 66 and allows data communication between two of the devices.

Each of the SCM's 68 has a baseband port connected to a common node 77. This common node 77 interconnects all the baseband ports such that baseband data transmitted on one SCM cable 16 is interfaced with all of the other baseband information on the other SCM cables. As described above, the baseband data transmitted on any of the SCM cables 16 does not carry control data for the Mix or for the video conferencing network. Rather, the baseband link provided through the SCM cable 16 merely facilitates integration of the video conferencing system with an already existing baseband system. However, this is to be distinguished from the baseband interface provided by the LAN circuit 76. This is a dedicated data path for control data generated for the video conferencing system only.

A CPU 78 is provided for controlling the operation of the Mix 66. Both the switching and summing operations in the audio switch/summer 70 and the switching operation of the video switch 72 are controlled by the CPU 78. In addition, the CPU 78 interfaces with data from the auxiliary serial circuit 74 and the LAN interface circuit 76. To provide data for the serial data path to the Mate 10, a serial receiver/transmitter 80 is provided which is connected to the data inputs and outputs of the SCMs 68. Memory 82 is provided for interfacing with the CPU 78 to provide a storage base for the operational software of the Mix 66.

First Level Network Data Flow

In operation of the system shown in FIG. 4a, each of the Mates 10 that are attached to Mix 66 have a direct serial data path with the Mix 66. The Mix 66 provides two functions. First, it operates as a switch to control both the audio switch 70 and the video switch 72 to provide an audio and video path for conferencing between Mates 10 in the system. Secondly, it provides control for the conferencing network to store the status of all of the Mates 10 in the system and also the status of all conferences. To maintain this status, the Mix 66 continually polls the status of all Mates on its various ports. This provides the Mix 66 with information regarding the ID of the Mate and the port to which it is attached and also the status thereof such as "busy", etc. There is no data path between two Mates in the system but, rather, all data flow must go directly to the Mix and be processed thereby. For example, if the Mate 10 is placing a call, it must request the Mix 66 to check the lines to determine if there is a path available and also to determine if the destination Mate is available. If available, the Mix 66 then sends a message out to the destination Mate to initiate the generation of an audio and video path between the two Mates. Even during a conference, the Mix 66 continually polls the Mates in the conference to determine their status with no data flow occurring between any of the Mates.

Figure 4B:
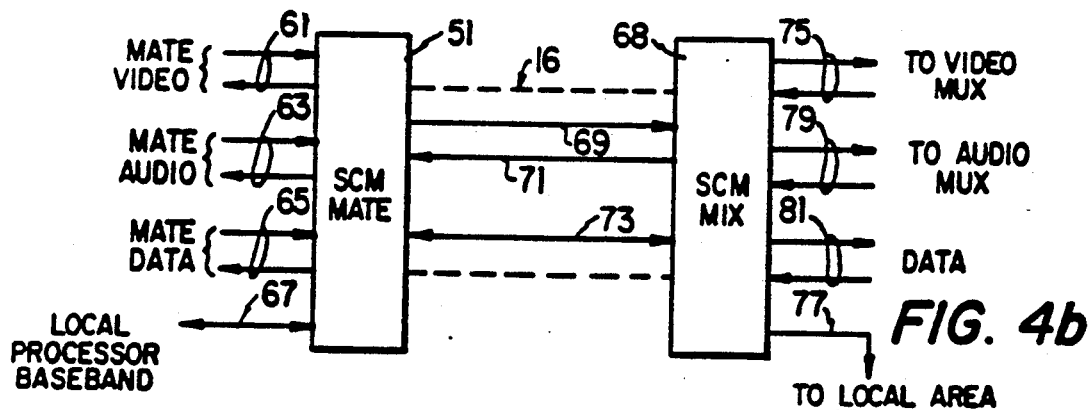
FIG. 4b illustrates the communication paths for the audio/video/data video conferencing information and parallel baseband information.

Referring now to FIG. 4b, there is illustrated a diagram for the transmission path of both the audio/video/data information for the video conferencing mode and also baseband data for communication between the local processor baseband output and the separate Local Area Network (LAN) through the SCM cable 16, wherein like numerals refer to like parts in the various Figures. The SCM 51 in the Mate 10 is illustrated as having two video information lines 61, one for inputting video into the SCM 51 and one for receiving video from the SCM 51. Two audio input lines 63 are illustrated for inputting audio into the SCM 51 and receiving audio therefrom. Two serial data lines 65 are illustrated for inputting serial data into the SCM 51 and receiving data therefrom. In addition, a baseband input 67 is illustrated that is received from the local processor 42. As described above with reference to FIG. 1, this input is received from the local processor 42 on the line 47 and this would normally constitute a direct interface between the local processor 42 and a separate LAN in the absence of any video conferencing network.

The SCM 51 is connected to the SCM 68 in the Mix 66 through the SCM cable 16. The SCMs 51 and 68 provide three separate and distinct paths for data transmission. A first path 69 is provided for transmission of audio, video and data from the Mate 10 to the Mix 66 for video conferencing purposes A data transmission path 71 is provided for transmission of audio, video and data from the Mix 66 to the Mate 10, also for video conferencing purposes. A third separate and distinct path 73 is provided for transmission of baseband data that is expressly for the purpose of interfacing with the separate LAN operating at baseband. There is no cross coupling between the data transmitted over the path 73 which is a baseband data path and the audio/video/data information on the paths 69 and 71. In a similar manner, the paths 69 and 71 are also isolated from each other. This isolation between lines 69 and 71 provides the full duplex operation of the video conferencing network of the present invention.

The SCM 68 in the Mix 66 has two lines 75 that are input to the video switch 72, one for outputting video information from the SCM 68 and one for inputting video information thereto. Two lines 79 are provided for interfacing with the audio switch 70, one for receiving audio information from the SCM 68 and one for inputting audio information thereto. Two data lines 81 are provided for interfacing with the serial receiver/transmitter 80, one for receiving data from the SCM 68 and one for transmitting data thereto. The lines 75, 79 and 81 are all internal to the Mix 66 and interface with the various internal components thereof However, the SCM 68 also filters off the baseband information that was contained on the data path 73 and outputs it on the line 77 to the separate LAN. Therefore, the Mix of FIG. 4a with eight SCMs 68 would have eight lines 77 coming from the Mix 66 to the separate LAN. The SCM cable 16 merely provides a shared data path up to the Mix 66. However, at the Mix 66, the baseband information to the LAN is filtered off and output to a separate cable for connection to the LAN. When interconnecting a number of cables, it is necessary to provide impedance matching and isolation thereto. Therefore, all of the local processors 42 interfaced with the various Mates 10 can utilize the SCM cable 16 to transmit baseband information to the LAN and carry on data communications apart from the video conferencing network. It is important to note that the operation of this LAN is separate and distinct from the video conferencing network and the data transmitted over the path 73 is utilized as a data path from the LAN to the local processor and not to the Mix 66. The LAN interface from the LAN to the video conferencing network must occur through the LAN data interface 76, as will be described hereinbelow with reference to control of the Mix 66 by a centrally located processor on a LAN.

Figure 5:
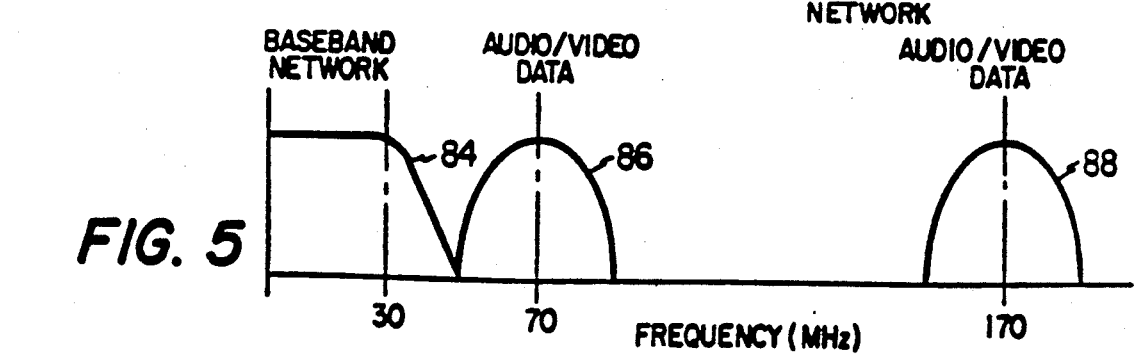
FIG. 5 illustrates a diagram of the transmission spectrum for the single cable multiplexing format utilized for communication between the Mix switching network and the Mate video terminals.

Referring now to FIG. 5, there is illustrated a graph of the frequency spectrum allocation for the SCM cable 16. The lower portion of the spectrum is denoted by reference numeral 84 and is allocated to transmission of the baseband data and is primarily dedicated to use by the local area network apart from the video conferencing network. The audio/video/data for the video conferencing network occupies two portions of the spectrum, a portion 86 and a portion 88 The spectrum portions 86 and 88 are wideband FM modulated signals with the portion 86 centered around 70 Mhz and the portion 88 centered around 170 Mhz. The audio/video/data information contained in the spectral portion 86 is utilized for transmission in only one direction on the SCM cable 16 and the audio/video/data information contained in the spectral section 88 is utilized for transmission in the opposite direction on the SCM cable 16.

In this manner, frequency division multiplexing is utilized to provide two distinct data paths in a single cable which are isolated from each other. Therefore, the audio/video/data passing from the Mate to the associated Mix is isolated from the audio/video/data transmitted from the Mix to the Mate. Additionally, as described above, baseband data can be transmitted on the same cable to allow the network to accommodate a separate LAN. The baseband is separated off at the Mate and output to the local processor or other LAN device. It is not necessary for the LAN device at the Mates location to interface with the Mate other than the baseband interconnect.

Single Cable Multiplexer

Figure 6:
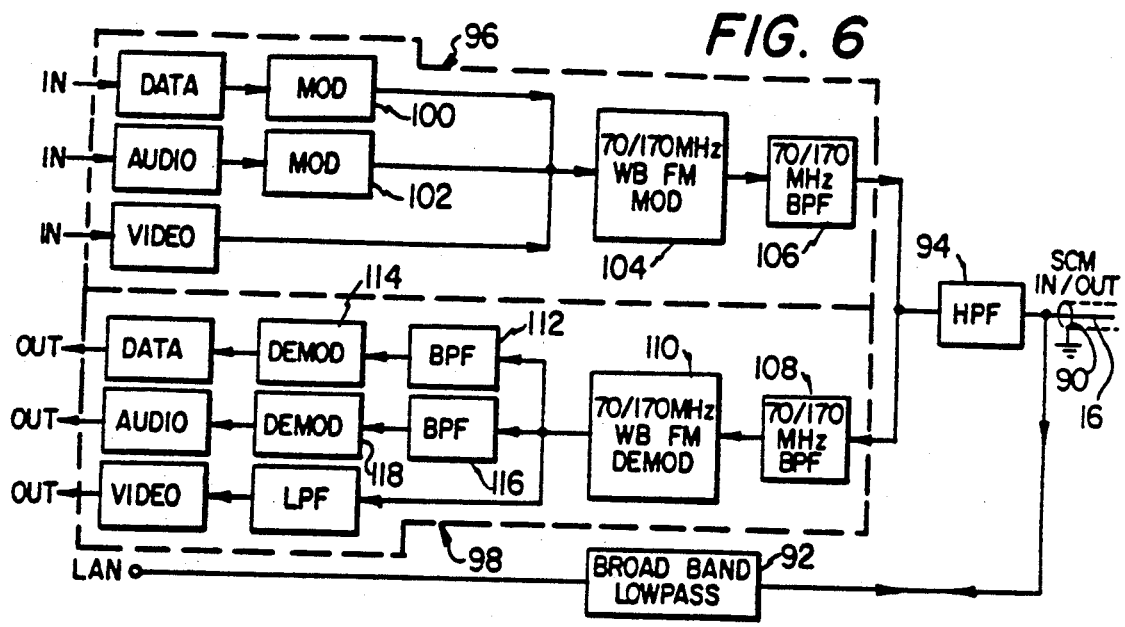
FIG. 6 illustrates a schematic block diagram of the single cable multiplexer.

Referring now to FIG. 6, there is illustrated a block diagram of a single cable multiplexer circuit 68 from the Mix 66 and the single cable multiplexer circuit 51 in the Mate 10. The SCM cable 16, as described above, is a single coaxial cable which is connected to an input jack 90 on either the Mix 66 or the Mate 10. The jack 90 is connected directly to one port of a broadband low-pass filter 92, the other port of which is interfaced with a LAN device. The broadband low-pass filter 92 isolates the wideband frequency modulated signal from the LAN device. The jack 90 is also input to one port of a high-pass filter 94. The other port of the high-pass filter 94 is interfaced with a modulation circuit 96 and a demodulation circuit 98. The modulation circuit 96 receives video, audio and data on separate ports thereof and modulates either a 70 mHz or a 170 mHz carrier frequency with this data. Depending upon whether the SCM circuit is associated with either the Mate or the Mix, the modulated carrier will vary. For example, if the modulated carrier for transmitted data is 70 mHz in the Mix, the transmitted data on the Mate will be at 170 mHz to maintain isolation between the two paths.

The demodulator 98 receives the output of the high-pass filter 94 and demodulates the audio and video data. The demodulator circuit 98 operates at the opposite frequency from the modulator Therefore, if the modulation circuit 96 is operating at 70 mHz, demodulator circuit 98 is operating at 170 mHz. The demodulator circuit 98 provides a data output, an audio output and a video output on separate lines.

The modulation circuit 96 receives the data and modulates it with a modulator 100 onto a subcarrier of 9.0 mHz and also receives the audio and modulates it onto a subcarrier of 10.7 mHz with a modulator 102. The modulated subcarriers output by the modulators 100 and 102 and the video are then summed and input to a 70/170 mHz wideband FM modulator 104. The output of the modulator 104 is input to a 70/170 mHz bandpass filter 106 which has a bandwidth sufficient to pass the spectral information that is output by the modulator 104. This information is passed through the high-pass filter 94 to the jack 90 for input to the SCM cable 16.

The demodulation circuit 98 processes the output of high-pass filter 94 through a bandpass filter 108 to reject the spectral output of the modulation circuit 96. The bandpass filter 108 is centered around either 170 Hz or 70 mHz, the opposite frequency from that of the modulation circuit 96. The output of the bandpass filter 108 is input to a 170/70 mHz wideband FM demodulator 110 which provides demodulated video and the two modulated subcarriers for audio and data. The output of the demodulator 110 is input to a bandpass filter 112 that is centered about the data subcarrier of 9.0 mHz and then demodulated by a demodulation circuit 114 to output data. A bandpass filter 116 is centered about the audio subcarrier of 10.7 mHz and the signal output therefrom is demodulated by a demodulator circuit 118 to provide the audio output.

The modulators 100 and 102 are FM modulators and are fabricated from devices such as the MC1376 manufactured by Motorola Corp However, any type of modulator can be utilized. The summing circuit for adding the modulated audio, modulated data and video can be an operational amplifier of the type HA-5195 manufactured by Harris Semiconductors, Inc. The demodulation circuit 110 utilizes phase lock loop technology for wideband FM demodulation. The demodulator 114 for demodulating data is merely a quadrature detector whereas the demodulator 118 for demodulating the audio is of the type MC3356 manufactured by Motorola Corp. Although not shown, an auto symmetry correction circuit is provided for restoring the baseline for the data. A similar type circuit is illustrated in U.S. Pat. No. 4,309,763, issued to Passmore, et. al. on Jan. 5, 1982.

Second Level Video Conferencing Network

Figure 7:
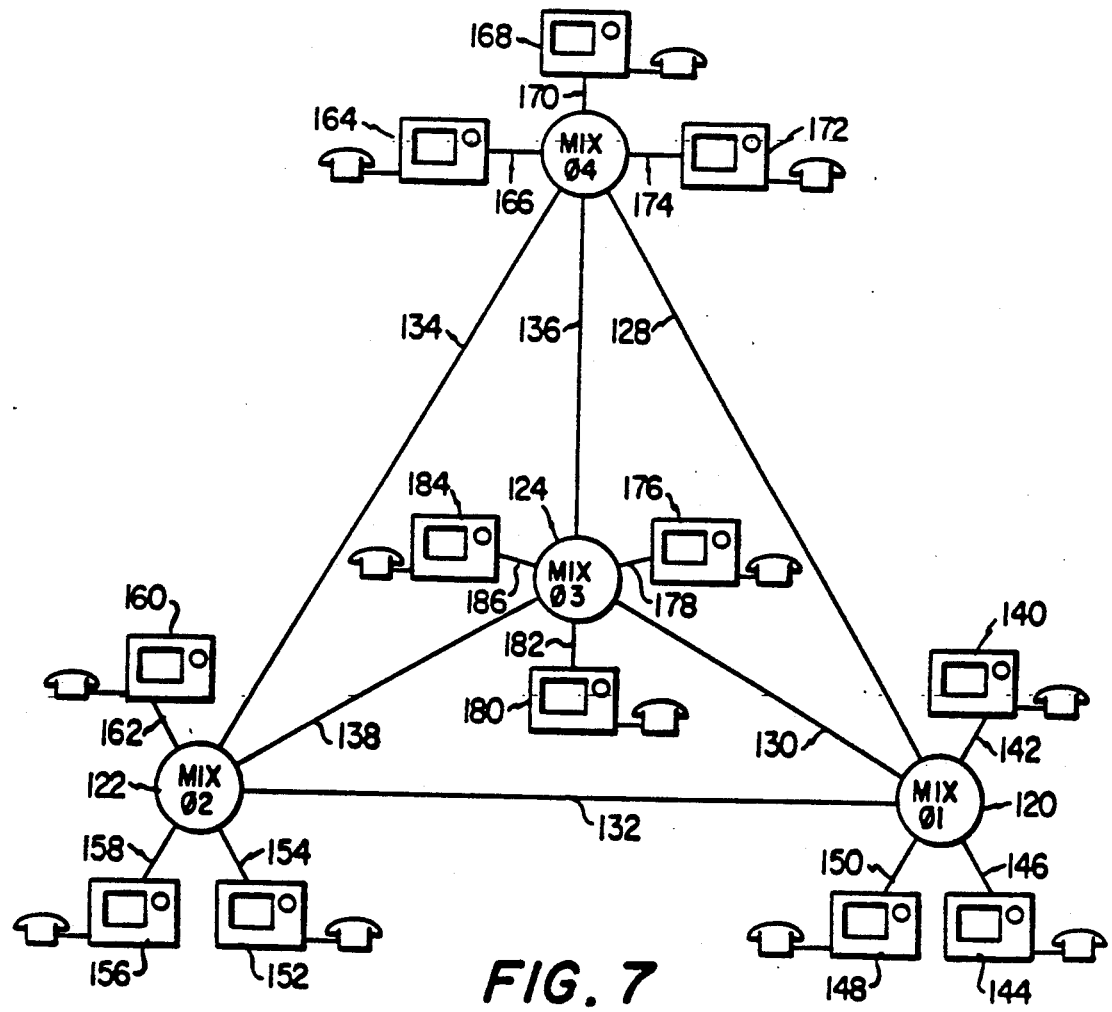
FIG. 7 illustrates a network of Mate video terminal clusters.

Referring now to FIG. 7, there is illustrated a video conferencing network having a plurality of Mix networks contained therein. The network is comprised of a Mix 120 labeled "01", a Mix 122 labeled "02", a Mix 124 labeled "03" and a Mix 126 labeled "0". The labels "01" through "04" are defined as the ID's of the Mixes in the network. It is necessary for each Mix to have an ID to determine priority of network control, as will be described hereinbelow. In the single Mix network described above with reference to FIG. 3 and the First Level Video Conferencing Network, the single Mix controls all network functions, audio/video interconnects, etc. By comparison, the Second Level Network distributes the control in a predetermined manner.

The Mixes 120-126 for simplicity purposes are illustrated as having six ports. The Mix 120 interfaces with the Mix 126 through an SCM cable 128, with the Mix 124 through an SMM cable 130 and with the Mix 122 through an SCM cable 132. The Mix 126 interfaces with the Mix 122 through an SCM cable 134 and with the Mix 124 through an SCM cable 136. The Mix 124 interfaces with the Mix 122 through an SCM cable 138. It is necessary for each Mix to directly interface with every other Mix in the network without having to pass through another Mix. Therefore, depending upon the number of ports in a given Mix, the number of Mixes in a given network is limited since each additional Mix occupies an additional port on every other Mix in the network, thereby reducing the number of remote terminals that can be interfaced with each Mix.

The Mix 120 has a Mate 140 interfaced thereto through an SCM cable 142, a Mate 144 interfaced therewith through an SCM cable 146 and a Mate 148 interfaced therewith through an SCM cable 150. The Mix 122 has a Mate 152 interfaced therewith through an SCM cable 154, a Mate 156 interfaced therewith through an SCM cable 158 and a Mate 160 interfaced therewith through an SCM cable 162. The Mix 126 has a Mate 164 interfaced therewith through an SCM cable 166, a Mate 168 interfaced therewith through an SCM cable 170 and a Mate 172 interfaced therewith through an SCM cable 174. The Mix 124 has a Mate 176 interfaced therewith through an SCM cable 178, a Mate 180 interfaced therewith through an SCM cable 182 and a Mate 184 interfaced therewith through an SCM cable 186.

In operation, each of the Mixes 120-126 has a Master mode and a Slave mode for transferring data through the network. In the Slave mode, the mix services its own ports to determine the status of all of the devices on each of the ports. This information is maintained in tables and defines the status of each of the Mates interfaced therewith and also the status of each of the Mixes interfaced therewith. For example, Mix 122 knows that there are three Mates 152, 156 and 160 attached to specific ports and the ID's of each. In addition, it knows that Mixes 120, 124 and 126 are attached to specific ports and the ID's of each. Mix 122 constantly polls the devices attached to its ports to determine type of device, ID and status.

In the Slave mode, one Mix in the network does not directly interface with a Mate on another Mix in the network. In the Master mode, which operates in conjunction with the Slave mode, the Mix controls the switching operation of all the Mixes in the network, services all of the network requests from the Mate and the other Mixes and also controls multiple Mate video conferences. However, only one Mix in the network can operate in the Master mode. Of the Mixes 120-126 in the network of FIG. 7, only the Mix 120 with the ID "01" is allowed to operate in the Master mode. This is a predefined priority wherein the Mix with the lowest ID in the network operates in the Master mode. If the Mix 120 were turned off and removed from the network, the Mix 122 with the ID "02" would then be reconfigured in the Master mode. In this situation, the networrk would have to "reconfigure" to update the internal tables in the Master Mode of the Mix 122. The Mix that is operating in the Master mode is termed the "Network Master".

To process a simple call in the network, one of the Mates, for example Mate 140, places a request to call on the 9600 baud serial data path to the Network Master which, in this configuration, resides in Mix 120. The Network Master then looks up in its table to determine both if there is a path available and the shortest path to the destination Mate. It then determines if the destination Mate is busy and, if not, it sends an incoming call message to the destination Mate to place the call. Once the call is placed, the Network Master then reconfigures its internal tables to reflect the new communication path. Additionally, the Network Master can also determine if a previous path has been abandoned and possibly reconnect an ongoing call to this abandoned path if it is a shorter path. Since the transmissions through the network are analog, it is necessary to minimize the signal to noise ratio, thereby requiring the shortest path for communication.

The Mixes 120-126, when operated in the Slave mode, periodically check on the status of all of the ports with "keep alive" messages. In this manner, the status of all the devices can be maintained in an internal table. If the status changes by either adding a call or deleting a call, the Mix in the Slave mode denotes this and sends out a Reconfigure message to the Network Master. The Network Master then acknowledges and the reconfiguration information is then passed from the Slave to the Network Master to maintain an updated table in the Master. Each Mix in the network knows which port the Network Master is connected to since the lowest ID constitutes the Network Master. When the Network Master is removed from the network, it is then necessary for a new Network Master to take over and update its table. This would be the next lowest ID of the Mixes 120-126 remaining in the network.

Second Level Network Data Flow

Referring further to FIG. 7, messages are transmitted on the serial data path from the Mate to either its associated Mix in the Slave mode or to the Network Master, from a Slave Mix to either the Network Master or one of its associated Mates or from the Network Master to any of the Slave Mixes or to any of the Mates. A Mate cannot send data to another Mate or Slave Mix other than its associated Slave Mix nor can a Slave Mix send data to a Mate attached to another Slave Mix. However, a Slave Mix can send a message to the other Slave Mixes for status information. When placing a message onto the serial data path, the originating device encodes this message with information regarding the ID of the originating Mate and also the ID of the destination Mate. For example, if Mate 152 sends a System message out to the Network Master, it encodes its unique ID as the originating device and the ID of the Network Master as the destination device. The Network Master has an ID that is defined as "00". This message is transmitted to the Mix 122 which is operating in the Slave mode. The Mix 122 recognizes the signal as being directed toward the Network Master, which in this example is Mix 120. This message is not processed by the Mix 122 in the Slave mode but, rather, routed through the SCM cable 132 to the Mix 120. Mix 120 recognizes the signal as being directed toward the Network Master and also recognizes that the Network Master resides internal thereto. The message is then processed by Mix 120 in the Master mode.

After receiving the message from Mate 152, Mix 120 in the Master mode transmits a response back to Mate 152. This message is encoded with the ID "00" as the originating device and the ID of the Mate 152 as the destination device. Mix 120 first recognizes that the destination Mate is not attached to any of the ports but recognizes that it is directed toward a Mate on one of the ports of Mix 122. The data is then transmitted back along the SCM cable 132 to the Mix 122. The Mix 122 recognizes this message as being directed toward the Mate 152 rather than to itself and routes the data thereto. Therefore, the Mixes in the Slave mode do not process data from the Network Master prior to routing it to the destination Mate but, rather, access the data, examine the data and then reroute the data.

In another example, the Mix 122 can directly communicate with the Network Master residing in the Mix 120. In this example, the Mix 122 generates a message having its ID as the originating device and the Network Master ID as the destination device. The message is then transmitted from the Mix 122 to the Mix 120, recognized by the Mix 120 as being for the Network Master and allowing the internal network master to process the data. As will be described hereinbelow, the Network Master comprises a virtual tenth port internal to the Mix in which it is residing. Therefore, the data is accessed by the associated Mix and then routed to this virtual tenth port.

Third Level Video Conferencing Network-LAN Based Central

Figure 8:
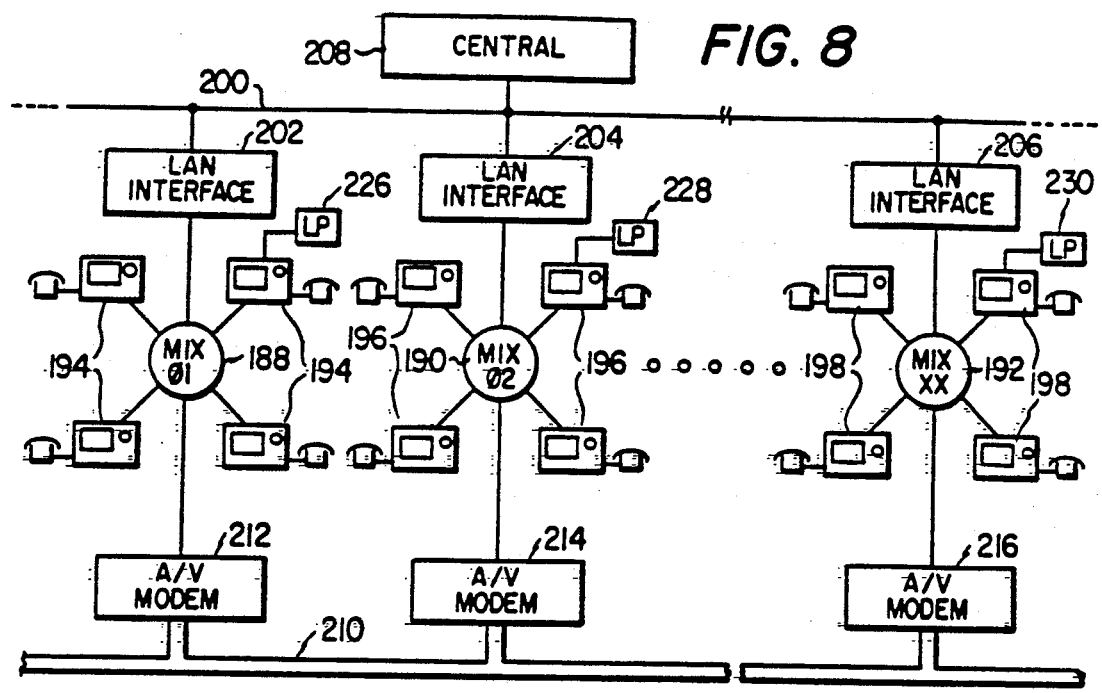
FIG. 8 illustrates a video conferencing network utilizing a baseband network for interfacing data to the video terminals with a broadband network for interfacing audio and video therebetween.

Referring now to FIG. 8, there is illustrated an alternate interconnection between single Mix networks using a broadband interconnect system. The network is fabricated from a plurality of Mix networks of which three are illustrated. A Mix 188 is labeled with the ID "0.1", a Mix 190 is labeled with the ID "02" and a Mix 192 is labeled with the ID "XX". The Mix 188 has four Mates 194 associated therewith, the Mix 190 has four Mates 196 associated therewith and the Mix 192 has four Mates 198 associated therewith. There can be a plurality of Mix networks with associated Mates in the illustrated network, each having a specific ID.

The Mix 188 is interfaced with a local area network (LAN) 200 through a LAN interface circuit 202 to allow data transfer therebetween. In a similar manner, the Mix networks 190 and 192 are interfaced with the LAN 200 through LAN interfaces 204 and 206, respectively. The LAN interfaces 202-206 are, in the preferred embodiment, integrated into the Mix, as described above with reference to the LAN interface 76 of FIG. 4a. They allow the onboard CPU in the Mix to communicate with the LAN. Interfaced with the LAN 200 is a central processing unit 208, hereinafter referred to as the "Central". Whenever the Central 208 is operable, each Mix in the network recognizes the Central 208 as the Network Master regardless of the ID's of the Mixes. Therefore, each of the Mixes in the video conferencing network of FIG. 8 is provided with a direct data interface to the network Master. However, if the Central 208 is removed, each of the Mixes operates independent of the remaining Mixes in the broadband configuration of FIG. 8. It is important to note that the LAN 200 is operable to carry control data at baseband between Mixes in the Network since it is interfacing directly to the internal CPU of each Mix through the interface circuits 202-206. This is to be distinguished from the baseband data transmitted on the SCM cables between Mates and the associated Mix. For example, baseband data transmitted directly from the location of one of the Mates 194 does not get transmitted to the LAN 200. The LAN 200 is only for control data in the configuration of FIG. 8.

The Mix 188 is interfaced with a broadband cable network 210 through an audio and video modulator/demodulator (modem) 212 which is interconnected with one of the ports thereof. In a similar manner, Mix 190 and Mix 192 are also interfaced with the broadband network 210 through audio/video modems 214 and 216, respectively. The broadband network is a network such as a CATV system which provides a plurality of discrete channels which are selectable by the audio/video modems 212-216. Selective switching of channels with the modems 212-216 enables a data link to be formed between any two of the Mixes 188-192. Once a channel in the broadband cable network 210 is selected by the modems associated with Mixes in a video conference network, the data link appears no different than the SCM cable link in the network configuration of FIG. 3. There is still a direct audio/video/data path between interconnected Mixes for a two way conference. However, the use of the LAN for communication between the Network Master and associated Mixes in the Slave mode eliminates the need for transmitting data over the broadband network 210.

When the system of FIG. 8 is utilized for multiway conferences, the Network Master in Central 208 must control the modems 212-216 to select the proper channels such that the correct video and audio is being selected. To properly route the video, a priority is established, as will be described hereinbelow. This priority essentially designates one user as the Primary whose video output is routed to all of the remaining Mates in the conference. Since Mates on different Mixes are in the conference, it is then necessary that the modems 212-216 all have the video portion thereof tuned to that of the Primary. In addition, the primary user who is transmitting video to the remaining conferees receives video from only one of the conferees and this conferee is designated as the secondary. Therefore, the associated modem must be tuned to the video from the secondary if the secondary video is transmitted over the broadband network 210.

In one example, one of the Mates 194 is the Primary and one of the Mates 196 is the secondary and the M-ary's are comprised in part of the Mates 198. The broadband network 210 has channels A-Z with the modems 212-216 operable to select any of these channels for transmission thereover. The Network Master would predesignate channel A as having video from the primary transmitted thereover such that both the secondary Mate 196 and the M-ary Mates 198 would receive video therefrom. The Network Master would also designate channel B for transmission of secondary video. Therefore, the video transmitting portion of the modem 212 would be tuned to channel A from the Primary Mate 194 and the video receiving portion of the modem 212 would be tuned to channel B for receiving video. The modems 214 and 216 would have the video receiving portion thereof tuned to channel A with the modem 214 having the video transmitting portion thereof tuned to channel B for transmission of video to the Primary Mate 194. In this manner, it is only necessary to have one video transmission path between the primary and all the remaining M-arys and one video transmission path between the Secondary and the Primary.

When the audio from Mates on different Mixes is involved in a multiway conference, it is necessary to sum all of the audio for reception by each of the Mates in the system with the exception of its own audio. Therefore, it is necessary to have a direct or virtually direct audio path between each Mate in the multiway conference and all the remaining Mates therein. To facilitate this, the audio portion of each modem is tuned to each channel. In the above example, the audio output from each of the Mixes 188-192 would be transmitted on a dedicated channel.

However, the modems 212-216 are operable to receive audios from all of the channels simultaneously and sum this audio for transmission to the associated one of the Mixes 188-192. In this manner, each of the Mates in the conference can hear the summed audio from all the remaining Mixes therein.

For example, if two of the Mates 194 on the Mix 188, two of the Mates 196 on the Mix 190 and two of the Mates 198 on the Mix 192 were associated in a multiway conference, the audio portion of the modem 212 would be set for audio transmission on channel A, the modem 214 set to have audio transmission on channel B and the audio/video modem 216 set to have audio transmitted on channel C. The Mixes 188-192 would sum the audio from the associated Mates 194, 196 and 198, respectively and output it to the respective modem 212-216. The modem 212 would be set to receive the audio from both channel B and C, the audio portion of the modem 214 would be set to receive audio from channels A and C and the audio portion of the modem 216 would be set to receive audio from channels A and B. This would effectively allow each of the Mates to hear the remaining Mates in the conference.

If the LAN were not utilized for a data interface between the Mixes in the broadband system, each of the Mixes 188-192 would then require a dedicated full duplex data interface with each other. For example, if only three Mix networks were utilized, each would require two dedicated channels for a data interface between the remaining Mixes in the network. This would require multiple modems, one modem for each pair of channels.

In operation, the Central 208 operates as a separate and distinct processor on the LAN 200 and each of the LAN interfaces 202, 204 and 206 also operates as a separate and distinct device attached to the LAN. Therefore, conventional LAN protocol would be utilized for communication between the various devices. For example, if Central 208 desired to communicate with the Mix 188 through the LAN interface 202, it would utilize the appropriate protocol to address the LAN interface 202 and transmit data thereto. If another Mix 190 desired to communicate with the Central 208 at the same time, it would have to follow the protocol of the LAN 200 in order to transmit the data to the Central 208. Since data is transmitted between the Network Master operating in the Central 208 by sending a message and then waiting for a response, slight delays may be incurred in communicating with the Central 208 when a large number of Mixes are connected to the LAN 200.

Although the LAN 200 in FIG. 8 is illustrated as being dedicated to the Central 208 and the associated Mixes 188-192, it is also possible that the LAN 200 can accommodate other peripheral LAN devices. For example, the local processors that are interfaced with the Mates on the various Mixes 188-192 could also be directly connected to the LAN 200 and communicate with each other through the LAN along a direct baseband path. As described above with reference to FIG. 4b, a local processor would send baseband data up through the SCM cable 16 to the receiving SCM 68 at the Mix and this baseband data would be stripped off and then directly connected up to the LAN 200. In a similar manner, baseband data from the LAN 200 would be directly connected to one of the SCMs 68 in one of the Mixes 188-192 through a separate cable and then transmitted down the SCM cable 16 to the receiving local processor. It is important to note that communication from a device on the LAN to one of the local processors addresses the local processor directly. This is to be distinguished from communication with the video conferencing network wherein one of the LAN interfaces 202-206 would have to be addressed and the data transmitted thereto and converted into serial data compatible with the associated Mix.

Local area networks are distinguished by the area they encompass. They are geographically limited from the distance of several thousand feet to a few miles and are usually confined to a building or a plant housing a group of buildings. In addition to its local nature, the LAN has substantially higher transmission rates than networks covering large areas. Typical transmission speeds range from 1 mbit/s to 30 mbits/s. LAN's do not ordinarily include the services of a common carrier but are more commonly privately owned and operated, thus avoiding the regulations of the FCC or the State Public Utility Commission. LAN's are usually designed to transport data between computers, terminals and other devices. Some LAN's are capable of video signaling as well. LAN s employ many techniques to manage data flow such as switching, digitizing schemes, data link control, modulation and multiplexing. LAN's are comprised of a number of basic components. The most important component is the communication path which most often consists of coaxial TV cable or a coaxial baseband cable. Cable TV (CATV) coax is used on many networks because it has a high capacity, very good signal to noise ratio, low signal radiation and low error rates. Twisted pair cable and microwave pads are also found in many LAN's. Baseband coax is another widely used transmission path, giving high capacity as well as low error rates and low noise distortion.

The second item that is a part of the LAN is the interface between the user and the network. This interface can take the form of a modem for transferring data onto a broadband network or a baseband interface circuit for transferring data in baseband onto a baseband cable. The third item is a protocol control which contains a control logic component for the LAN and provides for the user's access onto the network. Most LAN protocols employ methods and techniques for controlling data accountability and line control. These involve various types of polling/selection techniques, error handling techniques, etc. One form of protocol, which is utilized in the preferred embodiment, is token passing which is a ring topology where a token or a time slot is passed to the next station on the ring network. The last major component is the user workstation which can be anything from a word processor to a mainframe computer.

In utilizing a LAN, each of the devices that are interfaced with the LAN must abide by the network protocol in order to transfer information back and forth between units. When a LAN is utilized only with the video conferencing system, such as that sown in FIG. 8, the only information transmitted over the LAN is control data between the Central 208 and the Mixes associated therewith. The LAN interface modules 202-206 provide the necessary protocol to interface with the LAN, which protocol complements the operation of the Central 208. Therefore, the input of each of the LAN interface modules 202-206 is virtually the same as if the Network Master resided in another Mix and the data were being passed through an SCM cable. The Mix does not care where the Network Master is as long as it has a direct data path to the Network Master and it knows on which port the Network Master resides.

For example, if a Mix sends a request to the Central 208 wherein the Network Master resides, the message is sent out to the associated LAN interface and then the Mix waits for an acknowledgement. During this period, the LAN interface, in accordance with the LAN protocol, transmits the message to the Central 208, Central 208 processes the message and then sends an acknowledgement back on the LAN 200. The length of duration for this operation is dependent upon the speed of the LAN and the number of devices attached to the LAN. For the situation where the LAN is dedicated to video conferencing, this is much faster than processing serial control data through the SCM cables in a total Mix network. However, it is important to note that speed is the only difference with respect to the operation of the Mix. The interface between the Mix which operates in the Slave mode and the Central which contains the Master task is virtually the same for any configuration.

Figure 9:
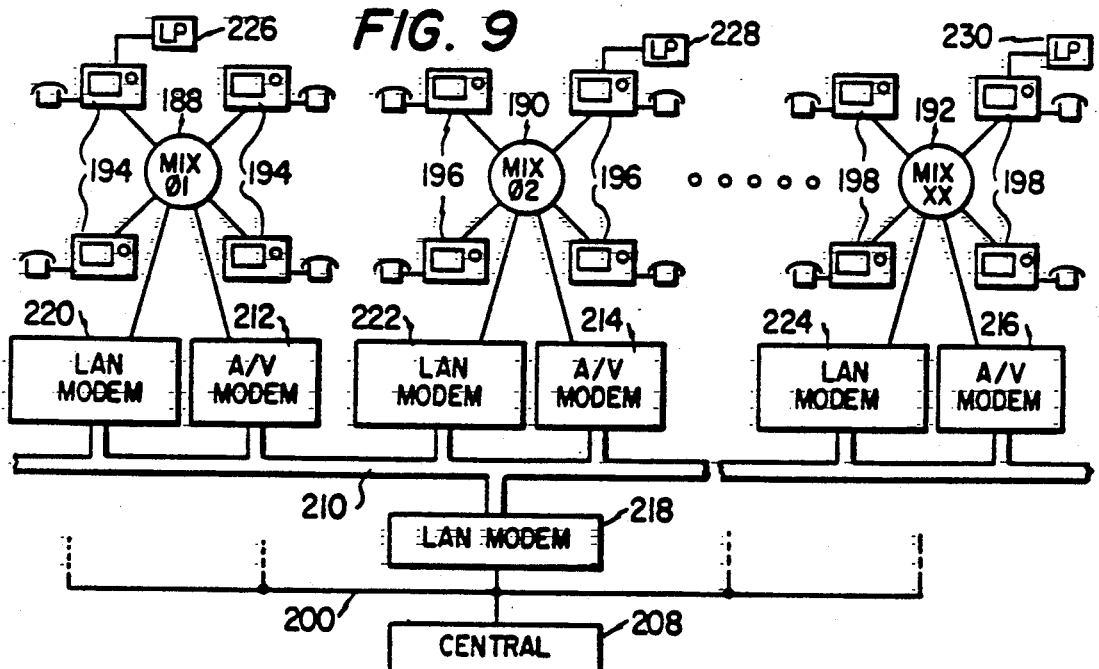
FIG. 9 illustrates a broadband network for interfacing video, audio and data thereover with a centralized controller provided for data interface.

Referring now to FIG. 9, there is illustrated an alternate interconnection for the broadband network of FIG. 8 wherein like numerals refer to like parts in the two Figures. The system of FIG. 9 utilizes the broadband network 210 to provide the LAN data link. The Central 208 and the LAN 200 are interfaced with the broadband network 210 through a LAN modem 218. The Mix networks 188-192 are interfaced with the broadband network 210 through LAN modems 220, 222 and 224, respectively. The LAN modems 218-224 are connected to a fixed channel in the broadband network 210 that is dedicated to communications between the network and the Central 208, such that a data path is always available without the requirement to switch between different channels. The operation of the system of FIG. 9 is identical to the operation of the system of FIG. 8 with the exception that the data travels through the broadband network 210 between the Central 208 and the Mixes 188-192.

Long Haul Data Link

Figure 10:
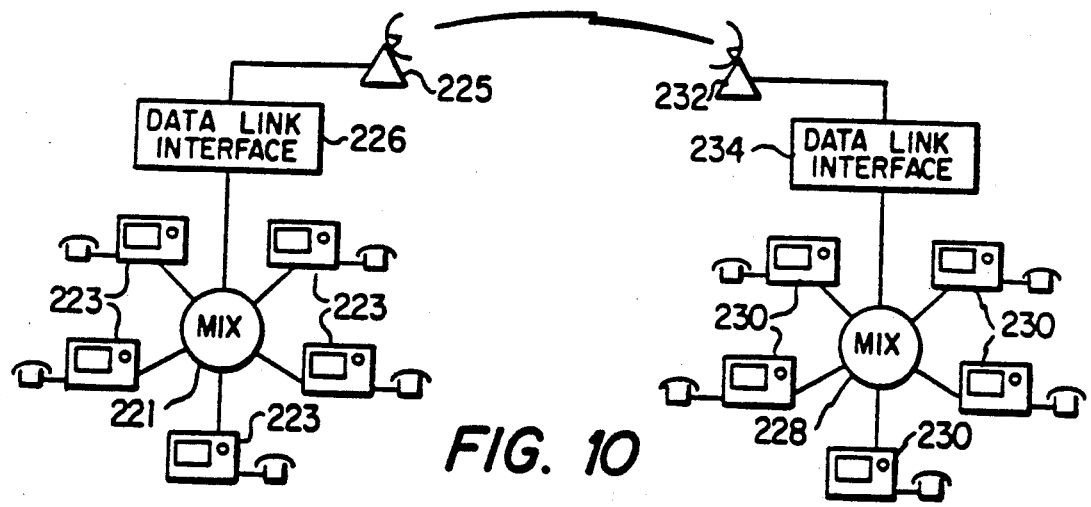
FIG. 10 illustrates a satellite link between networks.

Referring now to FIG. 10, there is illustrated a network configuration for linking two independent video teleconferencing systems. In the system of FIG. 10, two First Level networks are illustrated, each utilizing a single Mix with a cluster of Mates disposed therearound. One network is comprised of a Mix 221 with associated Mates 223. The second network is comprised of a Mix 228 with associated Mates 230. The Mix 221 interfaces with a high frequency data link receiver/transmitter 225 through a data link interface 226. In a similar manner, Mix 228 interfaces with a high frequency data link receiver/transmitter 232 through a data link interface 234. The interface 226 provides a path through which the Mix 221 can establish a data link with another receiver/transmitter in the same network such as the receiver/transmitter 232. In this manner, an off-network data link can be made to another Mix. This data link is referred to by a reference numeral 236.

The data link 236 can have the audio/video/data information transferred thereover such that the data link 236 and the interfaces 234 and 226 appear as a virtual coaxial cable to the two Mixes 221 and 228. For the two Mixes 221 and 228 to interact as a common system, the delays experienced over a long haul data link such as the data link 236 must be taken into consideration to provide a feasible data interface. Otherwise, each Mix 221 and 228 will typically act independently of the other such that an integrated network is not formed but, rather, a data link between two independent networks. For example, if a one-way satellite data link were made, the up link and down link signals for a one-way transmission would require a minimum of approximately 240 ms propagation time (22,300 miles/186,000 miles per second=0.120×2=0.240 ms) and it is most often around 270 ms, depending upon the location of the earth stations. A two-way transmission on a half duplex link to effect a dialog between two remote points then requires approximately 540 ms of transmission time. Effective interactive systems for transmitting only data should not have a response time greater than an average of two seconds.

To provide a full duplex data link between to remote stations utilizing either point-to-point microwave data links or satellite data links for a video conferencing network would require that the Network Master reside at one location or the other. This would require all control messages between the two Mixes 221 and 228 to traverse the data link 236. However, if the Network Master resides in each of the Mixes 221 and 228 connected to either side of the long haul data link 236, the data link would still be maintained but without the versatility provided by a single Network Master controlling the entire network in a localized network.

Intelligent Interface Module

Figure 11:
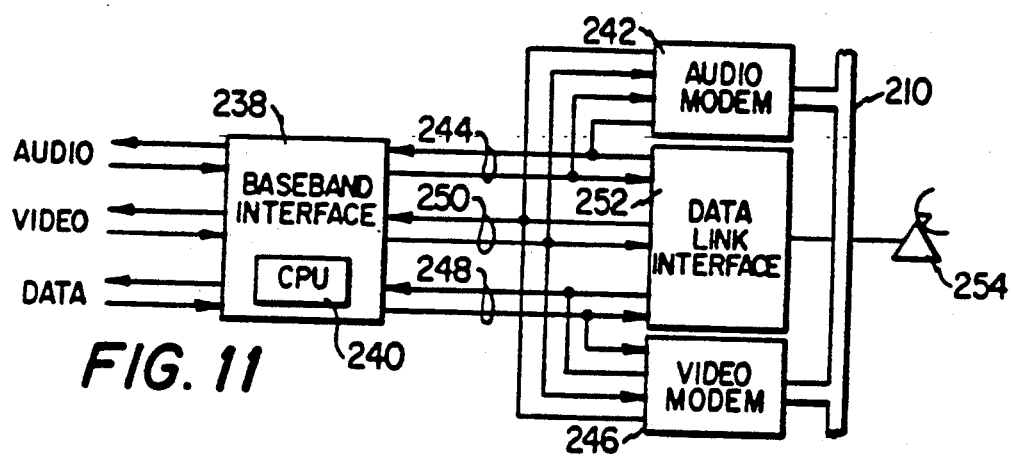
FIG. 11 illustrates a block diagram of the interface between the Mate video terminal and the broadband network.

Referring now to FIG. 11, there is illustrated a schematic block diagram of the interconnection of the audio/video modems and the data link interface with the Mixes, as illustrated in FIGS. 9 and 10. A baseband interface module 238 is provided which is operable to replace one of the SCM circuits 68 illustrated in FIG. 4a and to occupy one of the ports of the associated Mix at baseband. The baseband interface 238 receives the incoming and outgoing audio, the incoming and outgoing video and the transmitted and received data generated internal to the Mix at baseband. The baseband interface 238 has an internal CPU 240 and associated circuitry for allowing the baseband interface 238 to operate as an independent Slave module. The output of the baseband interface 238 is comprised of baseband audio, video and baseband data.. The baseband data can either be output in an RS-232 format or an RS-422 format, depending upon the desired output data format. In one configuration, the baseband audio is input to an audio modem 242 on audio lines 244 to provide two-way transmission of audio. The video is output to a video modem 246 onto video lines 248 to provide two directions of video transmission. The data is output on data lines 250 to both the audio and the video modems. Alternately, the audio lines 244, the video lines 248 and the data lines 250 can be input to a data link interface 252 for interface with a long haul data link such as a satellite transceiver 254.

In operation, the baseband interface 238 is operable to interface with the audio and video multiplex circuits in the Mix and also communicate with the CPU through the RS-232 data path therein. In the Slave mode, the Mix polls the various ports to determine what type of unit is attached thereto. If the baseband interface 238 is attached to one of the ports on the Mix in place of one of the SCM networks 68, this information is stored in the internal tables in the Slave and this information transferred to the Network Master for storage in its system tables. Therefore, when a data link is to be made over the broadband system through the audio and video modems 242 and 246, respectively, information is transmitted to the Mix to indicate channels on the broadband network 210 over which the data link is to be made. This information is transmitted from the baseband interface 238 to the audio and video modems 242 and 246 to select a proper channel. In the preferred embodiment, the audio and video are transmitted over the same channel. However, they could occupy separate channels, depending upon the application. Therefore, the baseband interface 238 is operable to interface between the Mix and either the long haul data link or the broadband data network to select a data link. The information regarding the data link and the type of data link is then transmitted back to the Network Master for storage in the internal tables thereof.

The audio and video modems 242 and 246, respectively, provide a video and audio interface to and from a standard broadband network such as a CATV cable. The modem consists of two sections, a transmitter for sourcing video and audio and the receiver for incoming video and audio, both sharing a common package. The video modems use standard broadcast video modulation and sound subcarriers to permit the reception of standard TV broadcasts and to allow the transmissions from the video modem to be monitored by standard TV receivers (cable ready). The modems conform to standard broadcast channel bandwidths, but make no provision for encoding or encryption of video or audio. The modems are compatible with standard CATV components and can be controlled by the Network Master. They impose no length restrictions on the path, the maximum length being determined by the broadband system itself. The video modems provide for AGC to normalize receive signal levels.

In the preferred embodiment, the LAN utilized is referred to as an Attached Resource Computer local area network (ARC) which is manufactured by Datapoint Corporation. The LAN modem for interfacing between either the Central processor or one of the Mixes is compatible with standard CATV components and can be used with single cable systems or with dual cable systems. The data is transmitted and received using 6 mHz wide (standard TV channel space) channels. The transmitted and received channels are independently selected using installer configured switches (not software programmable). The LAN modem connects through an interface logic card which provides for automatic echo blanking and data coding. The transmitter and receiver are implemented as two independent functions but share a common package. Delays in the data path of the transmitter, receiver and interface logic circuits subtract directly from the maximum path length. An additional delay in the data is imposed by the lower velocity factor of most 75 ohm CATV cable.

Mate Processor

Figure 12:
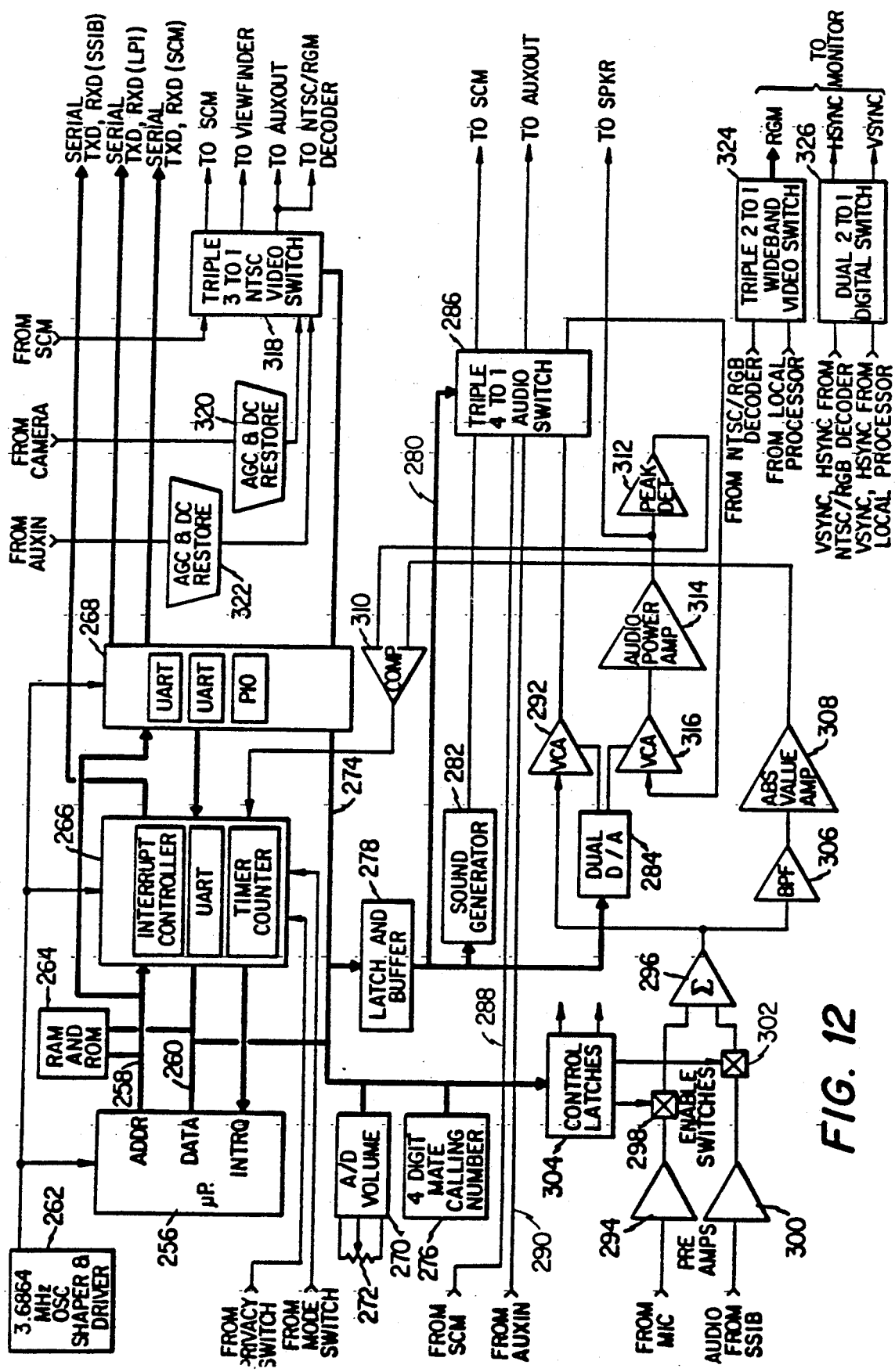
FIG. 12 illustrates a block diagram of the audio video processor portion of the Mate.

Referring now to FIG. 12, there is illustrated a schematic block diagram of the processor portion of the Mate for processing the audio and the video. The audio/video processor includes a microprocessor 256 which interfaces with the rest of the circuit over an address bus 258 and a data bus 260. An oscillator 262 is provided for generating timing signals for both microprocessor 256 and the remainder of the circuit. Memory 264 is provided and interfaced with the address bus 258 and is in the form of both volatile and nonvolatile memory. The volatile memory is comprised of a Random Access Memory (RAM) and the nonvolatile memory is comprised of Read Only Memory (ROM). A Serial Interrupt Timer Controller 266 is provided for controlling some of the timing tasks of the system and a dual universal asynchronous receiver/transmitter (DUART) 268 is also provided that is interfaced with the address bus. The DUART 268 is operable to interface with both the Rx/Tx data for the local processor and the Rx/Tx data from the SCM. This provides an input/output (I/O) capability while at the same time handling interrupts.

The UART 268 is interfaced with an analog/digital converter (A/D) circuit 270 which is connected to a volume control 272 that is external to the cabinet of the Mate. The output of the A/D converter 270 is input to the UART 268 on a data bus 274. A four digit calling number can be input on a binary switch 276 for output to the bus 274 to provide the ID for the Mate.

The data from the microprocessor 256 is input to a data latch 278 for output to a latched data bus 280. This data is input to a sound generator 282 and a dual digital-to-analog (D/A) converter circuit 284. The sound generator 282 outputs a sound to a triple four-to-one audio switch 286. The control input of the audio switch 286 is coupled to the latched data bus 280 to receive data therefrom. Additionally, the audio switch 286 receives an audio input from the SCM on a line 288 and an audio input from the auxiliary input on a line 290. A fourth input is received from the microphone or the audio output from the SSIB 18 through a voltage controlled amplifier (VCA) 292. The audio from the microphone is processed through a preamp 294 and then input to a summing circuit 296 through an enable switch 298. The audio from the SSIB circuit is processed through a preamp 300 and input to the summing circuit 296 through an enable switch 302. The output of the summing circuit 296 is input to the VCA 292. The enable switches 298 and 302 are controlled by a control latch 304 which is controlled by signals from the data bus 274. The output of the audio switch 286 is connected to either the SCM or to the auxiliary output.

The audio output of the summing circuit 296 is processed through a bandpass filter 306 and input to an absolute value amplifier 308. The output of the absolute value amplifier 308 is input to one input of a comparator 310, the other input of which is connected to the output of a peak detector 312 for comparison therewith. The peak detector 312 is operable to detect audio levels received from the audio input to the speaker, and is connected to the output of an audio power amplifier 314 which drives the speaker. The input of the audio power amplifier 314 is connected to the output of a VCA 316, the input of which is connected to a third output of the audio switch 286. This output represents either the audio from the SCM or from the auxiliary input. Both the VCA 292 and the VCA 316 have the control inputs thereof attached to the D/A converter circuit 284. The levels therefore are software controlled by the microprocessor 256.

A triple three-to-one video switch 318 processes NTSC video from three inputs. One input is directly from the SCM, one input is directly from the camera and processed through an AGC and D/C restoration circuit 320 and the other input is received from the auxiliary input after processing by an AGC and D/C restoration circuit 322. The switch 318 outputs one output to the SCM, one output to the viewfinder and one output to the auxiliary output or the NTSC/RGB decoder.

A triple two-to-one wideband video switch 324 is provided for receiving one input from an NTSC/RGB decoder and one input from the local processor to output a single RGB signal for input to the monitor. A dual two-to-one digital switch 326 is provided having one input thereof connected to the vertical sync and horizontal sync from the NTSC/RBG decoder and the other input thereof connected to the vertical sync and horizontal sync from the local processor. The output of the digital switch provides the horizontal sync and vertical sync for the monitor.

Voice Operated Gain Switching

Figure 13:
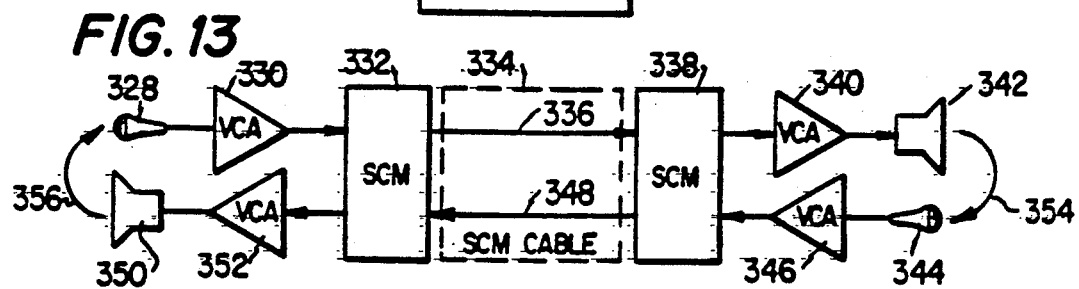
FIG. 13 illustrates a diagrammatic view of the audio path with gain switching.

Referring now to FIG. 13, there is illustrated a schematic block diagram of the audio paths for a simple two-way video conference. The originating Mate has a microphone 328 which is input to a VCA 330 and then to the SCM circuit 332. The output of the SCM 332 is then modulated to the appropriate spectral portion in an SCM cable 334, the path being represented by a directional line 336. This signal is received by an SCM 338 in the destination Mate and output to a VCA 340. The output of the VCA 340 is connected to the speaker 342. The destination Mate has a microphone 344 which is input to the SCM 338 through a VCA 346 and then transmitted to the SCM 332 along a path represented by a directional line 348. The SCM 332 processes this received audio and inputs it to a speaker 350 through a VCA 352. Since, as described above, there is no cross coupling in either the originating Mate or the destination Mate, the cross coupling must occur between the speaker and the microphone at either the origination Mate or the destination Mate. One feedback path is illustrated by an arrow 354 between the speaker 342 and the microphone 344 in the destination Mate and a second feedback path is illustrated by an arrow 356 between the microphone 328 and the speaker 350 in the originating Mate.

In operation, a signal is input to the microphone 328 of the originating Mate and passes through the VCA's 330 and 340 and through the SCM cable 334 for output from the speaker 342. This leg of the transmission has a defined gain which is adjustable by the VCA's 330 and 340. In a similar manner, a signal input to the microphone 344 for output from the speaker 350 has a gain determined by both the loss in the SCM cable 334 and the gain of the VCA's 346 and 352. One variable factor in the feedback is the amount of actual feedback between the speaker and microphone. Depending upon the design of the console in either the originating or the destination Mate and also the surrounding environment, such as reflective surfaces at or near the microphone and speaker, this feedback path will vary. If the loop gain increases to greater than one, the system will become unstable and oscillate, thereby providing positive audio feedback which can be quite irritating in a conference.

To reduce or eliminate the occurrence of positive feedback, it is necessary to reduce the loop gain to less than unity. This can be accomplished in a number of ways. First, the speaker can always be muted when the user is talking and the microphone disabled when the user is listening. However, this would prevent the user from hearing comments during his conversation and would effectively become a half duplex audio system rather than a full duplex system. The second method, and the preferred method, is to reduce the speaker gain during speaking by the user and reduce the microphone gain during listening. This effectively reduces the gain in one leg of the audio path and is accomplished by detecting the speech or the lack thereof at the microphone and adjusting the gain in accordance with a pre-determine gain value.

Figure 14:
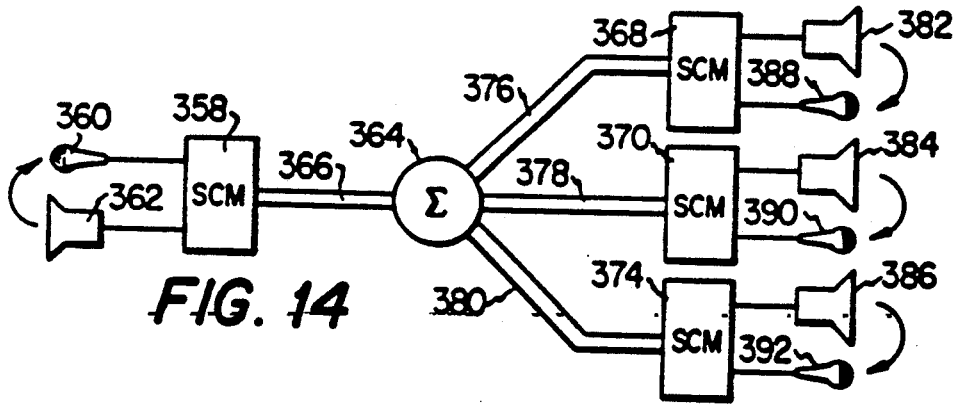
FIG. 14 illustrates a diagrammatic view of the audio patch for a multiway conference with gain switching.

Referring now to FIG. 14, there is illustrated an alternate interconnection for a video conference wherein four Mates are involved in the conference. The originating Mate is illustrated as an SCM 358 with a microphone 360 and a speaker 362. The SCM is interconnected with a summing circuit 364 through an SCM cable 366. The summing circuit 364 is a part of the Mix. The remaining Mates in the conference are represented by SCMs 368, 370 and 374. The SCMs 368-370 and 374 are interfaced with the summing circuit 364 through SCM cables 376, 378 and 380, respectively. The SCMs 368, 370 and 374 have speakers 382, 384 and 386, respectively, associated therewith and microphones 388, 390 and 392, respectively, associated therewith.

In a multiway conference, an additional feedback path is provided for each Mate added to the conference. Since these audio paths are in parallel, they will reduce the effective feedback impedance in the overall audio path, thereby necessitating a slight compensation in the loop gain. Each time an additional Mate is added to a conference, all of the Mates in the conference are sent a message from the Network Master as to the number of Mates in the conference. The amount of gain reduction in either the speaker path or the microphone path is then decreased accordingly. This is primarily a software function.

Figure 15A:
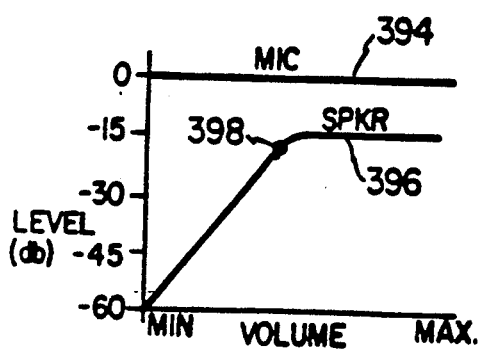
FIGS. 15a and 15b illustrate graphs of the switched gain for the audio paths.
Figure 15B:
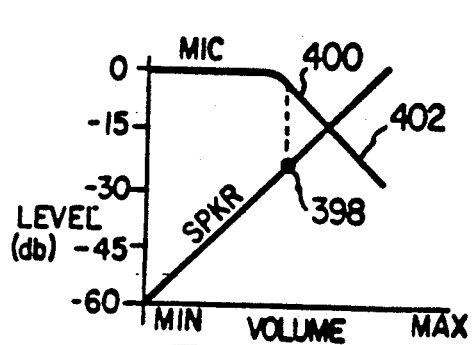

Referring now to FIGS. 15a and 15b, there are illustrated graphs of speaker volume setting versus microphone and speaker gain for the audio condition where the user is the speaker and the audio condition where the user is the listener. When the user is speaking, his voice is detected by a voice operated switch (VOX) which outputs a gain control signal when the microphone input is above a predetermined threshold.

In FIG. 15a, there is illustrated a graph for microphone gain and speaker gain as a function of the volume setting of the speaker for the condition where the VOX is on. The microphone level is illustrated by curve 394 and the speaker output is denoted by a curve 396. With the VOX on, the microphone gain is maintained at a 0 db level. However, as the volume control for the speaker increases, a gain threshold point 398 is reached and the speaker gain is maintained constant. The threshold point 398 is approximately −15 db. As described above, this threshold point varies as a number of persons in a video conference changes.

Referring now to FIG. 15b, there is illustrated a graph of volume setting versus microphone and speaker gain for the condition where the VOX is off. The microphone gain is illustrated by a curve 400 and the speaker gain is illustrated by a curve 402. When the speaker gain reaches the speaker gain threshold point 398 as a result of increasing the volume by the control on the front panel of the Mate, the microphone gain is decreased by the amount the speaker gain has exceeded the speaker gain threshold. Therefore, a predetermined amount of attenuation is maintained between the speaker and the microphone to ensure an adequate amount of loss in the audio path to prevent feedback and maintain the loop gain less than unity.

Mix Processor

Figure 16:
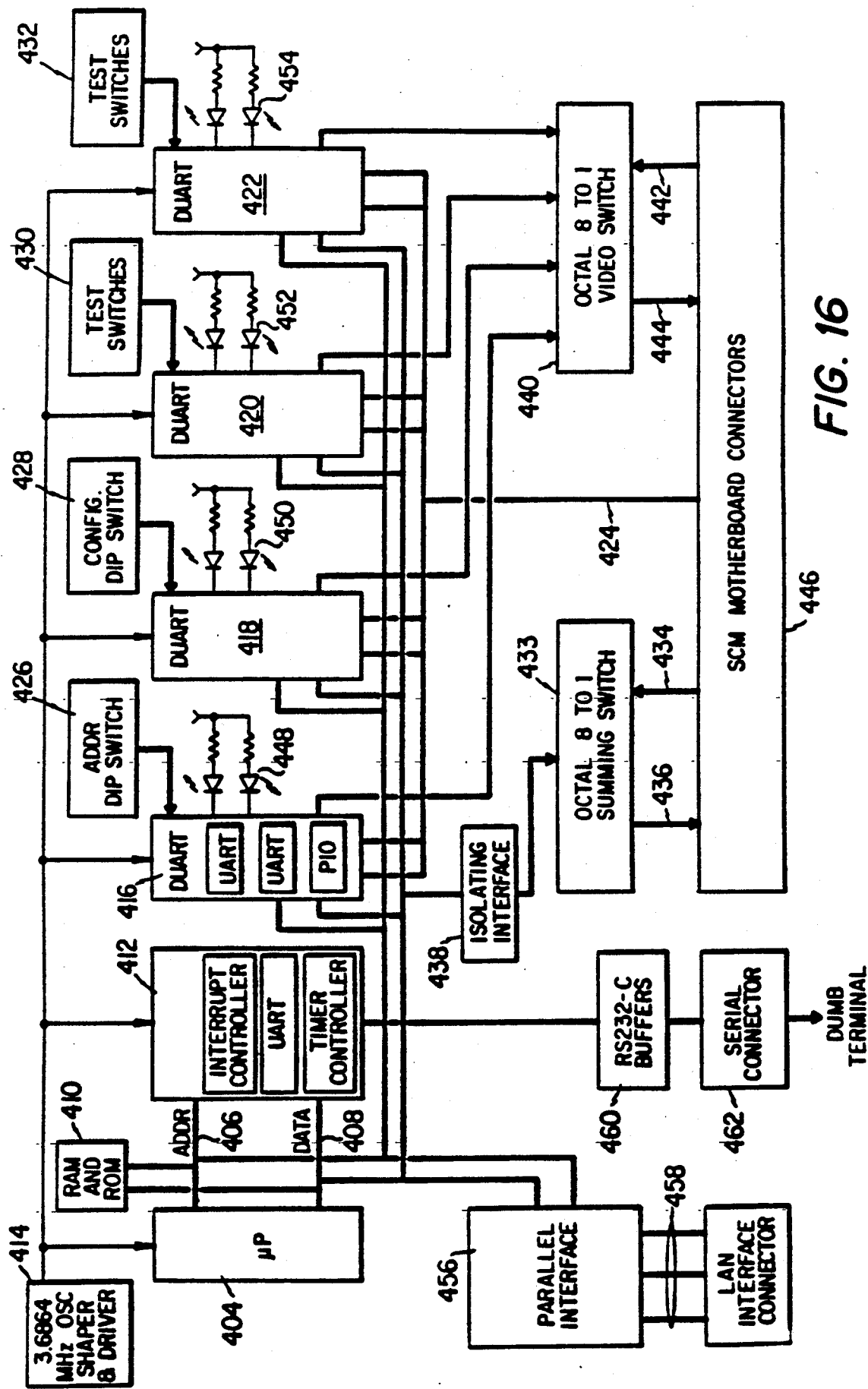
FIG. 16 illustrates a block diagram for the Mix switching network processor.

Referring now to FIG. 16, there is illustrated a schematic block diagram of the Mix without the SCM circuits, the LAN interface circuit or the RS-232 interface circuits attached. The central processing task is performed by a microprocessor 404 which outputs addresses to an address bus 406 and data to a data bus 408. The address and data buses are both input to a memory circuit 410 which is comprised of RAM and ROM to provide additional memory when interfaced with the microprocessor 404. A serial timer/interrupt controller circuit 412 is also interfaced with the address and data buses 406 and 408 to provide timing and interrupt controls for the Mix. An oscillator 414 provides timing for the microprocessor 404 and the remaining circuit.

Dual UARTS (DUARTS) 416, 418, 420 and 422 are provided that are interfaced to the address bus and the data bus with each half of each of the DUARTS 416-422 being output to two wires of a sixteen wire Rx/Tx bus 424 carrying serial data to the SCMs. The DUART 416 has an address switch 426 provided for inputting a seven bit address thereto which determines the specific ID of a given Mix. The DUART 418 has an address switch 428 connected thereto to provide a seven bit address to determine the configuration of the Mix. This address determines the Master ID number which, as described above, determines the priority of the Mixes during reconfiguration of the Mix from the Slave mode to the Master mode. The DUART's 420 and 422 have address switches 430 and 432 connected thereto, respectively, for providing additional external data inputs. These are normally used for testing configurations and are not utilized during network operation.

An octal eight-to-one summing switch 433 receives four audio inputs on an eight wire bus 434 and provides eight audio outputs on an eight wire bus 436. One wire from each of the buses 434 and 436 is connected to each of the SCMs or ports of the Mix. An interface circuit 438 controls the summing switch 433 in response to data received from the data bus 408. An octal video eight-to-one switch 440 has eight video input lines 442 and eight video output lines 444. One of the output lines 444 and one of the input lines 442 are connected to each SCM or port of the Mix. Each of the eight switches in the video switch circuit 440 is controlled by a three-bit word. These three-bit words are output from a parallel I/O output port from each of the DUARTS 416-422. These three bit words are generated in response to an address input to the DUARTS 416-422 from the address bus 406.

The audio input and output wires 434 and 436, the video input and output wires 442 and 444 and the data Rx/Tx lines are connected to the eight ports through port connectors 446. As described above, each of the port connectors has associated therewith an audio input and an audio output, a video input and a video output and an Rx data line and a Tx data line. Each of the DUARTS 416-420 has associated therewith indicator light emitting diodes (LEDs) 448, 450, 452 and 454, respectively. These indicator lights are utilized for indicating status and are independently controlled by microprocessor 404 for various functions.

A parallel interface circuit 456 is provided that interfaces with the address bus 406 and the data bus 408 and provides output lines 458 that are input to the LAN interface connector. This connector interfaces with the interface circuit for the LAN. A buffer circuit 460 is connected to a serial Rx/Tx output line from the serial timer interrupt controller which has an internal UART. The output of the buffer is connected to a serial connector 462 which interfaces with the RS-232 interface circuit. This RS-232 interface circuit is utilized to drive a dumb terminal for providing a local indication of the status of each Mix. No control functions are provided through this port.

Station Interface Box

Referring now to FIG. 17, there is illustrated a schematic block diagram of the SSIB 18. The SSIB 18 receives on the input thereof transmitted audio, received audio, transmitted data, received data and two connections for power and ground. The audio is input to one side of a hybrid 464, the other side of which is output from the SSIB 18 for connection to a conventional telephone handset. The data inputs are connected to a CPU 466 which provides a local processing capability for the SSIB 18. The application software is contained in a memory circuit 468 that is interfaced with the CPU 466. Additionally, a key pad 470 is provided in the SSIB 18 to allow the user to input key strokes. The key pad 470 is equivalent to that found on a conventional touch-tone telephone. Interface control circuits 472 are also provided to allow the SSIB 18 to interface with other telephones such as a secretary's telephone or the main telephone in the office. A Dual Tone Multifrequency (DTMF) decoder 473 is provided for receiving DTMF signals from the handset and converting them to data for transmittal to the Mate 10 on the data path. This allows the user to input data through the keys of the handset.

The CPU 466 is operable to interface with the Mate 10 in FIG. 1 through a serial data link provided by the transmitted data line and the received data line. This is essentially done in an RS-232 format. By utilizing the serial data link, only two wires are required for interfacing all the functions of the SSIB 18 with the Mate 10. The serial data path also allows the SSIB 18 to operate asynchronous with respect to the Mate 10 and provides key strokes to the Mate.

The SSIB 18 has the capability to activate either a main buzzer or a secretary buzzer which is at the secretary's station which may be remotely disposed from the Mate 10 itself. When a video call comes in, the Mate sends a "buzz secretary" command to the SSIB and then the SSIB buzzes the secretary station set for two seconds. The Mate will repeat the command every four seconds. If after twenty seconds, the secretary set is not answered, then the Mate will begin chiming locally through the speaker of the Mate. If the secretary's phone goes off hook, the Mate then answers the call in audio only. After some talk, the secretary presses the "*" key to buzz the station SSIB. The SSIB then sends a chime command to the Mate. This causes the Mate to generate a buzz sound in the Mate to differentiate it from the incoming call chime. The handset attached to the SSIB proximate the Mate is then picked up and the user can talk to the person on the secretary's phone. When the secretary hangs up, the call is answered in full video.

Local Processor Interface

Referring now to FIG. 18, there is illustrated a schematic block diagram of one form of the interface circuit 44 of FIG. 1 for interfacing between the Mate 10 and the local processor 42. The example illustrated in FIG. 18 is for the format utilized by International Business Machines Corporation for their personal computer referred to as the "IBM PC". The IBM PC outputs red, green and blue levels and an intensity signal, and it also outputs the horizontal sync and vertical sync signals. The circuit of FIG. 18 is operable to translate the various video levels to be compatible with the RGB levels of the Mate 10 and also to detect the presence of a brown color signal output by the IBM PC. This brown color signal is a peculiarity of the IBM PC which, when not compensated for, results in a different color.

The red input level from the IBM PC is input to a buffer 474, the output of which is input to another buffer 476. The output of the buffer 476 is connected to the anode of a diode 480. The cathode of the diode 480 is connected to one end of a resistor 482, the other end of which is connected to a node 484. The green signal level from the IBM PC is input to a buffer 486, the output of which is input to a second buffer 488, the output of which is connected to the anode of a diode 490. The cathode of the diode 490 is connected to one side of a resistor 492, the other side of which is connected to a node 494. The blue level from the IBM PC is connected to the input of a buffer 496, the output of which is connected to the input of a buffer 498, the output of which is connected to the anode of a diode 500. The cathode of the diode 500 is connected to one end of a resistor 502, the other end of which is connected to a node 504.

The intensity level output by the IBM PC is input to a buffer 506, the output of which is connected to the anodes of diodes 508, 510 and 512. The cathode of the diode 508 is connected to the node 484 through a resistor 514, the cathode of the diode 510 is connected to the node 494 through a resistor 516 and the cathode of the diode 512 is connected to the node 504 through a resistor 518. The series diode and resistor configuration attached to the output of each of the buffers 476, 488, 498 and 506 is operable to provide a level translation of the voltage compatible with the RGB format of the monitor in the Mate 10. The resistor values are selected in accordance with the level translation desired.

For the IBM PC, the output of each of the buffers 474, 486 and 496 is input to the digital input of a three-input decoder 520. The enable input is connected to the output of the buffer 506 for enabling the intensity signal. The decoder 520 is utilized to detect the presence of the levels of the red, green and blue signals output by the IBM PC for the color brown. This, as described above, is a peculiarity of the IBM PC and the level must be adjusted slightly for this particular color. The appropriate output from the decoder 520 is selected and input through a diode 522 and a series resistor 524 and connected to the node 484 to provide the appropriate level for brown. The output of the decoder 520 that is selected depends upon the state of the red, green and blue signals output by the IBM PC for the brown color. This can be found in the application manual on the IBM PC.

The node 484 with the translated red values is input to the base of a transistor 526, the translated green value on the node 494 is input to the base of a transistor 528 and the translated blue value on the node 504 is input to the base of a transistor 530. The collectors of the transistors 526-530 are connected to a positive voltage supply and the emitters thereof are connected to a minus voltage supply through resistors 532, 534 and 536, respectively. The emitter of the transistor 526 is connected to the red video input on the Mate 10 through a series resistor 538. The emitter of the transistor 528 is input to the green video input of the Mate 10 through a series resistor 540. The emitter of the transistor 530 is input to the blue video input of the Mate 10 through a series resistor 542.

The horizontal sync signal output by the IBM PC is input to a buffer 544, the output of which is input to the clock input of a one shot circuit 546. The output of the one shot circuit 546 is input to the clock input of a retriggerable one shot circuit 548. The output of the one shot 548 drives the base of an NPN transistor 550 which is connected as an emitter follower, the output of which provides the inverted horizontal sync signal. The one shot circuit 546 has the timing thereof controlled by a variable resistor 552 and a capacitor 554 for varying the duration of the one shot 548. The retriggerable one 1 shot 548 is controlled by a resistor 556 and a capacitor 558. The one shots 546 and 548 are of the type 74123 manufactured by Texas Instruments Incorporated. They provide a horizontal phase control to adjust the phase between the horizontal sync of the IBM PC and the horizontal sync of the monitor.

The vertical sync output by the IBM PC is input to an inverter 560, the output of which drives the base of an NPN transistor 562. The NPN transistor 562 is connected in an emitter follower configuration to provide the inverted vertical sync input to the monitor.

The IBM PC also outputs transmitted and received data in an RS-232 format, which is compatible with the format of the Mate. The Tx output of the IBM PC is input to the input of three series inverter circuits 564, 566 and 568 through a series resistor 570. The input of the inverter 564 is connected to a minus voltage supply through a resistor 572. A transient suppressor 574 is connected between the input of the inverter 564 and ground. The output of the third inverter 568 in the series configuration provides the Rx output to the monitor through a series resistor 576. A capacitor 578 is connected between the Rx output and ground. In the opposite direction, the Tx output of the Mate is connected to the input of three series configured inverters 580, 582 and 584 through a series resistor 586. A capacitor 588 is connected between ground and the input of the first inverter 580 in the series configuration. The output inverter 584 in the series configuration provides the Rx input to the IBM PC through a series resistor 590. A transient suppressor 592 is connected between the output of the third inverter 584 in the series configuration and ground. The inverters 564-568 and 580-584 are of the type 7404 manufactured by Texas Instruments Incorporated. The buffers 474-476, 486-488, 496-498, 506 and 544 are all of the type HCT541 manufactured by National Semiconductor. Although the circuit of FIG. 18 is utilized for interfacing between the IBM PC and the Mate 10, it should be understood that the circuit is customized for each computer or local processor that is interfaced with the monitor 12 such that a predetermined RGB level, horizontal and vertical sync levels and serial data interface is provided.

Mate Processor Schematic

Referring now to FIGS. 19a-19f, there are illustrated schematic diagrams of the processing portion of the Mate 10. A microprocessor 594 is utilized to provide a sixteen bit address output and an eight bit data output. The processor is a Z80A processor manufactured by Mostek Corp. The address outputs of the microprocessor 594 are connected to a sixteen bit wide address bus 596. The data outputs are connected to an eight bit wide data bus 598. The first eight bits of the address bus 596 are input to a octal D-type latch 600, the output of which is connected to the first eight bits of a sixteen bit latched address bus 602. The other eight bits of the address bus 596 are input to the D-input of an octal D-type latch 604, the outputs of which are connected to the remaining eight bits of the latched address bus 602.

A 32Kx8 Erasable Programmable Read Only Memory (EPROM) 606 has the address inputs A0-A13 connected to the first fourteen bits of the latched address bus 602 and the data outputs on an eight bit wide data output connected to the data bus 598. An 8Kx8 Random Access Memory (RAM) 608 has the address inputs A0-A10 and A12 connected to the respective address lines on the latched address bus 602 and the data output ports on an eight bit wide data output connected to the data bus 598.

A bus and timing control circuit 610 is provided to generate various timing controls such as chip select resets and miscellaneous timing signals. An oscillator 612 generates timing signals which are input to the clock input of a J-K flip-flop 614. The Q-output of the flip-flop 614 is connected through an inverter 616 to a node 618. The inverted Q-output is connected through an inverter 620 to a node 622. The node 688 provides the clock input to the microprocessor 594 and also timing reference signals to the bus controller 610.

Figure 19A:
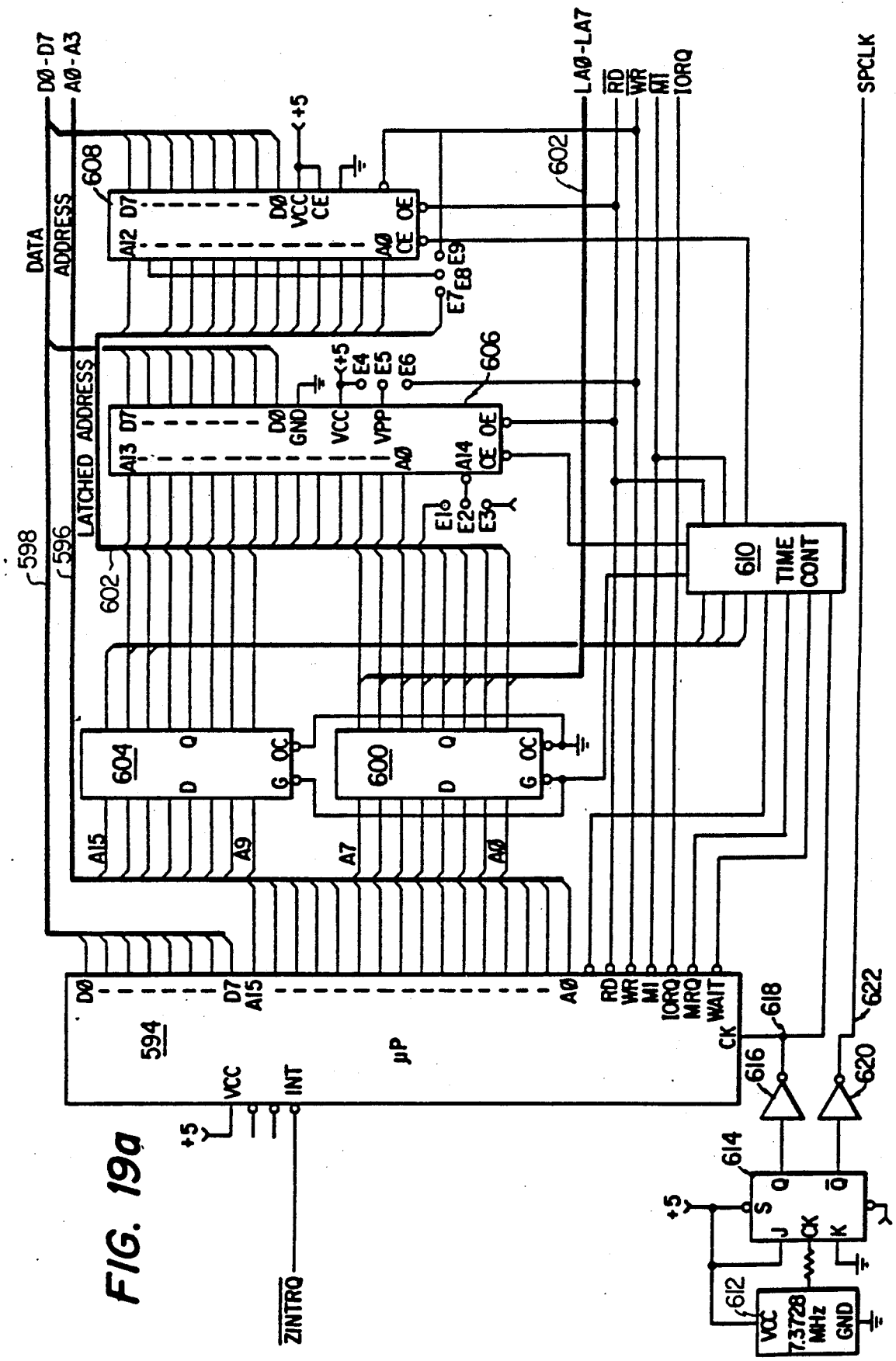
FIGS. 19a-19f illustrate a schematic for the audio video processor portion of the Mate.
Figure 19E:
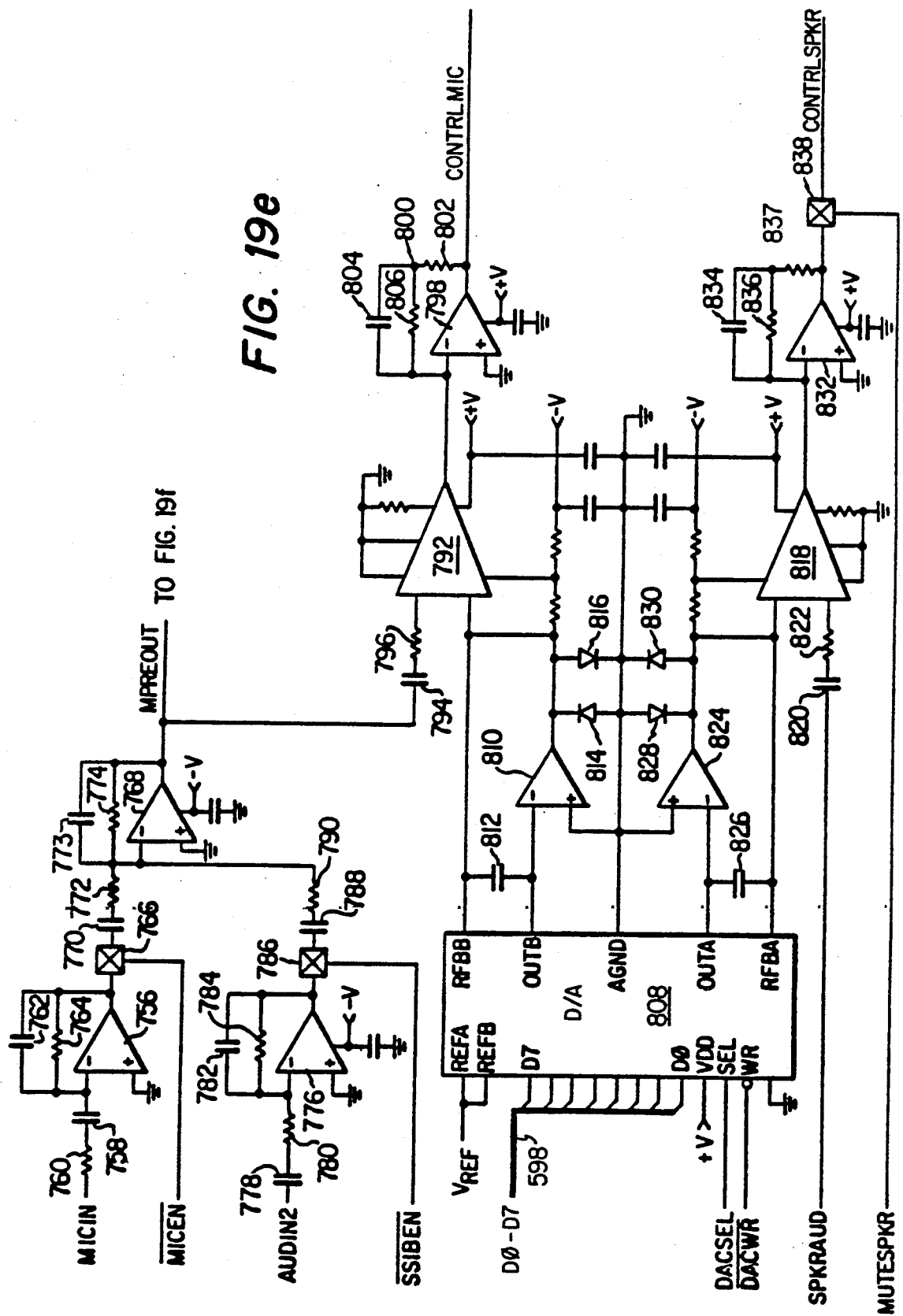
Figure 19D:
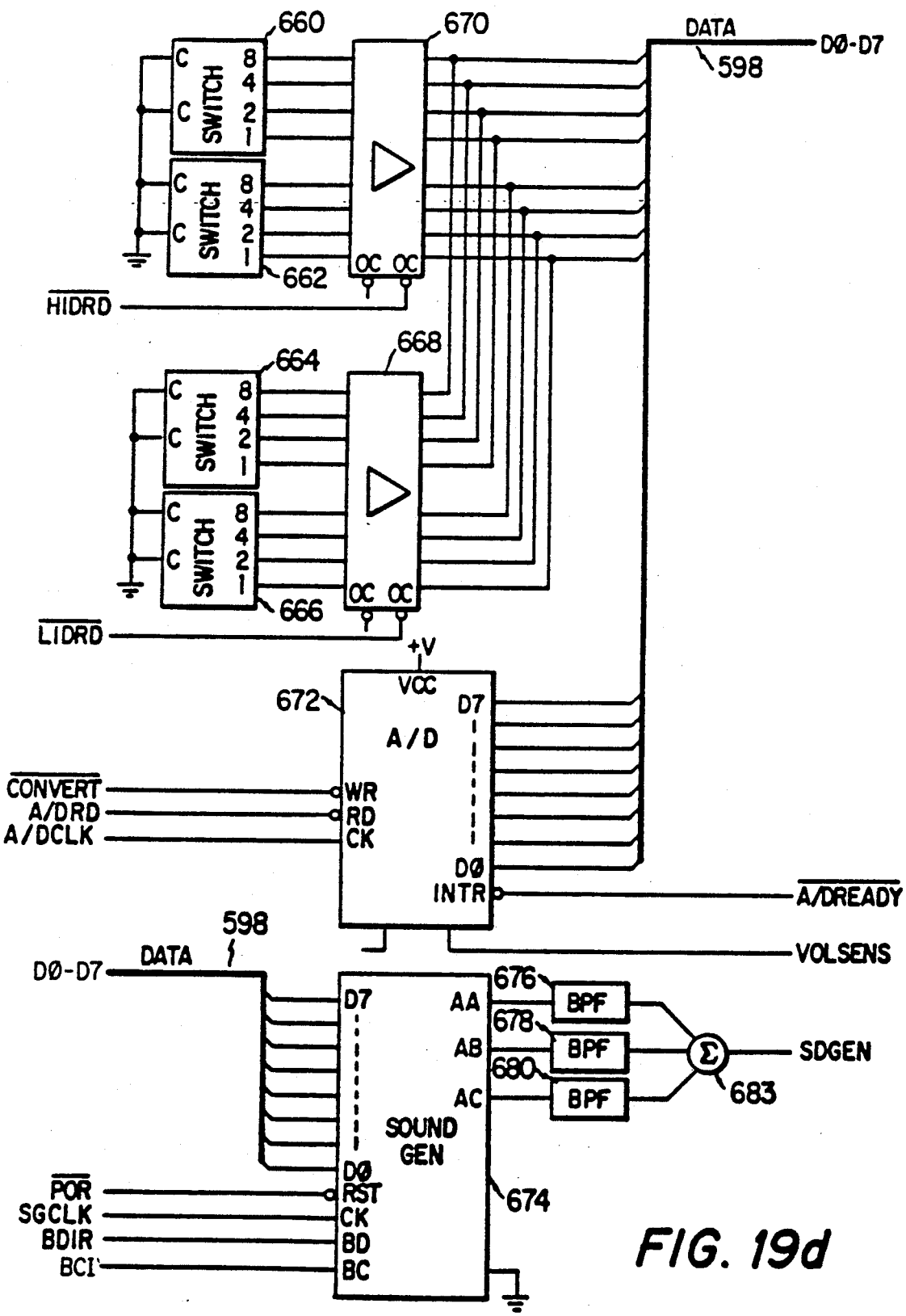
Figure 19C:
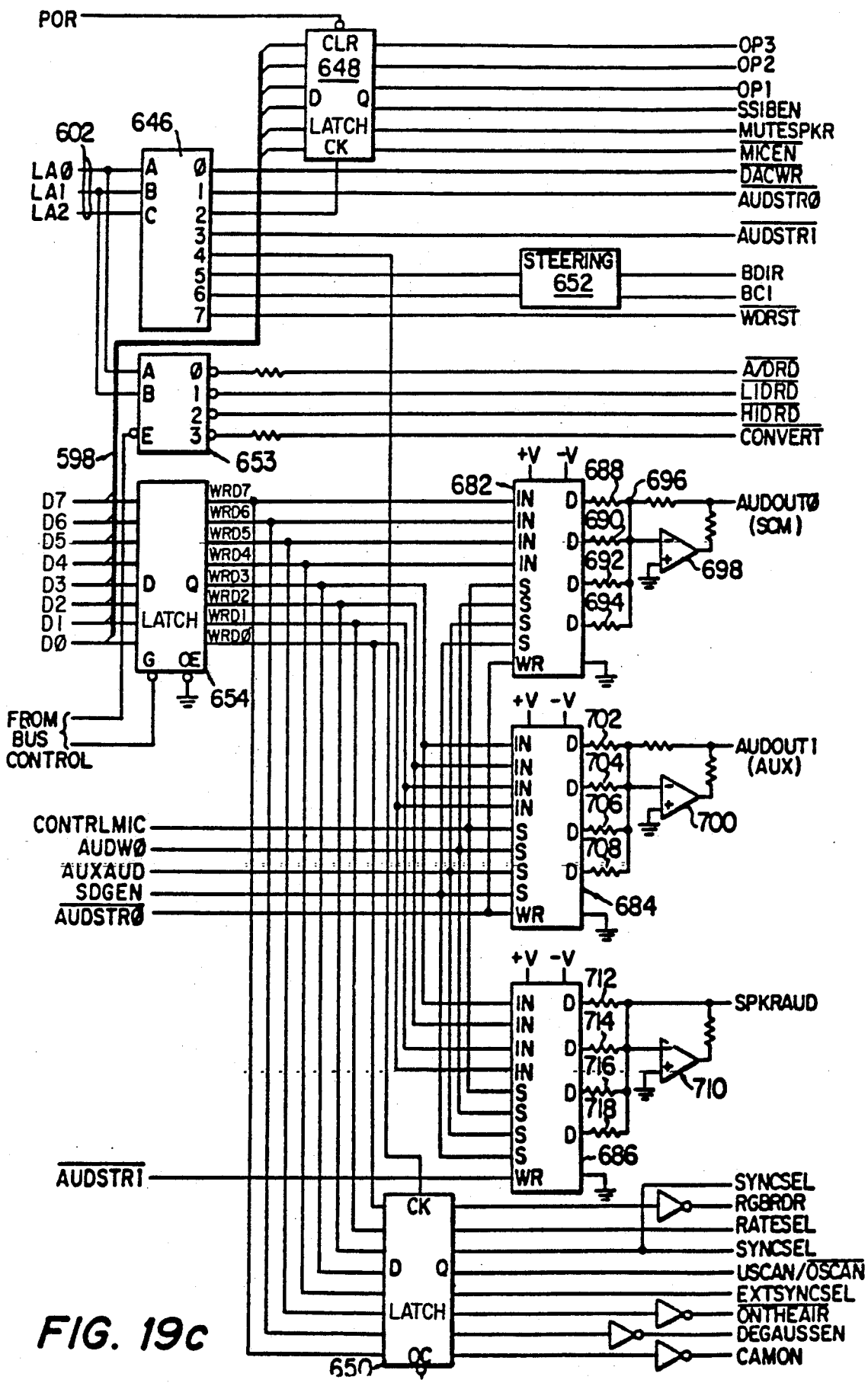
Figure 19B:
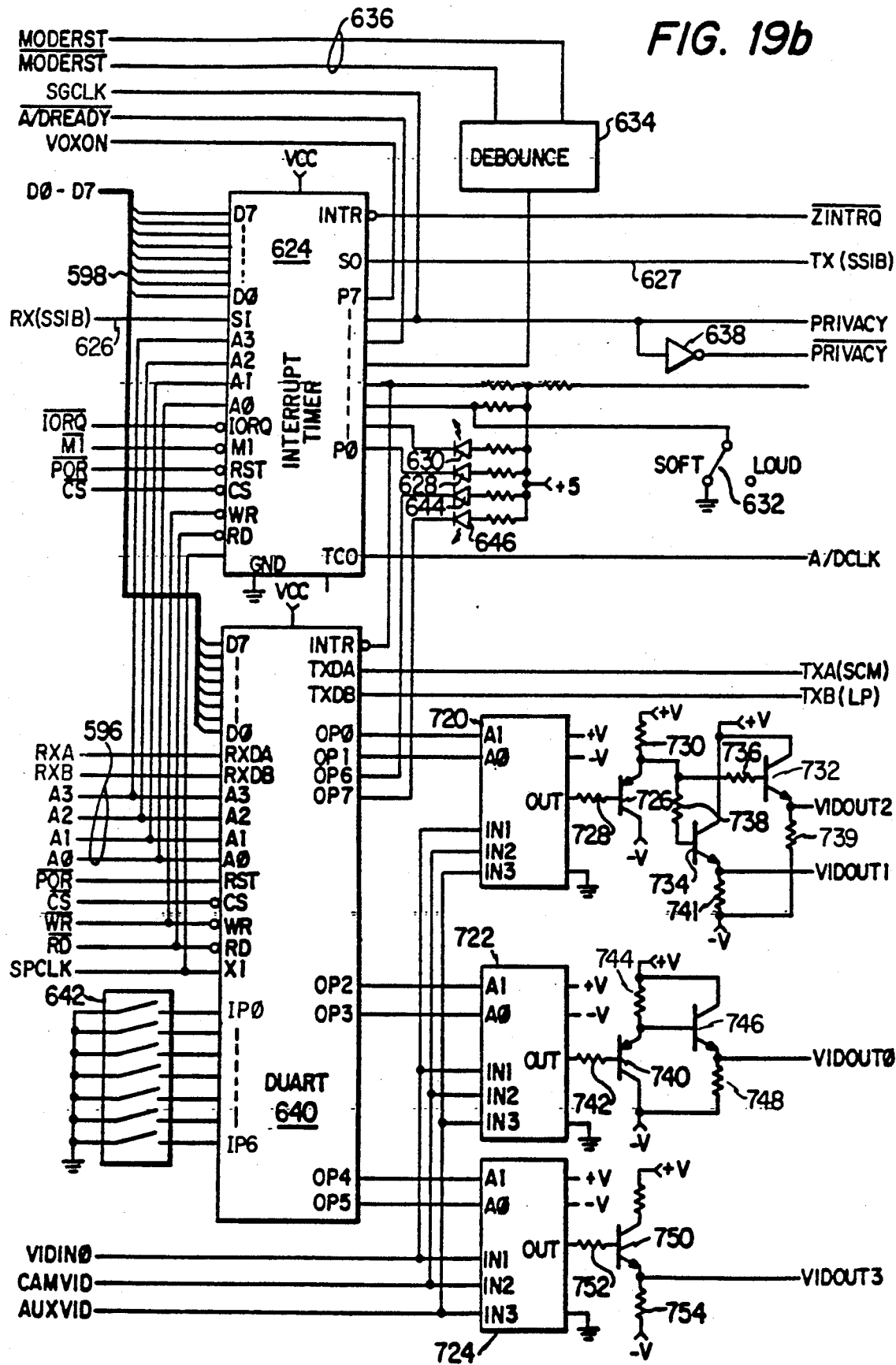
Figure 19F:
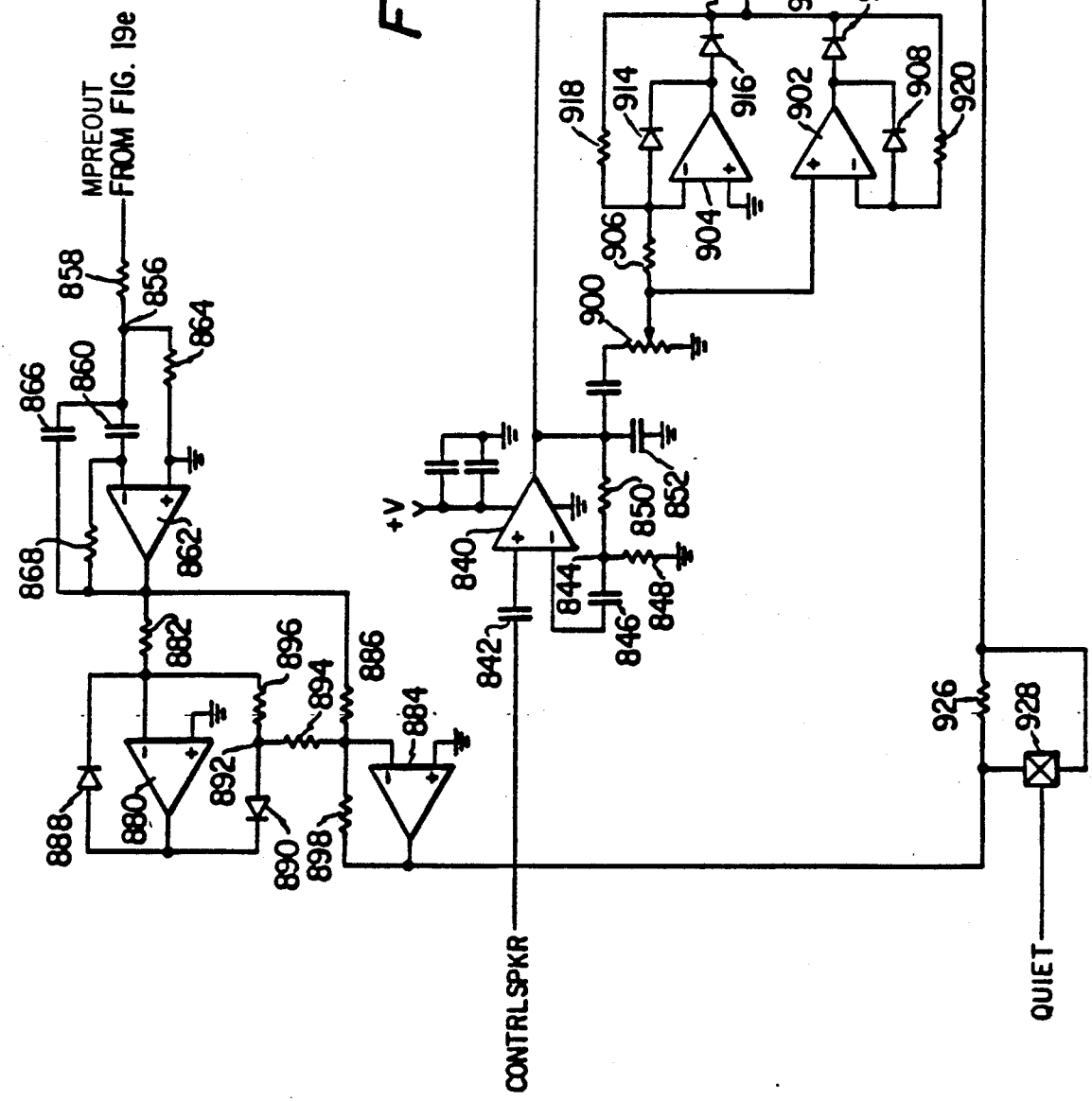

Referring to FIG. 19b, an interrupt timer circuit 624 is provided for generating timing and interrupt signals for the microprocessor 594. The interrupt timer 624 has eight data inputs connected to the data bus 598 The interrupt timer 624 also has an internal UART and an eight bit wide latched output for latching data thereto. The timer 624 has four address inputs A0-A3 which are connected to the first four bits of the address bus 596. A reset input is received from the inverted form of a power reset input (POR). The interrupt request signal is output from the interrupt timer 624 for connection to the interrupt input of the microprocessor 594. The read (RD) and write (WR) inputs of the interrupt timer 624 are also connected to the microprocessor 594 with the clock input being connected to the node 622 (see FIG. 19a) for receiving the inverted clock from out of the flip-flop 614. The internal UART of the interrupt timer 624 is utilized to process the serial data from the SSIB 18. The serial input is connected to an Rx (SSIB) line 626 and a serial output port is connected to a line 627 labeled Tx (SSIB).

The interrupt timer 624 has eight parallel input/output bits which are selectable under the control of the microprocessor 594. These are labeled P0-P7. The outputs P0 and P1 are connected to LEDs 628 and 630 for providing status signals. The LEDs 628 and 630 are connected to a positive voltage through pull up resistors. The input P2 is connected to a switch 632 for selecting between soft and loud on the audio. When the input P2 is grounded, this indicates an active state or a soft signal. The other state of the switch represents the loud state. The switch 632 is on the rear panel of the Mate for user access. The port P4 is connected to the output of a debounce circuit 634 which is connected to two lines 636, which are connected to the mode switch on the front panel of Mate 10. Port P5 receives a READY signal from an A/D converter and port P6 receives the inverted privacy signal from the privacy switch on the front panel which is inverted through an inverter circuit 638. The privacy switch allows the user to disconnect his microphone and camera from the SCM. Port P7 is connected to a VOX ON signal which indicates that voice has been detected for a predetermined duration of time. The interrupt timer 624 is of the type manufactured by Mostek Corporation, part No. MK3801-4.

A DUART 640 is provided for receiving the serial data from the SCM and the local processor through the interface circuit 44. The DUART 640 has an eight bit data input that is interfaced with the data bus 598 and four address inputs A0-A3 which are connected to the first four bits of the address bus 596. The DUART 640 has eight parallel output ports OP0-OP7 for latching output data from the data bus 598. Additionally, the DUART 640 has seven input ports IP0-IP6 for receiving data and latching it to the data bus 598. A seven switch dual inline package (DIP) switch 642 is interfaced with the input ports IP0-IP6. The reset input is connected to an inverted form of the POR signal and the read (RD) and write (WR) inputs are connected to the microprocessor 594. The X1 input is connected to the node 622 (see FIG. 19a) to receive the inverted clock signal output by the flip-flop 614.

The SCM Rx signal is input on the RxA port and the SCM Tx signal is output from the TxA port. In a similar manner, the local processor Rx signal is input on the RxB port and the Tx output for the local processor is output from the TxB port. The interrupt input of the DUART 640 is connected to the port P3 from the interrupt timer 624.

The output ports OP0-OP5 provide Select output to the video switch. The ports OP0 and OP1 provide monitor select outputs for selecting the monitor, the ports OP2 and OP3 provide video selects for selecting internal video and the ports OP4 and OP5 provide SCM selects for selecting video from the SCM output which is network video. The port OP6 is connected to a LED 644 for indicating status which is pulled down from a positive voltage supply through a series resistor. The port OP7 is connected to a signal DACSEL for selecting the digital to analog converter.

Referring to FIG. 19c, the first three bits of the latched address bus 602 are input to an I/O decoder 646 which is a three-to-eight decoder of the type 74138 manufactured by Texas Instruments Incorporated. The three bit input from the latched address inputs LA0-LA2 selects one of eight outputs. The first output is an inverted DACWR signal for writing to the digital-to-analog converter, the second output is the inverted AUDSTR0 signal for operation with the audio circuit, the fourth output is the inverted AUDSTR1 output for selecting one of the audio multiplexers. The third and fifth outputs are clock signals for latching data in data latches 648 and 650, respectively. The sixth and seventh outputs are input to a steering circuit 652 to provide the signals BDIR and BCI which are utilized for the sound generator or circuit.

A two-to-four decoder 653 is provided having the two address inputs connected to the address lines LA0 and LA1 from the latched address bus 602 with the four outputs thereof providing Read and Write control signals for analog-to-digital conversion and routing data. An octal D-type latch circuit 654 is provided for latching data from the data bus 598 to provide the WRD0-WRD7 signals which are the control signals for the audio switch. The latched output of the latch 654 is also input to the D-type latch 650 which, is controlled by the fifth output of the I/O decoder 646. The outputs of the latch 650 provide various synchronizing signals.

Referring to FIG. 19d, the telephone number or the ID of a specific Mate is input on four rotary switches 660, 662, 664 and 666. Each of the switches 660-666 is operable to provide binary output data. The binary outputs of the two switches 664 and 666 are input to the inputs of an octal line driver 668. The binary outputs of the two switches 660 and 662 are input to an octal line driver 670. The line drivers 668 and 670 are of the type 74LS244 manufactured by Texas Instruments Incorporated. The outputs of both of the line drivers 668 and 670 are input to the data bus 598 and are individually selectable. The switches 660 and 662 comprise the high portion of the telephone number and the switches 664 and 666 comprise the low portion of the telephone number. The inverted form of the signal HIDRD is input to the enable inputs of the line driver 670 and the inverted form of a signal LIDRD is inverted to the enable inputs of the line driver 668. These signals are generated from the two-to-four decoder 653 (see FIG. 19c).

An analog-to-digital converter 672 is provided which has an eight bit data output port with each of the bits connected to the corresponding bits in the data bus 598. The interrupt output is supplied to interrupt timer 624, and the clock input is connected to the A/D CLK signal output by the interrupt timer 624. The READ and WRITE signals are connected to two outputs of the two-to-four decoder 653 to provide timing signals therefor. The analog input is connected to the voltage sense output of the voltage control knob. This is essentially the wiper on a potentiometer and constitutes the volume control. As the voltage varies, this voltage is converted to a digital value and read by the microprocessor 594.

A sound generator circuit 674 is provided which has an eight bit data input port connected to the data bus 598. The sound generator circuit 674 outputs three signals which are each input to bandpass filters 676, 678 and 680. The outputs of the bandpass filters 676-680 are input to a summing circuit 683 to provide the synthesized sound signal SDGN. The reset input of the sound generator 674 is connected to the inverted form of the POR signal and the clock input is connected to a timing signal output by the interrupt timer circuit 624. The steering control lines BDIR and BCI output by the steering circuit 652 are also input to the sound generator circuit.

Referring to FIG. 19c, the audio switch is comprised of three quad analog switches 682, 684 and 686. The switches 682, 684 and 686 receive the audio input CONTRLMIC from the microphone, the SCM audio signal AUDW0, the auxiliary audio signal AUXAUD and the signal generator signal SDGEN. In switch 682, each of these signals is individually controlled for output therefrom through summing resistors 688, 690, 692 and 694 to a node 696. Switch 682 is controlled by the signals output by the data latch 654 with the WRD4 signal controlling the SDGEN signal, the WRD5 signal controlling the AUXAUD signal, the WRD6 signal controlling the AUDWO signal and the WRD7 signal controlling the CONTRLMIC signal. The summed voltage on the node 696 is input to an op amp 698 which is configured as a summing amplifier. The output constitutes the audio output for the SCM.

The analog switch gates 684 and 686 are controlled by the signals WRD0-WRD3. WRD3 controls the selection of the CONTRLMIC signal, WRD2 controls the selection of the AUDWO signal, WRD1 controls the selection of the AUXAUD signal and WRD0 controls the selection of the SDGEN signal. The four outputs of the analog switch gate 684 are summed with a summing op amp 700 through four resistors 702, 704, 706 and 708. The output of the summing op amp 700 comprises the auxiliary output. The four outputs of the analog switch gate 686 are summed with an op amp 710 through four series resistors 712, 714, 716 and 718. The output of the op amp 710 comprises the audio for this speaker.

Referring to FIG. 19b, the video switch is comprised of three three-to-one video switches 720, 722 and 724 which are of the type HI-524 manufactured by Harris Semiconductors. Each of the switches 720–724 receives the video input from the SCM, the video input from the camera and the video input from the auxiliary video port. Each of these videos has been processed through an AGC circuit (not shown). The switch 720 is operable to switch video to the monitor and auxiliary port, the switch 722 is operable to switch video to the SCM and the switch 724 is operable to switch video to the viewfinder. The address inputs A1 and A0 of the switch 720 are connected to the monitor select signals output by the output port OP0 and OP1 of the DUART 640, the address inputs A1 and A0 of the switch 722 are controlled by the OP2 and OP3 signals output by the DUART 640 and the address inputs A1 and A0 of the switch 724 are controlled by the signals VFINSCL1 and VFINSCL0 that are output by the DUART 640.

The output of the switch 720 is input to the base of the PNP transistor 726 through a series resistor 728. The collector of the transistor 726 is connected to a minus voltage supply and the emitter thereof is connected to a positive voltage supply through a series resister 730. The emitter of the transistor 726 is also input to the base of NPN transistors 732 and 734 through series resistors 736 and 738, respectively. The transistors 732 and 734 have the collectors thereof connected to the positive voltage supply and the emitters thereof connected to the negative supply through resistors 739 and 741, respectively. The emitter of the transistor 732 comprises the video output of the auxiliary port and the emitter of the transistor 734 comprises the video output for the NTSC/RGB decoder.

The output of the switch 722 is input to the base of a PNP transistor 740 through a series resistor 742. The transistor 740 has the collector thereof connected to the negative voltage supply and the emitter thereof connected to the positive voltage supply through a resistor 744. The emitter of the transistor 740 is also connected to the base of a NPN transistor 746. The transistor 746 has the collector thereof connected to the positive voltage supply and the emitter thereof connected to the negative voltage supply through a resistor 748. The emitter of the transistor 746 comprises the video output to the SCM. The output of the switch 724 is input to the base of an NPN transistor 750 through a series resistor 752. The transistor 750 has the collector thereof connected to the positive voltage supply through a resistor and the emitter thereof connected to the negative voltage supply through a series resistor 754. The emitter of transistor 750 is the video output to the viewfinder.

Referring to FIG. 19e, the output from the microphone is input to the negative input of an op amp 756 through a series configured capacitor 758 and resistor 760. The positive input of op amp 756 is connected to ground. A parallel configured capacitor 762 and resistor 764 are connected between the negative input and the output thereof. The op amp 756 is a preamplifier, the output of which is connected to the input of an enable switch 766. The enable switch 766 is controlled by the inverted microphone enable signal MICEN output by the data latch 648 (see FIG. 19c). The output of the enable switch 766 is connected to the negative input of an op amp 768 through a series configured capacitor 770 and resistor 772. A parallel configured capacitor 773 and resistor 774 are connected between the negative input of the op amp 768 and the output thereof. The positive input thereof is connected to ground.

The audio input from the SSIB is connected to the negative input of an op amp 776 through a series figured capacitor 778 and resistor 780. A parallel configured capacitor 782 and resistor 784 are connected between the negative input of the op amp 776 and the output thereof. The positive input thereof is connected to ground. The output of the op amp 776 is connected to the input of an enable switch 786 which is controlled by the SSIB enable signal SSIBEN which is output by the data latch 648 (see FIG. 19c). The output of the enable switch is input to the negative input of the op amp 768 through a series configured capacitor 788 and resistor 790. The op amp 768 therefore functions as a summing amplifier and an additional stage of gain in the audio path. The output of the op amp 768 comprises the microphone preamplifier output MPREOUT.

The microphone preamplifier output MPREOUT is input to the input of a voltage controlled amplifier (VCA) 792 through a series configured capacitor 794 and resistor 796. The output of the VCA 792 is input to the negative input of an op amp 798, the positive input of which is connected to ground. The output of the op amp 798 is connected to a node 800 through a series resistor 802. The output of op amp 798 comprises the microphone output to the switches 682, 684 and 686 for summing thereof. A parallel configured capacitor 804 and resistor 806 are connected between the negative input of the op amp 798 and the node 800. The VCA 792 is of the type 2150 manufactured by DBX Corporation.

The VCA 792 is controlled by a digital-to-analog (D/A) converter 808 which has the data inputs D0–D7 connected to the data bus 598. The select input is the DACSEL signal output by the DUART 640 and the Write input is connected to the inverted DACWR signal output by the decoder 646. The D/A converter 808 is a dual decoder with an A-output port and a B-output port labeled "OUTA" and "OUTB". The "OUTB" port is connected to the negative input of an op amp 810, the positive input of which is connected to ground. The output of the op amp 810 is connected to one of the control inputs of the VCA 792 and also the RFBB output of the D/A converter 808. A capacitor 812 is connected between the RFBB output and the OUTB output of the D/A converter 808. Two oppositely directed diodes 814 and 816 are connected in parallel between the output of the op amp 810 and ground to provide a voltage limiting function.

A second VCA 818 is also provided which is controlled by the D/A converter 808 and has the input thereof connected to the output of the analog gate 686 (see FIG. 19c) which provides the speaker audio and the signal is passed through a series configured capacitor 820 and resistor 822. The output OUTA of the D/A converter 808 is connected to the negative input of an op amp 824, the positive input of which is connected to ground. The output of the op amp 824 is connected to the control input of the VCA 818 and also to the RFBA output of the D/A converter 808. A capacitor 826 is connected between the OUTA and RFBA outputs. Two oppositely directed diodes 828 and 830 are disposed in parallel between the output of the op amp 824 and ground to provide a voltage limiting capability.

The output of the VCA 818 is connected to the negative input of an op amp 832, the positive input of which is connected to ground. A parallel configured capacitor 834 and resistor 836 are connected between the output through a resistor 837 and the negative input thereof. The output of the op amp 832 is connected to the input of an enable switch 838 which is controlled by the mute control signal MUTESPKR for the speaker which is output by the data latch 648 (see FIG. 19c). The output of the enable switch 838 is the corrected speaker volume level which is input to the positive input of an output driver 840 (see FIG. 19F) through a capacitor 842. The negative input of the driver 840 is connected to a node 844 through a capacitor 846, the node 844 being connected to ground through a series resistor 848. A series resistor 850 is connected between the node 844 and the output of the driver 840 with a capacitor 852 connected between the output and ground. The output is also connected to the speaker through a series capacitor 854.

The microphone preamp output MPREOUT (see FIG. 19e) is connected to a node 856 through a resistor 858. A capacitor 860 is connected between the negative input of an op amp 862 and the node 856. The positive input of the op amp 862 is connected to ground and the node 856 is also connected to ground through a series resistor 864. A capacitor 866 is connected between the node 856 and the output of the op amp 862, and a resistor 868 is connected between the negative input of the op amp 862 and the output thereof. The op amp 862 is configured as a bandpass filter.

The output of the op amp 862 is connected to the negative input of an op amp 880 through a series resistor 882 and also to the negative input of an op amp 884 through a series resistor 886. The op amp 880 has a diode 888 connected between the output and the negative input in a feedback configuration with the cathode thereof connected to the negative input. A diode 890 has the cathode thereof connected to the output of the op amp 880 and the anode thereof connected to a node 892. The node 892 is connected to the negative input of the op amp 884 through a series resistor 894. A series resistor 896 is connected between the node 892 and the negative input of the op amp 880. The op amp 884 has a resistor 898 connected between the output and the negative input thereof with the positive input thereof being connected to ground. The op amps 884 and 880 and the op amp 862 comprise an absolute value amplifier wherein the output of the op amp 884 is proportionally related to the absolute value of the input voltage. This voltage is compared with the detected output of the speaker on the driver output to the speaker for comparison in generating the VOX.

The output of the driver 840 for driving the speaker is input through a potentiometer 900 to the positive input of an op amp 902 and also to the negative input of an op amp 904 through a series resistor 906. The op amp 902 has a diode 908 connected in feedback between the negative input and the output with the cathode thereof connected to the output. A diode 910 has the anode thereof connected to the output of the op amp 902 and the cathode thereof connected to a node 912. The op amp 904 has a diode 914 connected between the negative input and the output thereof with the cathode connected to the output. A diode 916 has the anode thereof connected to the output of the op amp 904 and the cathode thereof connected to the output node 912. A resistor 918 is connected between the negative input of the op amp 904 and the node 912. A resistor 920 is connected between the negative input of the op amp 902 and the node 912. The op amps 902 and 904 are configured as a peak detector.

The node 912 is connected to positive input of a comparator 922 through a series resistor 924. The negative input of the comparator is connected through the wiper of a potentiometer 925 to the output of the op amp 884 which is the absolute value of the microphone preamp signal. An additional series resistor 926 is placed in series with the output of the op amp 884 and the potentiometer 925 with a switch 928 disposed thereacross. The switch 928 is controlled by a switch on the front panel for noisy and quite environments. When the resistor 926 is taken out of the circuit, this is equivalent to changing the threshold for the VOX. The comparator 922 compares the detected output from the speaker with the detected output from the microphone to output a signal when the detected output from the speaker is higher than that of the microphone.

The output of the comparator 922 is input to the negative input of an op amp 930 through a series resistor 932, the output of which comprises the VOX ON signal which goes to the interrupt timer circuit 624 (see FIG. 19b). The positive input of the op amp 930 is connected to the positive voltage supply through a resistor 952 and also to the output of the op amp 930 through a series resistor 954.

Mix Schematic

Figure 20A:
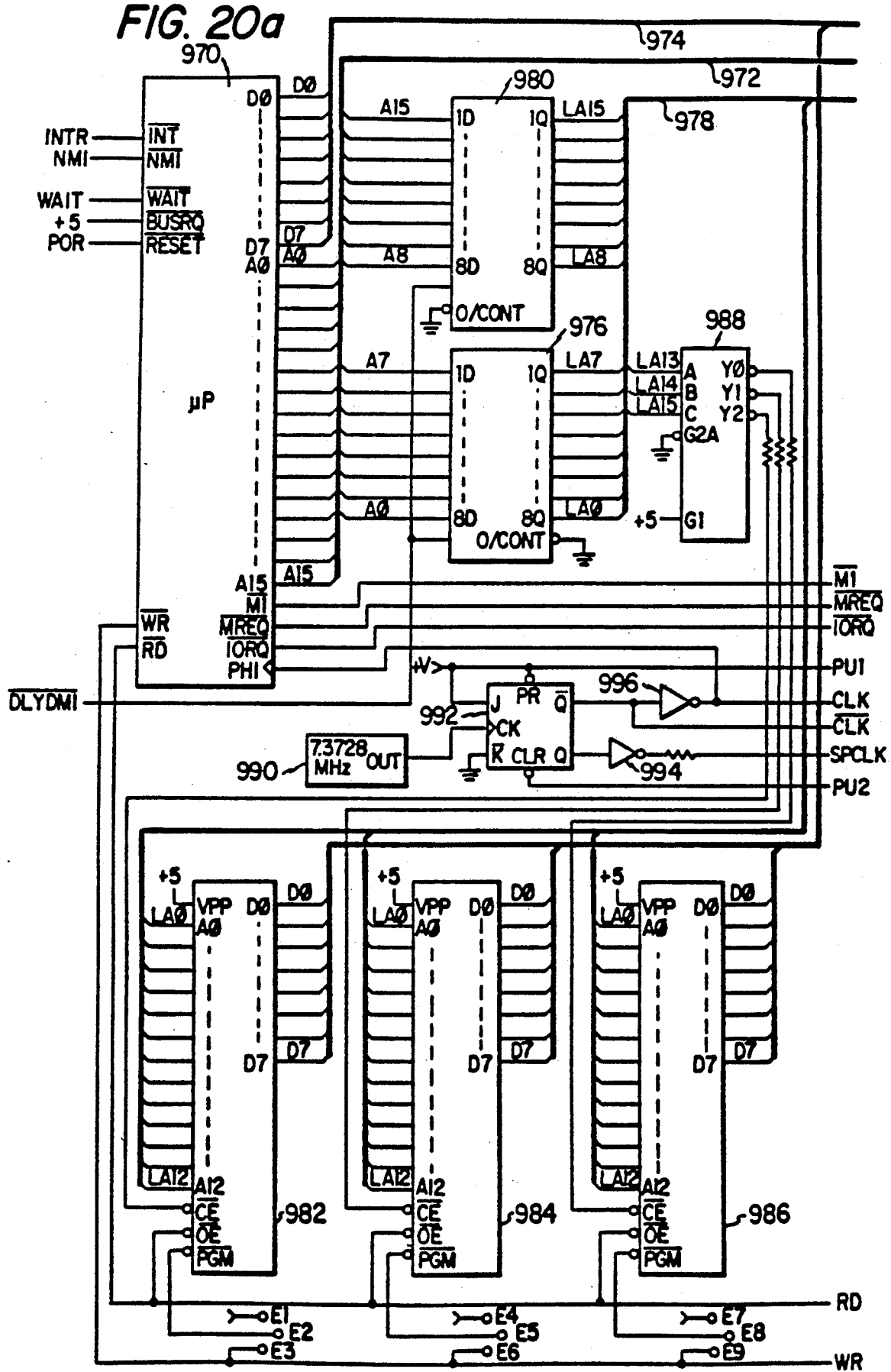
FIGS. 20a-20b illustrate schematics for the Mix switching network processor.
Figure 20B:
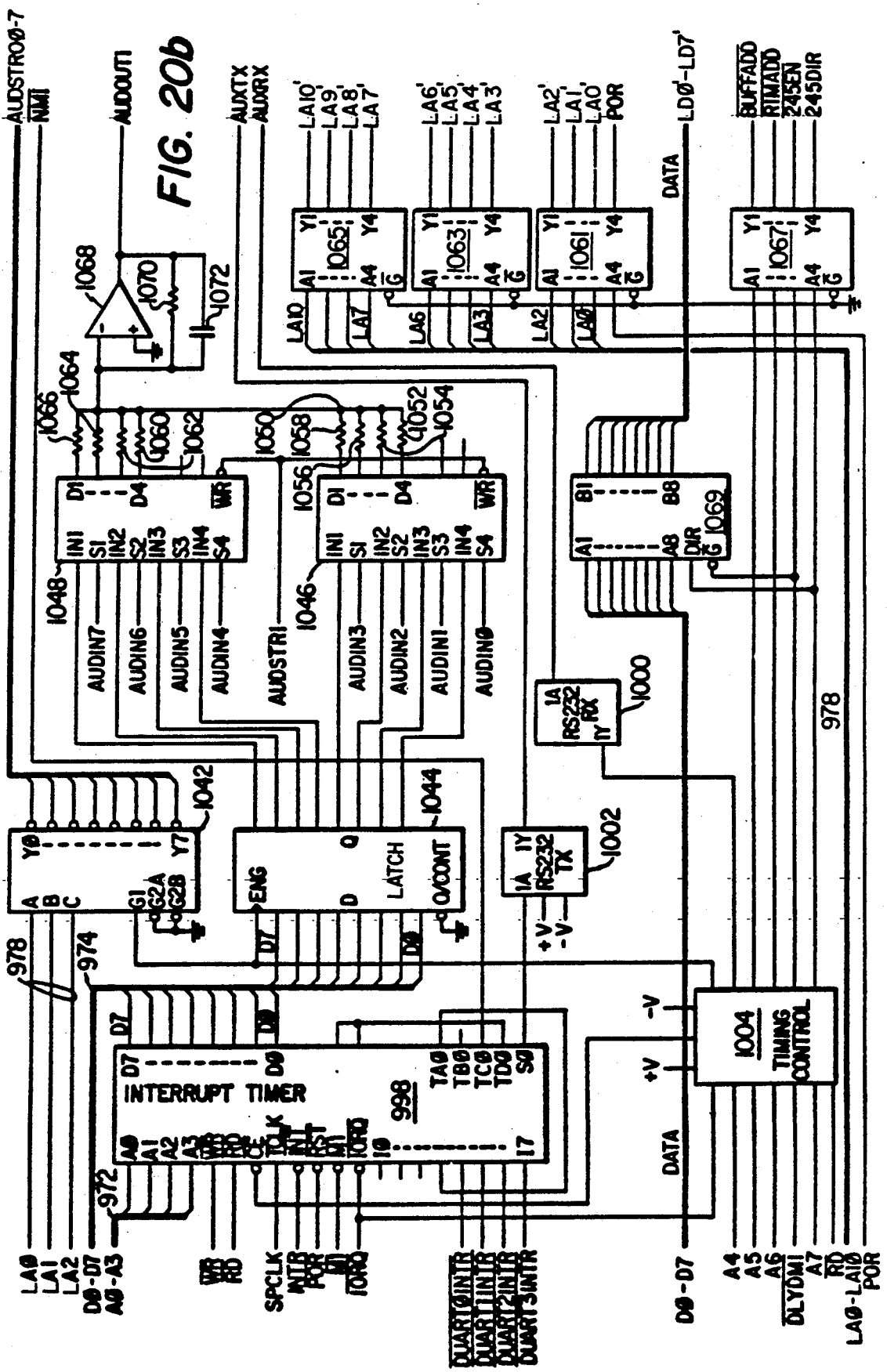
Figure 20C:
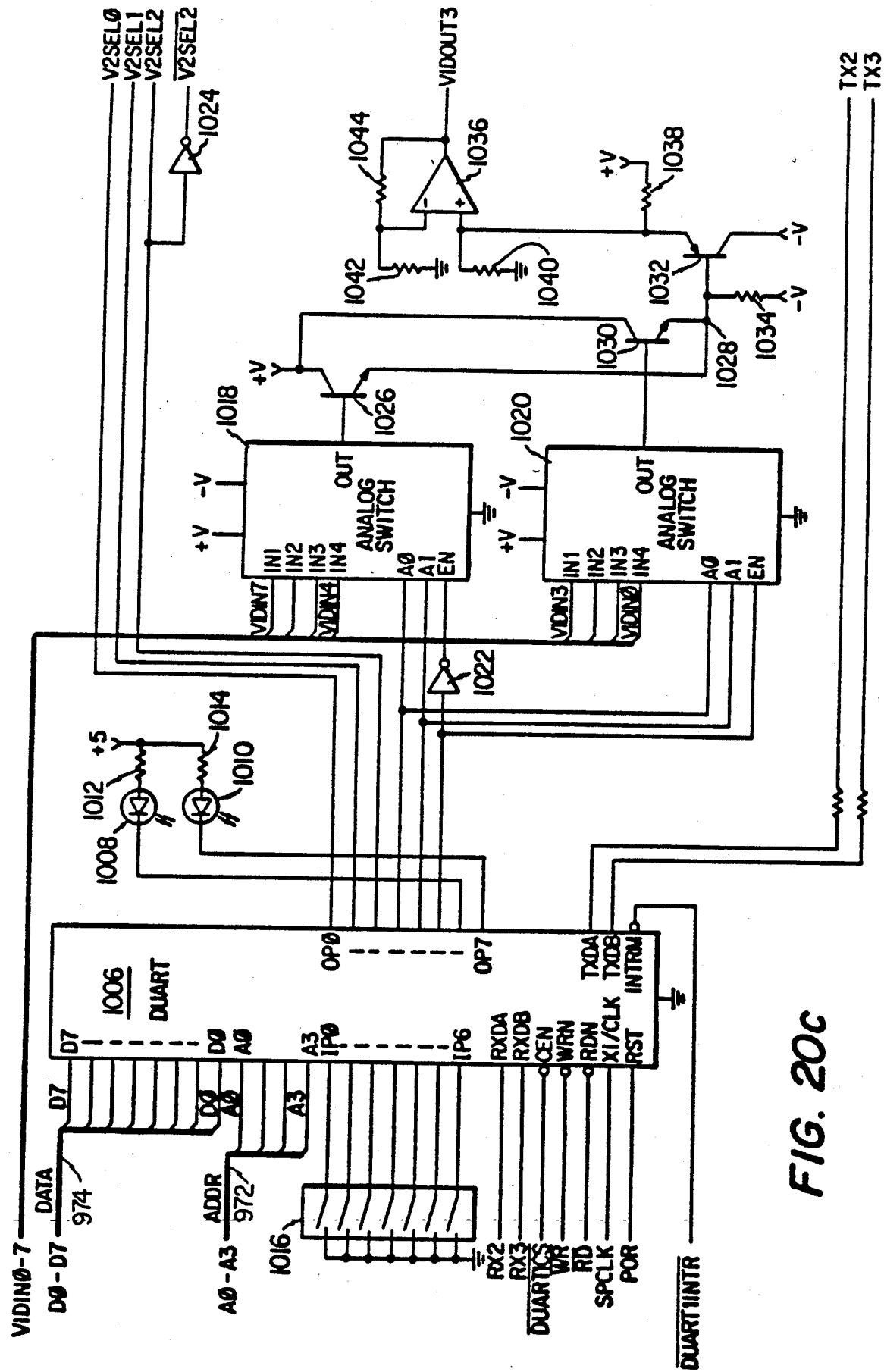

Referring now to FIGS. 20a to 20c, there is illustrated a schematic diagram of the processing portion of the Mix. A microprocessor 970 is provided that is identical to the microprocessor 594 in the Mate 10. The microprocessor 970 is of the type Z80A manufactured by Mostek Corporation and has a sixteen bit address attached to an address bus 972 and an eight bit data port interfaced with a data bus 974. The first eight bits of the address bus 972 are input to a D-type latch 976 to interface with the first eight bits of a latched address bus 978. The remaining eight bits of the address bus 972 are latched to the remaining eight bits of the latched address bus 978 through a D-type latch 980.

An EPROM 982 is provided that has the address inputs interfaced with the latched address bits LA0–LA12 on the latched address bus 978 and eight data outputs interfaced with the data bus 974. An Electrically Programmable Read Only Memory (EPROM) 984 and a Random Access Memory (RAM) 986 are provided, each having the address inputs interfaced with LA0–LA12 on the latched address bus 978 and the eight bit data outputs interfaced with the data bus 974. The chip enable inputs of the EPROM 982, the EPROM 984 and the RAM 986 are connected to outputs of a three-to-eight decoder 988, which has the address inputs thereof connected to the latched address bus 978. The three-to-eight decoder 988 is activated by internal timing control signals for selection thereof and decoding of the input latched address bits LA13–LA15.

A reference oscillator 990 is input to the clock input of a J-K flip-flop 992, the Q-output of which is input through an inverter 994 to provide a clock signal SPCLK and the inverted Q-output of which is passed through inverter 996 to provide the clock signal for the microprocessor 970. The SPCLK provides timing signals, for the remainder of the processing section of the Mix. Referring to FIG. 20b, an interrupt controller 998 is provided which is similar to the interrupt timer controller 624 on the Mate 10. The data ports the interrupt timer controller 998 are interfaced with the data bus 974 and the address inputs are interfaced with the address lines A0–A3 on the address bus 972. The serial input (SO) of the interrupt timer 998 is connected to the output of an RS-232 receiver circuit 1000 and the serial output of the interrupt controller timer 998 is connected to the input of an RS-232 transmitter circuit 1002. The serial input data of the RS-232 receiver circuit 1000 is provided from the auxiliary input port, and the transmit output of the RS-232 transmit circuit is connected to the auxiliary transmit port. The interrupt timer controller 998 provides various interrupt requests and other controls similar to the interrupt timer 624 in the Mate and is interfaced with a bus timing control circuit 1004, which provides various control signals for bus timing. These are signals such as chip selects, etc. for the various chips in the circuit.

Referring to FIG. 20c, the Mix has eight ports for receiving audio, data and video. The demodulated serial data is received and processed by UARTS. In the preferred embodiment, dual UARTS (DUART) are utilized. For simplicity purposes, only one DUART 1006 is illustrated for receiving serial data Rx2 from port two and Rx3 from port three and transmitting serial data Tx2 to port two and Tx3 to port three. The data inputs D0–D7 are interfaced with the data bus 974 and the address inputs are interfaced with the address bits A0–A3 on the address bus 972.

The DUART 1006 has parallel output ports OP-0–OP7 and parallel input ports IP0–IP6. The parallel output ports OP0–OP2 are operable to generate a three bit select word for selecting one of eight video lines corresponding to port two and the parallel output lines OP3–OP5 comprise a three bit word for selecting one of eight video lines for connection to port three. The parallel output lines OP6 and OP7 are connected to the cathodes of LED's 1008 and 1010, respectively, to provide status signals. The LED's 1008 and 1010 are connected to a positive supply through voltage dropping resistors 1012 and 1014, respectively.

The parallel input lines IP0–IP6 are each connected to ground through a switch input of the dual-in-line package (DIP) switch 1016. The switch 1016 is operable to provide an address such as the Mix ID or the configuration of the Mix. These are similar to the switches 426–432 in FIG. 16. The READ and WRITE function of the DUART 1006 is controlled by the microprocessor 970 (see FIG. 20a) and the chip select function is controlled by the bus timing and control circuit 1004 (see FIG. 20b). The Reset comes from a Power On Reset signal (POR) generated from a reset circuit (not shown).

The video select line of each of the DUARTS, as described above, is a three-bit word which determines which of eight video ports is selected for association with a particular video port. Each of the three-bit video select words is input to an eight-to-one analog switch for receiving the video output from the SCM from each of the eight ports and selecting one of them in conjunction with the signal. For simplicity purposes, only the eight-to-one multiplexer for port three will be described in detail.

The eight-to-one video switch for port three is comprised of a four-to-one analog switch 1018 and a four-to-one analog switch 1020. The switch 1018 receives on the four inputs thereof the signals VIDIN4–VIDIN7 corresponding to video inputs from ports four to seven. The switch 1020 receives the video input signals VIDIN0–VIDIN3 corresponding to video signals from the ports zero through three. The address inputs A0–A1 of the switches 1018 and 1020 are connected to the select signals V3SEL0 and V3SEL1, at outputs OP-3–OP4 of DUART 1006. The enable input of the switch 1020 is connected to the select signal V3SEL2 at output OP5 of DUART 1006. The enable signal of the switch 1018 is connected to the inverted form of the select signal V3SEL2 which is passed through an inverter 1022. The inverted form of a select signal V2SEL2 is also received from an inverter 1024 for use with the eight-to-one switch associated with port two (not shown). The switch are of the type HI524 manufactured by Hitachi.

The output of the switch 1018 is input to the base of an NPN transistor 1026, the collector of which is connected to a positive voltage supply and the emitter of which is connected to a node 1028. The output of the switch 1020 is connected to the base of an NPN transistor 1030, the collector of which is connected to the positive voltage supply and the emitter of which is connected to the node 1028. The node 1028 is connected to the input of a PNP transistor 1032. The transistors 1026, 1030 and 1032 are video transistors that operate at video frequencies.

The transistor 1032 has the base thereof connected to a negative supply through a resistor 1034 and the collector thereof connected to the negative supply. The emitter of transistor 1032 is connected to the positive input of a video op amp 1036 and also to a positive supply voltage through a resistor 1038. The emitter is also connected to ground through a resistor 1040. The negative input of the video op amp 1036 is connected to ground through a resistor 1042 and also to the output thereof through a resistor 1044. The video op amp 1036 is of the type HA-5195 manufactured by Harris Semiconductors. The output of the op amp 1036 is the video output VIDOUT3 for port three.

In operation, the three-bit select word selects one of the ports on each of the switches 1018 and 1020 and also enables only one of the switches 1018 and 1020. The transistors 1026 and 1030 on the outputs of the switches 1018 and 1020 are connected in parallel such that the signal appearing on node 1028 is comprised of only one video signal. Therefore, the switches 1018 and 1020 do not have the outputs thereof summed.

Referring to FIG. 20b, the audio switching utilizes a three-to-eight decoder 1045 and an octal D-type latch 1044. The three address inputs of the decoder 1042 are connected to the address bits LA0–LA2 of the latched address bus 978 and the eight outputs provide the audio write lines AUDSTR0–AUDSTR7. The D-type latch 1044 has the D-inputs thereof connected to the data bus 974 with the eight outputs thereof constituting the audio select lines. Both the decoder 1042 and the latch 1044 are enabled by the bus timing and control circuit 1004.

The demodulated audio inputs AUDIN0–AUDIN7 from the SCM are input to eight eight-to-one summing switches such that the audio from all eight ports can be summed and output to each of the ports. This is utilized in the conference mode. This is to be distinguished from the video switch wherein only one video can be selected and transmitted out from the Mix. For simplicity purposes, only the audio switch for port one will be described.

A quad analog gate 1046 has the audio inputs AUDIN0-AUDIN3 input to the four inputs thereof and the control signals AUDSWD0-AUDSWD3 output from latch 1044 connected to the respective control inputs thereof. A quad analog gate 1048 has the audio input signals AUDIN4-AUDIN7 connected to the four inputs thereof and the control inputs AUDSWD4-AUDSWD7 output from latch 1044 input to the control input thereof. Both of the quad analog gates 1046 and 1048 are selected by the WRITE line AUDSTR1 output by the decoder 1042.

The four outputs of the quad analog gate 1046 are connected to a common node 1050 through resistors 1052, 1054, 1056 and 1058, respectively. The four outputs of the quad analog gate 1048 are connected to the node 1050 through series resistors 1060, 1062, 1064 and 1066, respectively. The node 1050 is connected to the negative input of a summing op amp 1068, the positive input of which is connected to ground. A resistor 1070 is connected between the negative input and the output thereof and a capacitor 1072 is connected in parallel with the resistor 1070. The output of the op amp 1068 comprises the audio output AUDOUT1 for port one.

To interface with the local area network on which the Network Master resides, it is necessary to provide timing signals for the LAN interface module. The latched address data on the latched address bus 978 is input to line drivers 1061, 1063 and 1065 to buffer the address bits LA0-LA10 for output to the LAN interface card. The output is labeled LA0'-LA10'. In addition, a buffer 1067 is provided to buffer timing signals from the bus timing and control circuit 1004. The data from the data bus 974 is buffered through a bidirectional transceiver 1069 for output to the LAN address bus.

Network Messages

During communications on the network, the Network Master controls the video and audio data links on the network, maintains an updated table of network status and also constantly updates the status of the network. Communications between the Network Master, the Mixes and the various Mates is through the 9600 baud serial data link when the Network Master resides in one of the Mixes. As described above, the serial data is FM modulated on a subcarrier and then modulated onto a primary carrier of 70 MHz or 170 MHz, depending upon the direction of transmission on the SCM line. It provides a two-way data path between Mates and their associated Mixes, between Mixes in the Slave mode and the Network Master and between the Network Master and the Mixes. When the Network Master resides in the central processor or a LAN, the data link between the Network Master and the Mixes is through the LAN.

The messages that are transmitted between various devices on the network are System messages, Control messages or Data messages. System messages concern the validation and synchronization of network communications and are messages such as Link Requests and Responses, Statistics Requests and Responses, Communication Errors, Notification of Power-On and/or Resets and Acknowledgements. Although some System messages require responses, as will be described hereinbelow, other System messages do not require an answer from the receiving device and merely perform a notification function. Control messages initiate a communications exchange between two devices. They inquire about status, control video intercom calls and adjust the Mates audio and video input and output. Data messages are answers to control messages, usually not requiring a response.

When a message is placed onto the network, it is addressed to a specific device and coded with the originating device's ID and routed to the port on which the addressed device resides. The messages are comprised of a header portion which includes a source ID, the destination ID, the length of data in the message, the system ID and the task ID. A second portion is dedicated to the message content and a third portion is dedicated to error control and is generally referred to as "vertical redundancy check" (VRC). The source ID identifies the device from where the message was originated and the destination ID identifies the device that is to receive the message. The length of data portion indicates a number of bytes remaining in the message up to but not including the VRC portion. The system ID distinguishes all video conferencing messages from all other types. The task ID contains information regarding the port number and the retry bit. The message content is comprised of approximately one to twenty-five bytes of data and provides conferencing control and verification of communication. As described above, the VRC portion verifies reliability of data.

The device identification ID is a two-byte number used to determine the source or destination of a video intercom network message. In the message, the device ID is represented with the least significant byte first. In the preferred embodiment, the Network Master is always provided a device ID of "00", the Mixes are provided device ID's of between "01" through "255" and the Mates are provided device ID's of between "256" through "9999". The SSIB and the local processor are provided with the same ID for all the Mates in the system since only one communication path is provided therebetween.

The task ID is comprised of one byte of data which is divided into two fields. The first field is four bits wide and it provides the port number which is the port used to send and receive messages. In the Mate, a value of "0" indicates communication with either the Mix or the Network Master. A value of "1" indicates communication with the local processor and a value of "2" indicates communication with the SSIB. The second field is the retry bit. The retry bit is either a value of "0", indicating that it is an original message or at a value of "1", indicating retransmission. This byte is utilized to indicate to the receiving device that the message is a retry in the event that prior data was received and the only error was that the acknowledgement was not received by the originating device. In this instance, the receiving device knows that the data is redundant and all that is required is to resend the acknowledgement signal.

Placing Call with Mate

Figure 21:
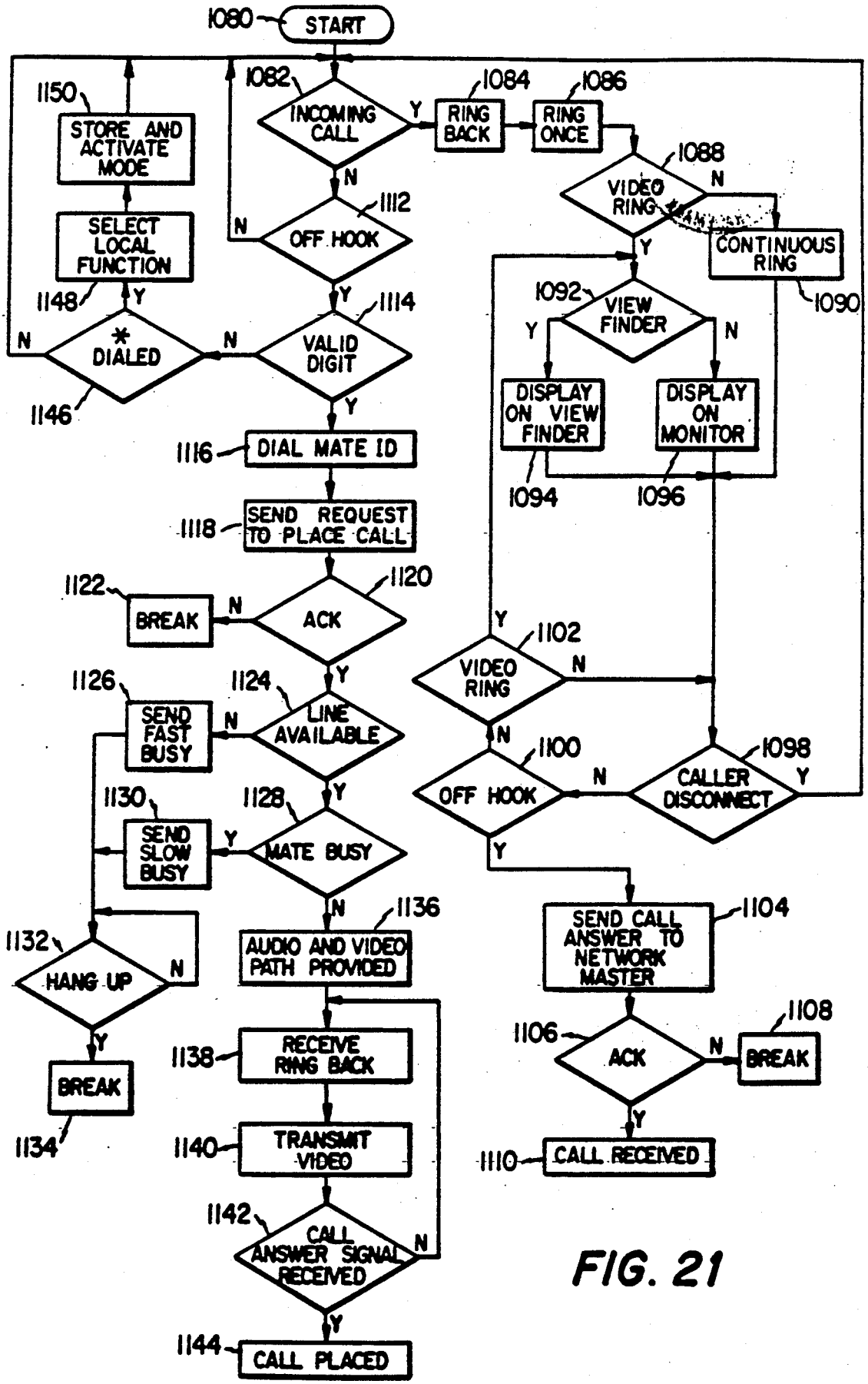
FIG. 21 illustrates a flowchart for placing and receiving a call at the Mate remote video terminal.

Referring now to FIG. 21, there is illustrated a flowchart for the operation of the Mate when placing a call over the network. The program is initiated at a START block 1080 and proceeds to a decision block 1082 to determine if an incoming call has been received. This is the idle state of the Mate wherein it waits to see if some form of incoming message is received from the data port. Although the message may be received from the local processor, this situation is not included in the flowchart of FIG. 21 for simplicity purposes.

There are two messages that can be received. If the message is from the Network Master, this is an incoming call and a message is in the form of a "Request for an Incoming Call" from the Network Master. This is illustrated by the "Y" path from the decision block 1082 to a function block 1084 to provide a Ring-Back which is input to the SCM cable 16 for transmission to the originating Mate. When the Mate receives the Request for Incoming Call message, the Mate acknowledges with an Accept response, turns on the camera, turns off the auxiliary audio and then provides a single "Ring" output to the user, as indicated by a function block 1086. This ring is in the form of a "chime". However, this signal could be routed through the SSIB 18 to the secretary's phone. The program then flows to a decision block 1088 to determine if the "Video Ring" feature has been selected. If it has not been selected, the program flows to a function block 1090 to provide a continuous ring output.

If the Video Ring feature has been selected, the program flows to a decision block 1092 to determine if the viewfinder has been selected as the display for the incoming call. If yes, the program flows along the "Y" path to a function block 1094 and displays the incoming video on the viewfinder. However, if the viewfinder has not been selected, the program flows along the "N" path to a function block 1096 to display the incoming video on the monitor.

When receiving an incoming call, the first decision that has to be made by the Network Master is whether a path is available. If the path is available, then the Network Master must determine if the Mate is busy. This information is contained in status tables at the location of the Network Master. Once it is determined that both a path is available and the destination Mate is not busy, the audio and video link is made and the status tables in the Network Master updated regarding the use of audio/video paths. The result is that the audio and video from the originating Mate, if transmitted, are connected to the actual interface between the destination Mate and the rest of the network. Therefore, the destination Mate can determine whether to receive the video and/or the audio. Of course, the originating Mate can inhibit transmission of either. The Video Ring function allows the user at the destination Mate to view the caller prior to actually receiving the call or going "Off Hook". If the user wishes to confer with the originating Mate, he can do so by going to the "Off-Hook" condition. However, he can allow the system to stay in a continuous Ring-Back condition until the other party disconnects.

After determining the mode by which the user at the destination Mate is notified of an incoming call, the program flows to a decision block 1098 to determine if the caller or the originating Mate has disconnected. If the call has been disconnected, the program flows along the "Y" path back to the idle state at the input of the decision block 1082 to await for another incoming call. However, if the caller has not disconnected, the program flows to a decision block 1100 to determine if the Off-Hook condition has occurred. This condition occurs when the user at the destination Mate either lifts the handset that is connected to the SSIB or presses the "*" button on the keypad or presses the mode button. If the user has not gone Off-Hook, the program flows along the "N" path thereof to a decision block 1102 to determine if the Video Ring function has been selected. If not, the program flows along the "N" path thereof back t the input of the decision block 1098 to determine if the caller is disconnected. If the Video Ring function has been selected, the program flows along the "Y" path thereof back to the input of the decision block 1092 to determine where to display the caller.

In the Off-Hook mode, the program flows along the "Y" path from the decision block 1100 to a function block 1104 to send a "Call Answered" message back to the Network Master. This message is generated whenever the destination Mate is chiming to signal an incoming call and it has detected the "*" keystroke, mode button pressed or sensed an Off-Hook condition. As described above, this message is sent to the Network Master and not to the originating Mate. This is facilitated by inserting the ID "00" of the Network Master into the message as the destination ID. Once the message is sent, the program flows to a decision block 1106 labeled "ACK" to indicate an "Acknowledge" decision. Each time a message is sent from the Mate to the Network Master or a Mix in the Slave mode, an acknowledgement must be received. If the acknowledgement is not received, the program flows along the "N" path to a function block 1108 labeled "BREAK" to indicate a termination of the call since lack of an acknowledgement indicates a problem in the network. When the proper acknowledgements have been received, the program flows along the "Y" path to a function block 1110 to indicate that the call has been received.

Referring further to FIG. 21, the Mate in the idle mode also looks for an Off-Hook condition. This is evidenced by the "N" path from the decision block 1082 through decision block 1112 wherein the Mate decides if it is Off-Hook. If not, the program flows along the "N" path back to the input of the decision block 1082 and, if it is Off-Hook, the program flows along the "Y" path to decision block 1114. In the preferred embodiment, the only invalid digit is a "7". Any other digit is valid. However, the keys "*" and "#" are also not digits and cause the program to flow along the "N" path from the decision block 1114.

If a valid digit is selected, the program flows from the decision block 1114 along the "Y" path to a function block 1116 wherein the ID of the destination Mate is dialed. After the ID is dialed, the Mate sends a "Request to Place Call" message to the Network Master, as indicated in a function block 1118. As described above, the initial portion of the message contains the ID of the originating Mate and also the ID of the Network Master which is "00". This is followed by a specific message number which is recognized by the Network Master as the "Request to Place Call" message. This message contains the ID of the destination Mate. After sending the "Request to Place Call" message, the program flows from the function block 1118 to a decision block 1120 to determine if the message was acknowledged. If not, the program flows to a function block 1122 to break and, if acknowledged, the program flows along the "Y" path to a decision block 1124 to determine if the system has sent back a "Response to Call Request" message to indicate that a line is available. This message is received from the Network Master and indicates first if a line is available and, second, if the destination Mate is busy. The decision block 1124 determines whether the line is available. If a data link or line is not available, the program flows along the "N" path to a function block 1126 and a "Easy Busy" signal is transmitted by the Mate to the user through the speaker or hand set. If, however, a line is available, the program flows along the "Y" path from the decision block 1124 to a decision block 1128 to determine if the destination Mate is busy. If the destination Mate is busy, as indicated by the Network Master, the program flows along the "Y" path to a function block 1130 and a "Slow Busy" signal is transmitted through the speaker or hand set to the user of the originating Mate. After either the Fast Busy or Slow Busy signal is sent, the program flows to a decision block 1132 to determine if the user has hung up. If not, the program flows back around the "N" path back to the input thereof. If the user hangs up, the program flows to a function block 1134 to break.

If both a line is available and the destination Mate is not busy, the program flows along the "N" path from decision block 1128 to a function block 1136 wherein the Network Master effects a connection between the originating Mate and the destination Mate such that audio and video can be transmitted to and received from the destination Mate. The originating Mate connects its camera to the video output such that video is transmitted to the destination Mate and connects the received audio from the destination Mate to the speaker such that the Ring-Back signal can be received from the destination Mate. By allowing the destination Mate to generate the Ring-Back, immediate aural feedback is provided as to the connection.

After connection, the program then flows to a function block 1138 to receive the Ring Back signal, then to a function block 1140 to transmit the video and then to a decision block 1142 to determine if the "Call Answered" message has been received from the Network Master. The Network Master sends this message after it receives the "Call Answered" message from the destination Mate. Until the "Call Answered" message is received, the program flows around the "N" path back to the input of the function block 1138 to continue receiving the Ring-Back signal on the audio path and transmitting video on the video path.

After the "Call Answered" message is received, the program flows along the "Y" path to the function block 1144 to indicate that the call has been placed. The Mate then sends an acknowledgement back to the Network Master that it has received the message and then connects the microphone and auxiliary input to the audio SCM output. The video SCM input is connected to the monitor and an auxiliary video output to view the user at the destination Mate. In addition, the camera is connected to the viewfinder such that the user can view himself to ensure that he is in the field of view and in focus. This gives him an immediate visual feedback of what the user at the destination Mate is viewing.

In passing messages between the Mate and the Network Master, it is necessary to ensure that the data has arrived with no inaccuracies. When the Mate transmits a message, it must receive an acknowledgement from the receiving device. For example, if the Mate receives a message from the Network Master, it has to determine if this is the first message or if it is a retry. A retry would occur if the Network Master sends a System message to the Mate and the Mate either does not receive the message and acknowledge it or the Network Master does not receive the acknowledgement back from the Mate. In this instance, the Network Master would again send the message but would set the retry bit in the message to indicate that this message had been previously sent. If the retry bit is not set, it recognizes this as an initial message and stores the message and sends back an acknowledgement to the Network Master. If, however, the retry bit is set, the Mate must compare this message with the last received message from the Network Master. If they are the same, this indicates that the acknowledged message was not received by the Network Master and the Mate retransmits the acknowledge message. If the Network Master does not receive the acknowledge message, there is a fault somewhere in the return path and this is denoted as a system fault.

When the Mate transmits a Control message, it operates similar to the Network Master in that it sends the first message and waits for an acknowledgement. It sets a timer to time the amount of waiting time for retransmitting the message. If no acknowledgement has been received when the timer times out, the retry bit is set and the message retransmitted. After three times, the Mate transmits a reset signal and returns to the idle position. If, however, the correct acknowledgement was received, the Mate then proceeds with the next step in executing the message.

From the viewpoint of the user, the Mate acts like an ordinary telephone with the exception that video is provided. During the placing of a call, the user first goes to an Off-Hook mode which normally consists of pressing the "*" key on the keypad of the SSIB or picking up the handset that is interfaced with the SSIB. The user then dials the ID of the destination Mate, which is normally a two-digit number. For larger networks, this number can be up to four digits. When interfacing with another network over some form of long haul network, additional numbers can be utilized. The number of digits required for various telephone numbers is a matter of the designers choice.

After the number has been dialed, the user will receive either a Fast Busy tone, a Slow Busy tone or a Ring-Back signal. The Fast Busy tone indicates that a line is not available for interconnecting the call, a Slow Busy tone indicates that the destination Mate is busy or occupied and a Ring-Back indicates a connection. As soon as the destination Mate goes Off-Hook, the user's video is placed on the viewfinder with the video from the destination Mate displayed on the monitor. The conversation can then take place as normal.

In receiving a call, the user of the destination Mate receives a chiming signal generated by his own Mate. If the Video Ring feature is selected, the user at the originating Mate will be displayed on the viewfinder during the chiming. This is accomplished by having the Network Master provide a signal to the originating Mate to turn its camera on and the destination Mate receiving the video and placing it on to the viewfinder. The caller then has the option to go Off-Hook or ignore the call.

Referring further to FIG. 21, the user can select a special function by not dialing a valid digit at the decision block 1114 such that the program flows to a decision block 1146 to determine if a "*" was dialed. If not, this indicates that a "#" or a "7" has been dialed and the program flows along the "N" path thereof back to the input of the decision block 1082. If the "*" were dialed, the program flows to a function block 1148 wherein a special function is selected by dialing the appropriate key numbers. Special functions are special numbers that directly adjust the audio and video input and output of the multifunction work station. They allow the user to connect audio and/or video to the work station and auxiliary equipment during the idle mode, connect audio and/or video to the network as well as local devices during the conference mode, direct video switching during a conference involving three or more parties and perform diagnostic functions.

After the special function has been selected by dialing the two digit number in the function block 1148, the program proceeds to a function block 1150 to store the digits and activate the mode and then return to the idle mode. The first digit of the special function determines the various input devices or the class of the functions that are selected, as outlined in Table 1.

TABLE 1

| DIGIT | INPUT CODE |
|---|---|
| 0 | Blank or "turn off" |
| 1 | Local Processor |
| 2 | Camera |
| 3 | Auxiliary (either audio or video) |
| 4 | Microphone |
| 5 | Network Line |
| 6 | Sound Generator |
| 7 | Network Functions |
| 8 | Special Pre-Defined Configurations |
| 9 | Special Diagnostics |

The second digit defines the specific network or diagnostic function or the output audio and/or video device that is utilized. For example, if the first digit defines an audio and/or video device or function thereof, the second digit would define the output device as outlined in Table 2.

TABLE 2

| DIGIT | OUTPUT DESTINATION |
|---|---|
| 0 | Off or Default |
| 1 | Monitor and Auxiliary Output |
| 2 | Viewfinder |
| 3 | Auxiliary Audio Output |
| 4 | Speaker/Handset Speaker |
| 5 | Network line |

When selecting a special function, the user goes Off-Hook wherein a main dial tone is heard and then dials "*" and a high pitch tone is heard. The special function number is dialed and the corresponding special function stored. If it is an invalid special function, a Fast Busy signal is transmitted and the user dials "#" to return to idle.

The special functions are defined as either local functions, network functions or diagnostic functions. Local functions are primarily confined to use within the multi-function work station apart from the network. These local functions can be utilized during a call or when the Mate is idle. For example, if the user dials "**11" the local processor video is displayed on the monitor while a video tape or some similar device connected to the auxiliary video input is watched on the viewfinder. If the user dials a "15" during a call, the local processor display is output on the video to the network so that the destination Mate in a two-way conference can receive this information or, alternately, all of the destination Mates in a conference. If the user dials "16", he can adjust his monitor for underscan to receive the local processor display that a second Mate transmits during a conference. Additionally, the user can dial "65" during a conference such that synthesized sounds from the local processor can be transmitted on the audio path.

The network functions are generally utilized only during a call and begin with the digit "7". For example, when a "71" is dialed a video conference is locked onto a particular individual, as will be described hereinbelow.

Diagnostic functions allow the user to check connections and install new networks. These are utilized for such things as switching the sound generator to the audio SCM line or the audio SCM line to the speaker/handset. Additionally, any Mate can be turned into a central test site to service networking checks.

Mode Switch

There are basically three modes of operation for controlling the generation and transmission of audio and video: the idle mode, the conference mode and the holding mode. In the idle mode, the Mate can accept an incoming call whereas a conference mode indicates communications on the video network. The hold mode is utilized when the user is conceptionally in a conference mode but when no network communication (i.e. SCM input/output) is enabled.

Each mode has three separate settings for the audio and video input/output controls. These settings are controlled by a mode switch on the front panel of the Mate wherein sequential pressing of the mode switch causes the settings to sequence through in a predetermined manner. In the preferred embodiment, there are three settings for each of the above described modes with the mode button sequencing from the first setting to the second setting to the third setting and back to the first setting in a cyclical manner. These settings provide the user with some additional versatility.

In the idle mode, the first setting places the output from the local processor onto the monitor and turns the camera off such that the viewfinder is blank. In the second setting, the camera is turned on and the video output therefrom is displayed on both the monitor and the viewfinder. In the third setting, the user can select one of the local functions to define the video output of either the viewfinder or the monitor and also the audio output from the speaker. If no local function is selected, the video from the auxiliary input is selected for display on both the viewfinder and the monitor. By sequentially pressing the mode button, three settings can be stepped through in a cyclical manner, as described above.

In the holding mode, the user's Mate is in a conference but the Network Master has placed it on hold, as will be described hereinbelow. In this mode, the Mate is instructed to "loop back" its video such that the viewer is receiving his own video output In the first setting during the holding mode, the local processor is displayed on the monitor and the camera output is displayed on the viewfinder. In the second setting, the camera output is displayed on both the monitor and the viewfinder. In the third setting, either the predefined local function is selected for display on the monitor or the auxiliary input is displayed on the monitor with the camera output being displayed on the viewfinder. These three settings, as described above, can be stepped through with the use of the mode button. During this mode, the microphone is maintained in an "on" position but no audio is being transmitted.

In the conference mode with an ongoing conference, the first setting displays the local processor on the monitor, displays the received video from the network through the SCM on the viewfinder and transmits the output of the camera to the SCM. In the second mode, the video from the SCM is displayed on the monitor and the camera output is displayed on the viewfinder and transmitted to the network through the SCM. In the third setting, either the predefined local function or the auxiliary input is displayed on the monitor and transmitted to the SCM and the received video from the SCM is displayed on the viewfinder. The microphone is maintained on to provide an audio data link regardless of the video setting.

Adding a Party-Mate

Referring now to FIG. 22, there is illustrated a flowchart for adding a party to the conference. The flowchart begins at a START block 1152 and proceeds to a decision block 1154 to determine if a "*" has been dialed. If no "*" has been dialed, the program returns along the "N" path back to the START block 1152 to continue the conference as is. If, however, a "*" is dialed, the program flows along a "Y" path to a function block 1156 to place a call in accordance with the procedure of FIG. 21 by sending a "Request to Place Call" and receiving the response to this request from the Network Master. When a line is available, the Network Master places all the remaining calls in "Hold". In this state, the video is not output from each of the Mates but, rather, is looped back such that the individuals in the conference are viewing their video output. As described above, the response from the Network Master can indicate that there is no line available. In which case, a Fast Busy is returned or a Slow Busy signal is output if the destination Mate is busy. During the placing of a call, the function block 1156 proceeds to a decision block 1158 to determine if an error has occurred in placing the call, such as misdialing a number, etc. If an error is present, an error tone is produced requiring the user to press the "#" key and the program then flows along the "Y" path back to the input of the decision block 1154. If no error is present, the procedure for placing the call continues on the "N" path to decision block 1160 to determine if the originating user has hung up. If the user has hung up, the program returns along the "Y" path back to the input of the decision block 1154 and a conference is returned to normal. If the user does not hang up, the program proceeds along the "N" path to a decision block 1162 to determine if the call has been placed. If the call has not been placed, the program proceeds along the "N" path back to the input of the decision block 1158 to continue the procedure for placing the call, determining if there is an error and determining if the user has hung up.

If the call has been placed, the program proceeds along the "Y" path to a function block 1164 to add the contacted party to the conference table. The Mate does not add the party to the conference table but, rather, the Network Master adds this party to the conference table. After the call has been placed and the party added to the conference table, the program proceeds to a decision block 1166 to determine if a "#" key has been depressed. If this key has not been depressed, the program proceeds to a function block 1168 to indicate that the originating Mate and the recently contacted Mate or added party remain in a two-way conference. This continues until the "#" key is depressed, at which time the program flows along the "Y" path to a function block 1170 to return both parties to the conference. If the new party added to the conference does not wish to remain in the conference, he can merely hang up, at which time the Network Master will update the status of the conference table and remove this party from the conference table.

As will be described hereinbelow, there is a priority as to video switching between the Mates in the conference since only one video can be transmitted to any one of the Mates at a given time. Each Mate is designated in the Network Master's tables as either a primary Mate, a secondary Mate or an M-ary Mate. The primary Mate has its video transmitted to all of the lower order Mates in the conference with the video from the secondary being received by the primary. The video from the M-ary does not get received by any of the Mates in the conference. The rearrangement of priorities will be discussed hereinbelow with reference to the operation of the Mix and the Network Master.

Conference Lock-Mate

Referring now to FIG. 23, there is illustrated a flowchart of the procedure for locking a single Mate as the Primary during a conference. The program is initiated at a START block 1172 and proceeds to a decision block 1174 to decide if the user has dialed *71. If not, the program proceeds along the "N" path back to the input thereof until the appropriate digits have been dialed. When dialed, the program proceeds along a "Y" path to a function block 1176 to send the Request to Lock Conference to the Network Master. The program then proceeds to an acknowledgement decision block 1178 to determine if the Network Master has received the message and, if not, the program flows along the "N" path to a function block 1180 to break back to the main program. If the acknowledgement is received from the Network Master, the program flows along the "Y" path to a function block 1182 wherein the Mate is in the Lock Conference mode. However, the Network Master controls the operation of the network and is responsible for determining whether the requesting Mate can lock a conference. This determination is made depending upon whether another individual has already locked the conference. For example, if a conference is proceeding and one Mate sends a "Request to Lock Conference" message to the Network Master, the Network Master examines a Lock Conference flag to determine if it is set or not. If it is not set, this indicates that no one has locked the conference, thus allowing the Network Master to lock the conference onto the requesting Mate. However, if the flag is set, this indicates that another Mate has already locked the conference and this is not available. Rather, the Network Master merely places the requesting Mate as the primary conferee if the flag is set.

After the request has been sent and acknowledged by the Network Master, the program flows from the Lock Conference function block 1182 to a decision block 1184 to determine if the user has dialed *70. If not, the program flows along the "N" path back to the input of the Lock Conference function block 1182. If the user has dialed *70, the program flows along the "Y" path to a function block 1186 to send a "Request to Release Lock" message to the Network Master. The Network Master receives this and sends back an acknowledgement, as indicated by a decision block 1188, and the program flows to a function block 1190 to release lock. If the acknowledgement is not received, the program flows along the "N" path to a function block 1192 to break back to the main program.

Voice Detect Signal-Mate

Referring now to FIG. 24, there is illustrated a flowchart illustrating the procedure for sending the voice detect signal. The flowchart begins at a START block 1194, then proceeds to a decision block 1196 to determine if voice is present. If voice is not present, the program flows along the "N" path thereof to a function block 1198 to reset an internal timer and then returns to the input of the decision block 1196 to wait for voice. When the user speaks and voice is present, the program proceeds along the "Y" path to the input of a decision block 1200 to determine if the timer is running. If the timer is not running, this indicates that the timer has not been started and the program flows along the "N" path to a function block 1202 to start the timer and then to a decision block 1204 to determine if the time has elapsed. If the timer has been running at decision block 1200, the program flows along the "Y" path to the input of the decision block 1204.

The timer is a down counter which starts at a predetermined setting and counts down to zero. Once the timer has counted down to zero, the program flows from the "Y" path to a function block 1206 to send a voice detect signal. This voice detect signal is sent only when more than two Mates are in a conference to indicate to the Network Master that one of the conferees desires a higher priority. If none of the other conferees in the conference are talking such that no voice detect signal is sent from their Mates, the Network Master will rearrange priorities such that the Mate sending the voice detect signal is made the primary conferee and the prior primary conferee is made a secondary conferee with all of the remaining conferees being made M-ary. Until the timer has elapsed, the program will continue to flow back along the "N" path from the decision block 1204 to the input of the Voice Present decision block 1196 to ensure that voice is present for the entire duration of the timer. If not, the timer is reset and the procedure begun again.

Data Flow-Mix

Referring now to FIG. 25, there is illustrated a schematic block diagram of the combined hardware and software for directing data flow through a Mix. The schematic of FIG. 25 also illustrates the Slave and Master tasks that operate within the Mix. The Mix is illustrated as having eight input ports labeled SCM00 through SCM07 and a local area network port labeled LAN. Although the SCM ports indicate the use of an SCM data link between two units, the baseband interface 238 of FIG. 11 could be utilized in place of the SCM interconnect. In fact, all of the ports, with the exception of the LAN port, could be dedicated to baseband interfaces rather than SCM interconnects. It is only important that audio, video and data in the formats compatible with the Mix be compatible with the data link.

The inputs SCM00–SCM07 and LAN are input to an input interrupt I/O driver 1220. The interrupt driver generates an interrupt whenever a byte of data is received. An interrupt software routine is operable to recognize the interrupt and then load the data into a First-In-First-Out (FIFO) data stack 1222, of which one is associated with each port. The software also contains a background subroutine, termed the "Mix Idle", which constantly checks the FIFOs 1222 and inputs it to a buffer 1224. When the buffer gets enough bytes to fill it up, the Mix Idle subroutine retrieves the data from the FIFOs 1222 and reformats them and places them into a linear buffer 1226, wherein one of linear buffers 1226 is associated with each of the ports.

The linear buffers 1226 are serviced by a buffer manager routine 1228 which recognizes a full buffer by an internal flag that is set by the Mix Idle task. The buffer manager 1228 retrieves the information in the linear buffer 1226 and decides where the data is to go and then routes the data to that position. Therefore, the buffer manager 1228 is an internal data routing software routine. The data is recognized as either directed toward the Mix Slave task that is onboard the Mix, a Master task or for a peripheral device attached to one of its ports. As described above, each device has an ID. The Mix possesses an ID from "1" to "255", the network master or Master task possesses an ID of "00" and the Mates possess ID's from "256" to "9999". By examining the IDs, the buffer manager can determine where to route the data.

If the data is addressed to one of the ports, the buffer manager routes the data to linear buffers 1232, one linear buffer provided for each output port, of which there are nine.

After loading of linear buffers, they are reformatted by a buffer 1234. The buffer 1234 is similar to the buffer 1224 except that it formats from the linear buffers to a First-In-First-Out format for storage in FIFOs 1236, each port having a separate FIFO 1236 associated therewith. The buffers 1224 and 1234 are essentially the Mix idle task that recognize when data is ready to be placed into the FIFO 1236 or taken out of the FIFOs 1222. After loading of data into the FIFOs 1236 in the appropriate formats, they are input to an output interrupt I/O driver 1238. These are then connected to the ports SCM00–SCM07 and LAN output ports.

Since the data is multiplexed onto a carrier of either 70 mHz or 170 mHz, the data is directly transmitted with no coupling from the receiving device on the other end of the data link. Therefore, this requires some form of interrupt/buffering mechanism on the other end to receive the data regardless of when it is transmitted. The interrupt hardware and the interrupt software routines operate at a sufficient speed and have a sufficient capacity to allow this kind of transmission. Therefore, no communication is required between two devices on either end of the data link regarding the time of actual transmission of data itself since there is no chance of a "data collision" occurring on the data link. There is always a dedicated path for data in either direction from one device to another.

If the buffer manager 1228 recognizes the received data as being the ID of the Mix, that is, directed toward the Mix, the data is first placed into a buffer 1240 and then retrieved by the Mix Slave task 1230. Conversely, when the Mix Slave task generates a message for one of the devices on its ports, it first places the data into an outgoing buffer 1242 and then this data is input to the buffer manager 1228. The buffer manager 1228 then recognizes where this data is to be routed, which action is performed.

In addition to the output ports for the SCM's and the various peripheral devices attached thereto and the data link to the LAN, a Mix Master task 1244 is also resident on board the Mix. Data received by the buffer manager 1228 and directed toward the Mix Master task 1244 is first input to a buffer 1246 and then retrieved therefrom by Mix Master task 1244. Conversely, data being output by the Mix Master task 1244 is first input to a buffer 1248 and then input to the buffer manager 1228. Data transfer from the buffer manager 1228 to the Mix Master task 1244 utilizes a memory to memory transfer.

In operation, the Mix Master task 1244 is essentially a virtual tenth port for the Mix. The buffer manager 1228 maintains a table regarding the status of all of the ports attached thereto. Therefore, it knows the ID of all Mate or Mixes attached to the SCM ports and it also knows to which port the Network Master is connected. As described above, there is always a direct data link between any Mix and the Network Master.

If the Network Master is on the LAN port, a message with an ID of "00" is always directed to that port. However, if the on board Mix Master task 1244 is activated and is operating as a Network Master, this information is contained in the internal tables of the buffer manager 1228 and all messages received for the Network Master by the buffer manager 1228 are routed through the virtual tenth port to the internal Mix Master task 1244. Of course, if the Mix Master task 1244 is inactive, the Network Master occupies one of the other nine ports. This is also true with information received from the Mix Master task 1244, since the buffer manager 1228 must first receive the data and then decide where the data is to be routed. It can either be routed to the Mix Slave task 1230 or to one of the other peripheral devices on the ports. However, there is one slight variation to messages received from the Mix Master task that are directed towards Mates on another Mix that is connected to one of the SCM ports. Once the buffer manager 1228 receives the message from the Mix Master task 1244 when acting as Network Master, it scans its memory and determines that the destination Mate is not directly attached to any of its ports. When this situation occurs, a data field is provided in the message header which contains information regarding which port the buffer manager 1228 is to transmit the data. This data field is referred to as the Task ID. This portion of the header is only utilized by the resident Mix Master task 1244 when transferring data through the associated buffer manager 1228. Once the buffer manager 1228 recognizes that the destination Mate is not directly attached to any of its ports, it then examines the information contained in the task ID to determine to which port the data is to be transmitted.

The software of the Mix operates under the control of a Task Scheduling Program. This utilizes the occurrence of events to increment between various tasks or programs in the Mix instead of a time slice. Therefore, each program is completely executed before the next task occurs. Essentially, the task scheduler calls the subroutine for the Mix Idle task then calls the Mix Slave task and then calls the Mix Master task. Of course, if the Mix Master task is not activated, this is immediately bypassed. The task scheduler has an internal timing routine that prevents a given task from "locking" such that it can return to the task scheduling program and then reset everything.

Figure 26:
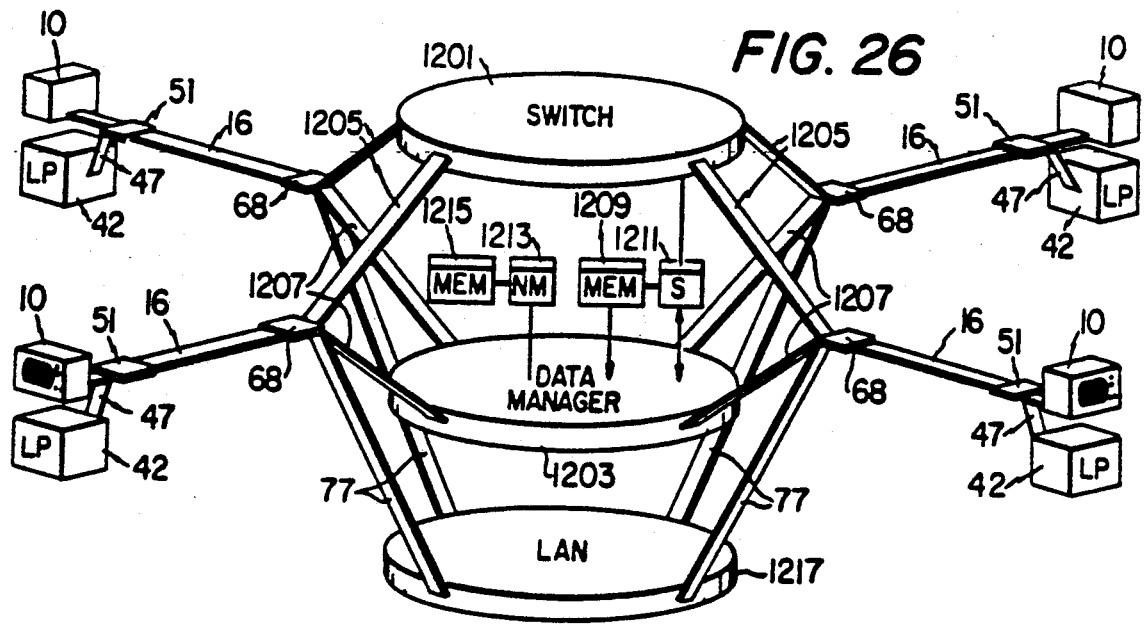
FIG. 26 illustrates a diagrammatic view of the video conferencing network showing a switch plane and a data plane.

Referring now to FIG. 26, there is illustrated a diagrammatic view of the video conferencing network which more clearly illustrates the data flow therethrough. Like numerals refer to like parts in the various figures. The video conferencing network which is comprised in the first level of a single Mix 66 and in higher levels with multiple Mixes, is basically comprised of an audio/video plane for carrying the audio/video information and comprised of a switch 1201 and also a data plane which is comprised of a data manager 1203. The audio/video and data information are all transmitted between the Mate 10 and the network through the SCM cable 16. At the Mate 10, the interface to the SCM cable 16 is the SCM 51 whereas the network or the Mix is interfaced with the SCM cable 16 through the SCM 68. At the SCM 68, audio and video information is passed to the audio/video switch 1201 in the audio/video plane through an audio/video path 1205. In a similar manner, the data is transferred to the data manager 1203 through data paths 1207. The data manager 1203 therefore interfaces with the Mates through its data ports on lines 1207. This data is then transformed into a format compatible with the transmission medium which, in the preferred embodiment, is the SCM cable and frequency division multiplexing.

The data manager 1203 has a memory 1209 interfaced therewith and also has a slave device 1211 interfaced with one port thereof and a Network Master (NM) 1213 interfaced with another port thereon. The slave 1211 is operable to control the audio/video switch 1201 to configure the interconnections therein The Network Master 1213 has a system memory 1215 associated therewith. The data manager 1203 is operable to receive data on any of the ports from either the lines 1207 interfaced with Mates 10 or from the port to which the Network Master 1213 is connected or the port to which the slave 1211 is connected. The data manager 1203 does not process the data but merely routes the data to the appropriate position after recognition thereof. For example, if a Mate 10 desires to converse with the Network Master 1213, it transmits a message to the data manager encoded with the Network Master's ID. The data manager receives the message and examines the memory 1209 to determine which port the Network Master is on. The data is then routed to this port which is the port that Network Master 1213 resides on. In a similar manner, the Network Master 1213 can transmit a message to the data manager 1203 indicating that it wishes to communicate with one of the Mates 10. This is also encoded in the message. The data manager 1203 then examines the memory 1209 to determine on which of its network ports the Mate 10 is connected and routes the data thereto.

The slave 1211 connected to the data manager 1203 is operable, as will be described hereinbelow, to update the memory 1209 by determining the status of all of the items on the network ports. Slave 1211 "polls" the various ports by sending messages to the devices attached to these ports. For example, if the slave 1211 wishes to converse with a port on which a Mate 10 resides, it sends a message to the data manager 1203 with information regarding the location of this port. The data manager 1203 then routes this message to the port and it is routed to the Mate 10 attached to that port. The Mate 10 then responds with a message to the data manager 1203 that is directed toward the slave 1211. The data manager then routes this message to the slave 1211.

The Network Master 1213 can also address the slave 1211 to determine the switching configuration of the audio/video switch 1201. This is a standardized message which is directed only to the slave 1211. Therefore, the slave 1211 not only polls the various ports to update the memory 1209 but also reconfigures the switch 1201.

The video conferencing network is made up of the data plane and the audio/video plane with the data plane providing network control and the audio/video plane providing an audio/video path for video communications In addition to accommodating video communications, the network of the present invention is also operable to exist in parallel with an existing system or network. As described above, the local processors 42 are interconnected with the SCM's 51 through the line 47. This allows baseband information to co-exist with video conferencing information on the SCM cable 16. However, at the SCM 68, the baseband information is separated and transmitted on the line 77 to a Local Area Network 1217. This Local Area Network 1217 is operable to transfer baseband information between the local processors 42 and other peripheral Local Area Network devices that may be attached to the Local Area Network 1217. The baseband data transfer between devices on the Local Area Network 1217 is, as described above, separate and distinct from any data or audio and video transmitted on the video conferencing network. By allowing a separate and distinct Local Area Network 1217 or any other type of network to share the SCM cables 16 with the video conferencing network, it is only necessary to provide one cable from a central location to a remote location to provide two networking functions. For example, in some office facilities, an existing local area network is utilized for carrying on the basic functions in the office environment By utilizing the configuration of the present invention, it is possible to install a video conferencing network without requiring installation of new communication links between a central area and the remote points.

Figure 27:
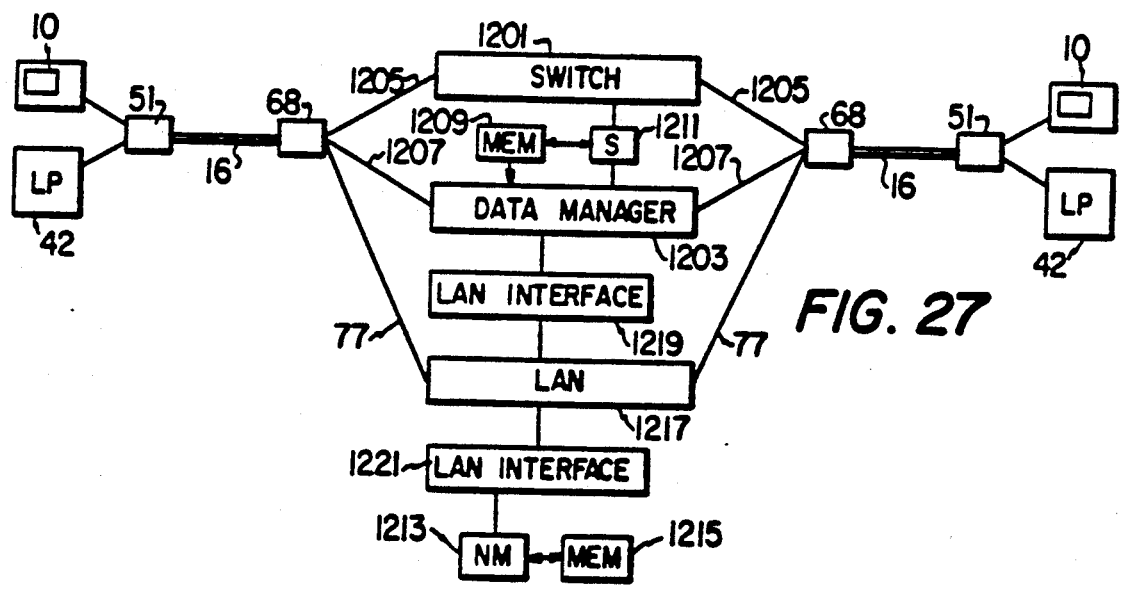
FIG. 27 illustrates a side view of the diagram of FIG. 26 with an alternate configuration for the Network Master.

Referring now to FIG. 27, there is illustrated a side view of the Network of FIG. 26 illustrating only two Mates and also the use of the Local Area Network 1217 as the control medium for the Network Master Like numerals refer to like parts in the two Figures. In the system of FIG. 27, the Data manager 1203 port is interfaced to the LAN 1217 through a LAN interface 1219 and the LAN 1217 is interfaced with the Network Master 1213 through a LAN interface 1221. The LAN interfaces 1221 and 1220 allow the Network Master 1213 to operate in an identical manner to that of the system of FIG. 26. For example, if the Network Master 1213 desires to send a message to one of the ports on the data manager 1203, it places baseband data onto the LAN 1217 and this data is processed like any baseband data on a network. The video conferencing network is essentially a peripheral device that is attached to the LAN 1217 and it receives data in the same manner that the local processors 42 receive data This data is recognized by the LAN interface 1219 as being directed toward a video conferencing network and the data is then input to the data manager 1203 for routing. A message from the data manager 1203 to the Network Master 1213 is similarly converted to baseband and then back to a format compatible with the Network Master 1213.

Figure 28:
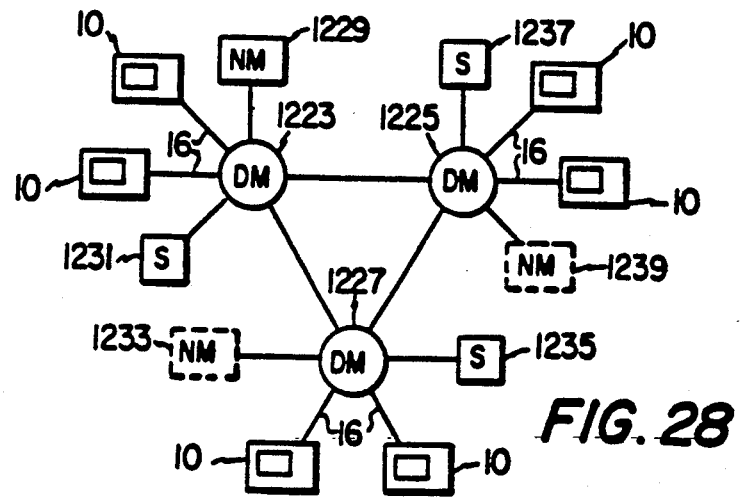
FIG. 28 illustrates a diagrammatic view of the data plane for a three mix network.

Referring now to FIG. 28, there is illustrated a diagrammatic view of the data manager 1203 which is divided up into three subdata managers 1223, 1225 and 1227. Each of the subdata managers 1223-1227 has a data link provided therebetween. This configuration constitutes the data plane for the three mix configuration of FIG. 7. Each of the subdata managers 1223-1227 has two Mates 10 attached thereto through SCM cables 16. The SCM's 51 and 68 are not shown for simplicity purposes.

Subdata manager 1223 has associated therewith a Network Master 1229 and a slave 1231. The subdata manager 1227 has a Network Master 1233 and a slave 1235 associated therewith. The subdata manager 1225 has a slave 1237 and a Network Master 1239 associated therewith. The slaves 1231, 1235 and 1237 operate similar to the slave 1211 except that they distribute their functions. However, the Network Masters 1229, 1233 and 1239 do not act in a distributed manner. Rather, as described above, only one of the Network Masters is active at a given time. The active Network Master is illustrated as the Network Master 1229 with the remaining Network Masters 1233 and 1239 shown with dotted lines to indicate inactive status.

When a message is sent from one of the Mates 10 on the subdata manager 1227, the subdata manager 1227 looks into its internal memory to determine where the message should be sent. It recognizes that its Network Master 1233 is not active and that it must route the message to the subdata manager 1223. When the subdata manager 1223 receives this message, it recognizes that it is to be routed to the Network Master 1229 on the associated port. In routing data from a peripheral device to the Network Master, it is only necessary to designate one of its ports as the Network Master port. Since the ID of "00" indicates the Network Master, the subdata managers 1227 only need to transmit it to the port designated as the Network Master. Since the message will always be recognized by any of the subdata managers, it can always be routed to the correct port which is designated as the Network Master port.

In transmitting a message from the Network Master to a designated Network port, it is necessary to determine the data path for this transmission. For example, if the Network Master 1229 which is active desires to transmit a message to one of the Mates 10 on the subdata manager 1227, it is first necessary to transmits the message to subdata manager 1223 and encode in that message the port to which the data is to be routed. The shortest path would be the direct path between the subdata manager 1223 and the subdata manager 1227. However, the message could go through the subdata manager 1225. It is only necessary that when a subdata manager receives a message that is to be directed to another subdata manager, the message be encoded with the information regarding the port to which it is to be sent. Depending upon the size of the network and the number of subdata managers, the amount of memory and processing capability of the Network manager can become unwieldy.

Servicing Call Request-Network Master

Figure 29:
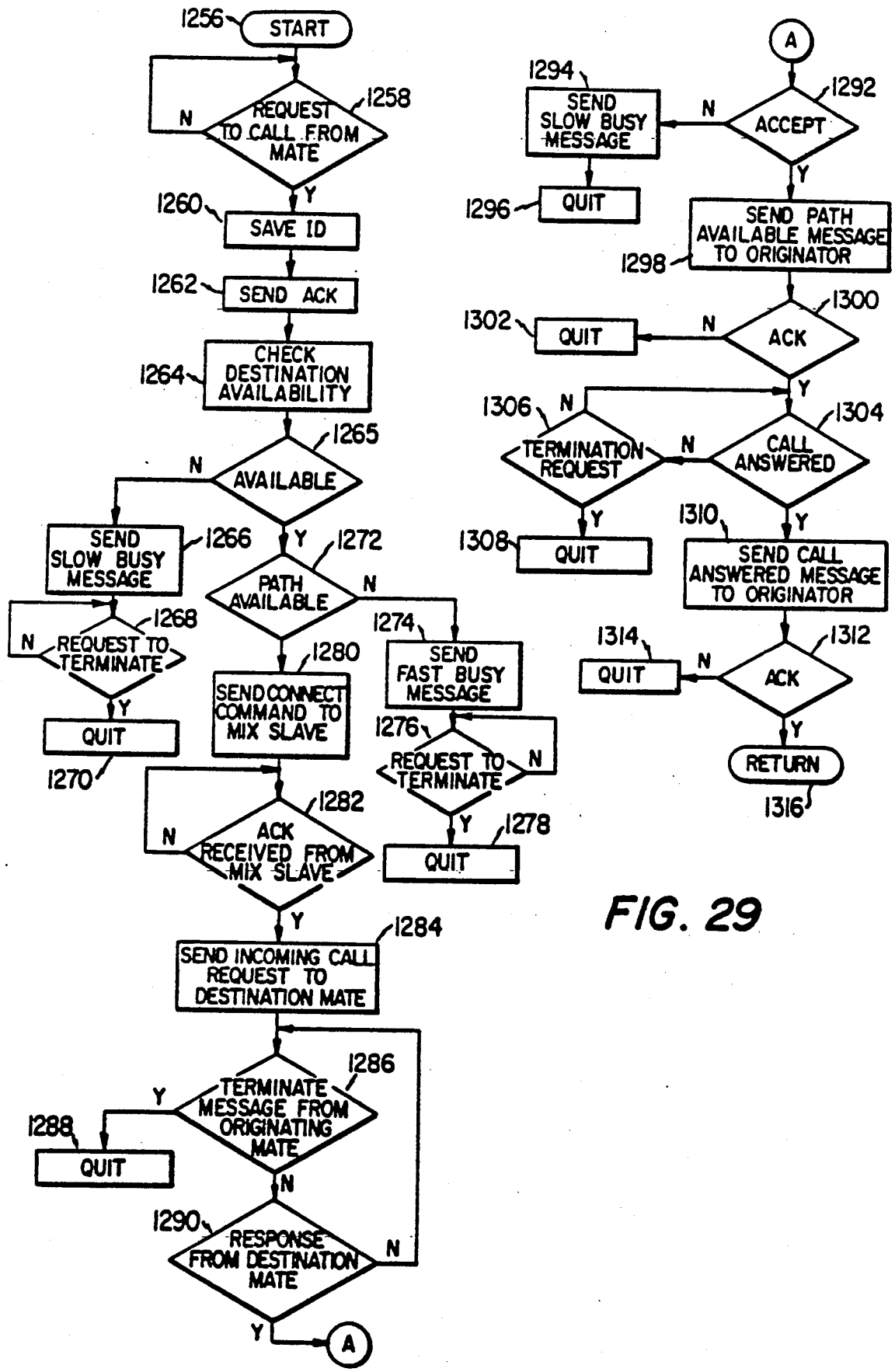
FIG. 29 illustrates a flowchart for the master task in the network for placing a call.

Referring now to FIG. 29, there is illustrated a flowchart for servicing of a call from the Mate by the Network Master. The Network Master can either be resident on the associated Mix, a separate central processor on a LAN or the Master task running in a separate Mix. The program is initiated at a START block 1256 and proceeds to a decision block 1258 to determine if a "Request to Call" message has been received from a Mate. Until this message is received, the program flows back along the "N" path to the input thereof. When the message has been received, the program flows along the "Y" path to a function block 1260 to save the ID of the Mate. As described above, the Mate ID is the originating ID with the ID of the Network Master "00" being the destination ID coded into the Mates message.

Once the ID of the requesting Mate has been stored, an acknowledgement is sent back, as indicated by a function block 1262. The program then flows to a function block 1264 to check destination availability. This destination availability is stored in internal tables in the Network Master. Therefore, the Network Master does not have to go out and poll the various Mates and associated Mixes to determine if either the Mate is already associated with a conference or if there is a path available to the Mate. The program then flows to a decision block 1265 to determine if the Mate is available for a conference. If not, this indicates that the Mate is already involved in a conference and the program flows along the "N" path thereof to a function block 1266 to send a "Slow Busy" message back to the requesting Mate. The program then flows to a decision block 1268 to determine if a "Request to Terminate" message has been received from the requesting Mate. When this message is received, a response is sent back to the requesting Mate and the program flows along the "Y" path to a function block 1270 labeled "Quit" to return to the main program. However, until the Request to Terminate message is received, the program flows back to the input of the decision block 1268 to await receipt thereof.

If a destination Mate is available, the program flows along the "Y" path from the decision block 1265 to a decision block 1272 to determine if there is an available data path between the originating Mate and the destination Mate. If not, the program flows along the "N" path to the input of a function block 1274 to send a "Fast Busy" message back to the originating Mate and then the program flows to a decision block 1276 to determine if a "Request to Terminate" message has been sent by the originating Mate. Until this message is received, the program flows back along the "N" path to the input thereof. When the message has been received, the program flows along the "Y" path to a Quit function block 1278.

If a path is available, the program flows along the "Y" path from decision block 1272 to a function block 1280 and a connect command is sent from the Network Master to the Mix Slave with the information regarding the switching interconnection for each Mix in the network involved in the data link. Depending upon the complexity of the data link, a number of Mixes may be involved since a direct path may not be available. The program then flows to a decision block 1282 to await an acknowledgement from the Mix Slave. The program loops around along the "N" path back to the input thereof until this acknowledgement has been received. When the acknowledgement has been received, the tables in the Network Master are updated and then the program flows along the "Y" path to a function block 1284 to send an "Incoming Call Request" message to the destination Mate. As described above, the audio and video paths are established prior to sending an "Incoming Call Request" message to the destination Mate. Therefore, when the "Incoming Call Request" message is sent to the destination Mate, an audio and video path is already established, thus providing the destination Mate with the ability to selectively receive any audio and data information transmitted therealong. However, the originating Mate may or may not be transmitting audio and video.

After sending the "Incoming Call Request" message, the program flows to a decision block 1286 to determine if a "Terminate" message has been received from the originating Mate indicating that he has hung up. If so, the program flows along the "Y" path to a quit block 1288 and, if not, the program flows to the input of a decision block 1290. The decision block 1290 determines whether a response from the destination Mate has been received. If not, the program flows back to the input of the decision block 1286 along the "N" path thereof to await for the "Terminate" message and if a response has been received, it flows along the "Y" path to the input of a decision block 1292.

The decision block 1292 determines whether the destination mate has accepted the call by sending a "Call Answered" message. If the call is not accepted, the program flows along the "N" path to a function block 1294 and a "Slow Busy" message is sent back to the originating Mate and then the program flows to a function block 1296. This path indicates that for some reason there was no acknowledgement or response received from the Mate although the tables of the Network Master indicated that it should be free.

If a call is accepted, the program flows along the "Y" path from the decision block 1292 to a function block 1298 and a "Path Available" message is sent to the originating Mate. The program then flows to an acknowledgement decision block 1300 and an associated quit block 1302 and then to a decision block 1304 to determine if the call is answered As soon as a response is received from the destination Mate that it has received the "Incoming Call" message, it begins the Ring-Back to the originating Mate along the audio path and also begins chiming at the destination Mate itself This will continue until either the originating Mate sends a "Termination Request" message, as indicated by the decision block 1306 and a quit block 1308 or the destination mate answers the call.

When the destination Mate has answered the call, the program flows along the "Y" path from the decision block 1304 to a function block 1310 to send the "Call Answered" message back to the originating Mate. The program then flows through an acknowledgement decision block 1312 and associated quit block 1314 to a return block 1316.

During communication between a Mate and the Network Master, the Mate's messages are first sent to the buffer manager on the associated Mix and then routed to the port on which the Network Master resides or to the internal Mix Master task which constitutes the Network Master. Therefore, with the use of the buffers between all of the ports, the buffer manager can control the flow of information between the various ports such as from the Network Master to the Mate or from the Mix Slave to the Mates or even from the Mix Slave to the Network Master It is necessary to have this type of control to prevent any attempt to transmit two messages on the same port. For example, the buffer manager would prevent the Network Master from sending a message directly to a desired one of the Mates at the same time that the Mix Slave wishes to communicate with the same Mate.

Add Party to Conference-Network Master

Referring now to FIG. 30, there is illustrated a flowchart for the procedure of adding a party to a conference by the Network Master. The program is initiated at a START block 1320 and proceeds to a decision block 1322 to determine if a "Request to Call" message has been received from one of the Mates in the conference. The Network Master maintains a table of all ongoing conferences and conferees associated therewith. The decision block 1322 represents only the procedure for servicing the Mates within the conference. Therefore, if a "Request to Call" message has not been received, the program flows along the "N" path to a decision block 1324 to determine if a "Request to Terminate" message has been received from any of the Mates in the conference. If not, the program proceeds along a "N" path back to the input of the decision block 1322. However, if a "Request to Terminate" has been received by one of the Mates in the conference, the program flows along the "Y" path to a function block 1326 to update the internal tables of the Network Master to the current status of the conference and then returns to the input of the decision block 1322.

When a "Request to Call" message is received from one of the Mates in the conference, the program proceeds along the "Y" path from the decision block 1322 to a function block 1328. In the function block 1328, the Network Master determines if a path and the destination Mate are available, as described above with reference to blocks 1264–1278 of FIG. 29. If a path is available, the program flows to a function block 1330 to send a switch command to the Mix Slave to set up a communication path. The program then flows to a function block 1332 and a "Hold Message" is sent to all of the Mates in the conference to place them on hold. As described above, each of the Mates in the conference replies with a response and then loops back its video from the camera to the monitor and the viewfinder. This video is not transmitted through the SCM but, rather, through the video multiplexers in the Mate.

After all of the other Mates in the conference have been placed on hold, the call is placed in accordance with the procedure of FIG. 29, as indicated by a function block 1334. The program then proceeds to a decision block 1336 to determine if the call has been placed. If the call has been placed, the program proceeds along the "Y" path to a function block 1338 to update the conference table and add the party thereto. If the call is not placed due to a busy signal or an unavailable line, the program proceeds along the "N" path to bypass the function block 1338.

After the call has either failed to place or the party has been added to the conference, the program proceeds to a decision block 1340 to wait for a "Request to Unhold the Conference" message from the originating Mate. Until this request has been placed, the originating Mate and the new party are maintained in a two-way conference, as indicated by a loop back along the "N" path thereof. When the originating Mate sends the "Request to Unhold" message, the program then flows along the "Y" path to a function block 1342 to redefine the priority of conferees in the conference. As described above, there is a primary conferee and a secondary conferee with the remaining conferees being designated as M-ary. The primary conferee has his video output connected to the remaining conferees with the video of a secondary connected to his monitor. All M-arys receive the video from the primary.

In setting the priority, the prior primary is reduced to a secondary, as indicated by the function block 1342 and the prior secondary and all the remaining M-arys to M-arys, as indicated by function block 1344. The originator is then set to a primary, as indicated by a function block 1346. After the priority of the conferee is determined, the program flows to a function block 1348 to send a "Request to Unhold" message to the conferees and then the program flows to the return block 1350.

Conference Priority - Network Master

Referring now to FIG. 31, there is illustrated a flowchart for altering the priorities of conferees during a conference. This is essentially accomplished with the VOX detect circuit which provides a signal indicating that one user is talking for a duration of time that exceeds approximately 750 milliseconds. If no other individual is talking for this extent of time, the Mate from which the Voice Detect signal is originated will become the primary in the conference.

The program is initiated at a START block 1352 and then proceeds to a decision block 1354 to determine if a VOX Detect signal has been received If not, the program flow loops back around to the input along an "N" path. When the VOX Detect signal is received, the program flows along the "Y" path to a decision block 1356 to determine if there are more than two Mates in the conference. Although not shown, the program requires that more than one half second elapse between the last received VOX before flowing to block 1356. If not, there is no need to determine priority and the program flows back around along the "N" path. However, when more than two Mates are in the conference, the program flows along the "Y" path to a decision block 1358 to determine if the VOX Detect signal is from the primary. If so, the program flows along the "Y" path and loops back around to the beginning of the program. However, if the VOX detect signal is received from other than the primary, the program flows along the "N" path to a function block 1360 to determine if the signal is from the secondary. If the signal is from the secondary, the program flows along the "Y" path to a decision block 1361 to determine if the conference is locked. If so, the program flows to a return block 1363 and, if not, the program flows to a function block 1362 to change the secondary to the primary and then to a function block 1364 to change the primary to secondary. However, if the Voice Detect signal is from an M-ary, the originating M-ary conferee is changed to the secondary, as indicated by a function block 1366 and then the secondary is changed to M-ary, as indicated by a function block 1368. The primary remains in the primary position. After rearranging the tables of the network master, the program proceeds to a Return block 1370.

Although not described with reference to FIG. 31, anyone can lock the conference such that all of the remaining conferees receive video from him. This only requires the input of one of the special function codes described above.

Status Check-Mix

Referring now to FIG. 32, there is illustrated a flowchart for the communication between the Mix Slave and its ports which allows the Mix Slave to maintain an updated status. The program is initiated at a START block 1372 and proceeds to a function bock 1374 wherein "Keep Alive" signals are sent to selected ports. These are "Request For Status" messages from the Mix Slave to the Mate, to another Mix or to the Network Master. This is followed by the Acknowledgement signals from the Mate back to the Mix Slave and then followed by a message as to the Mate status. The program then flows to a decision block 1376 to determine if there has been a status change. Since the Mix Slave maintains a table as to the status of all devices attached to its ports, this new data is always compared with the old data. If there has not been a status change, the program proceeds along the "N" path to a function block 1378 to increment the selected port and check the status of another port and then returns to the input of the function block 1374 to send "Keep Alive" signals to that port. However, if the status has changed, the program proceeds from the decision block 1376 along the "Y" path to a function block 1380 wherein a "Reconfiguration Request" message is sent to the Network Master. This "Reconfiguration Request" message is utilized by the Mix Slave to apprise the Network Master of current status on the ports. This is placed into the tables of the Network Master to maintain a centralized information bank as to network status. The program then flows to the function block 1378 to increment the port and determine the status of the next sequential port.

Mix Slave-Received Messages

Referring now to FIG. 33, there is illustrated a flowchart for the operation of the Mix Slave and the various messages or requests it receives. The program is initiated at a START block 1382 and then proceeds to a decision block 1384 to determine if it has received a "Request Configuration" message from the Network Master. If so, the program flows around the "Y" path to a function block 1386 to send the configuration data to the Network Master and then returns. If not, the program flows along the "N" path to determine if it is to reconfigure its audio and data paths as illustrated by a decision block 1388. This is determined by a request from the Network Master to add or delete parties from a conference or to terminate a conference. If this command has been received from the Network Master, the program flows from the decision block 1388 to a function block 1390 along the "Y" path to receive the message from the Network Master and effect the connection in accordance therewith. The program then returns back to the main flow. If the message is not to reconfigure the switches, the program flows along the "N" path to a decision block 1392 to determine if a "Request for Reset" is required. This message is sent when the Network Master has encountered a problem in synchronizing with the slave. If the reset message is received, the program then flows to a function block 1394 to resynchronize with the Network Master. Resynchronization with the Network Master requires clearing of all buffers between the Mix Slave and the Network Master and initiating the transmission again. However, none of the status tables or network information is altered since only the buffers related with the communication between the Network Master and that particular Mix Slave is involved. In a similar manner, a "Reset Request" can occur between a Network Master and a Mate indicating some communication problem therebetween. The buffers concerned with the communication between these two devices on that particular port are then cleared and transmission begun again.

After it is determined if there is a "Reset" message received, the program then flows to a decision block 1396 to determine if there is a "Request Error Status" message received, in which case the "Error Status" is sent, as indicated by a function block 1398. If no "Error Status" is requested, the program flows to a decision block 1400 to determine if any "Keep Alive" messages have been received. These are messages from other devices such as Mixes and the Network Master to determine the status of its ports. If n "Keep Alive" messages have been received, the program flows to a Return block 1402. However, if a "Keep Alive" message has been received, the Mix Slave must determine where the "Keep Alive" message is from. In a decision block 1404, it is determined whether it is received from a Mix. However, if the "Keep Alive" message is from a Mix, the program flows along the "Y" path to a decision block 1406 to determine if the ID of the Mix is lower than the ID of the Mix Slave. If the ID of the Mix sending the "Keep Alive" signal is lower than the present Mix Slave ID, the program flows to the return block 1402. However, if the "Keep Alive" signal is from a Mix that has an ID that is higher than itself, it proceeds to a function block 1408 to update the Network Master port. In updating the Network Master port, the Mix Slave must first determine if another port already has a Network Master thereon. If so, the program then flows to the Return block 1402. If there is no Network Master on any of the ports, the Mix Slave looks to see if its internal Mix Master task is activated. If so, it recognizes itself as the Network Master. However, if its internal Mix Master task is not activated and its ID is lower than that of the Mix from which the "Keep Alive" signal is received, it proceeds to activate its internal Mix Master task, thus becoming the Network Master.

For example, if there are three Mixes in a network with the ID's "01", "02" and "03", there will be three Mix Master tasks available for controlling the system. However, only one Mix Master task can operate as Network Master, with the other two being deactivated. To determine priority, the system of the present invention predefines the Network Master as being the Mix with the lowest ID. Upon powering up of the system, each of the Mix Slaves activates its internal Mix Master task. The Mix Slaves then send "Keep Alive" signals to each of the other Mixes in the system and receive responses therefrom. In this manner, they can determine first that a Mix is attached to a given port and second the ID of that Mix. If the ID is lower than its ID, it deactivates its internal Mix Master task. However, if the ID is higher, it allows the Mix Master task to remain activated and becomes the Network Master In addition, it also receives "Keep Alive" signals from the other Mixes and responds thereto such that they can also determine whether to inactivate their internal Mix Master tasks.

In a system where the Network Master is disconnected from the system, each of the Mixes determines this event through the use of "Keep Alive" signals to its various ports Regardless of the device that is removed from this port, the Mix Slave is aware of this event When it determines that both the device has been removed from its port for reasons such as power down, etc. and that it was a Network Master, the Mix Slave automatically powers up its internal Mix Master task. The remaining Mixes in the system do the same and then they proceed to determine which Mix Master task takes over the system as Network Master. However, when a Network Master is removed from this system, all of the switches, buffers and memory are cleared to an initial power up state such that all information is lost. Therefore, any communications that are ongoing during the loss of a Network Master are removed and all the communication paths must be reaccessed.

In summary, there has been provided a video conferencing system which provides a plurality of remote video conferencing terminals which are connected to a switching network for interconnecting both audio and video paths between two or more terminals for either a two-way conference or a multiway conference. Each of the remote terminals is in communication with a network controller which determines all data flow and network priority with respect to placing of call, etc.

The remote terminals are arranged in small groups, each connected directly to a switching network which is controlled by a Slave controller. The Slave controller controls the associated switch and maintains an updated status of all of the remote terminals associated therewith. Each of the Slave controllers is directly connected to the network controller through a dedicated data path to receive data from the network controller and route it to the appropriate terminal. Alternately, the Slave controller can receive the instruction itself for execution such as updating the status of its ports or routing data through its switches. Each of the switching networks associated with the Slave controllers possesses a direct data path to each of the other switching networks in the overall Network.

The network controller is a subroutine task that is provided for in each of the switching networks associated with the groups of remote terminals. However, only one of the internal network controllers subroutines can operate and this is determined by a predefined priority. Therefore, if one of the switching devices is deactivated, a network controller can be established with the remaining units in a Master/Slave relationship.

Although the preferred embodiment has been described in detail, it should be understood that various changes, substitutions and alterations can be made therein without departing from the spirit and scope of the invention as defined the appended claims.

What is claimed is:

1. A communication network for integrating video and data, said network comprising:
   a plurality of network ports;
   a plurality of video terminals each associated with one of said network ports for transmitting and receiving real time video signals and network control data messages, one of said video terminals being configured to originate a call, and one of said video terminals being configured as a destination of said call, a user associated with said call destination terminal;
   means, coupled between said call origination terminal and said call destination terminal, for transmitting a video image encoded as a video signal and for transmitting an incoming call data message to said call destination terminal;
   means, coupled to said call destination terminal, for displaying said video image at said call destination terminal to provide video information to a user of said call destination terminal prior to establishing said call; and
   means, coupled to said call destination terminal, for sending a call answered data message from said call destination terminal to said call origination terminal after the displaying of said video image at said call destination terminal and at the discretion of said call destination terminal user to establish said call.

2. A network as claimed in claim 1 wherein said call destination terminal additionally comprises means for producing and audible signal from said call destination terminal in response to receipt of said incoming call data message and prior to the displaying of said video image at said call destination terminal.

3. A network as claimed in claim 1 wherein said call origination terminal comprises means for selectively disabling the transmission of said video signal, said selectively disabling means being engaged at the discretion of said user of said call origination terminal.

4. A method of establishing a call between a call origination apparatus and a call destination apparatus in a video communication network, said method comprising the steps of:
   transmitting a request message from said call origination apparatus to an information exchange;
   sending an incoming call data message from said message exchange to said call destination apparatus, a user associated with said call destination apparatus;
   establishing a video and audio path between said call origination apparatus and said call destination apparatus;
   transmitting a video image encoded as a video signal to said call destination apparatus concurrently with said step of sending an incoming call data message;
   displaying, in response to said transmitting step, said video image at said call destination apparatus to provide video information to a call destination apparatus user about the identity of a user of said call origination apparatus; and
   sending a call answered message from said call destination apparatus to said call origination apparatus after said displaying step and at the discretion of a call destination apparatus user to establish said call.

5. A method as claimed in claim 4 additionally comprising the step of emitting an audible signal from said call destination apparatus in response to said transmitting step and prior to said displaying step.

6. A method as claimed in claim 5 wherein said audible signal represents a ring pulse, and said emitting step emits only a single ring pulse prior to said displaying step.

7. A method as claimed in claim 4 wherein said call origination apparatus selectively disables said transmission of said video signal during said transmitting step at the discretion of said user of said call origination apparatus;.

8. A method as claimed in claim 4 wherein said call destination apparatus has two display screens, and one of said two display screens is smaller than the other, said method additionally comprising the step of routing said video signal only to said smaller one of said two display screens during said displaying step for display of said video image thereon.

* * * * *

UNITED STATES PATENT AND TRADEMARK OFFICE
CERTIFICATE OF CORRECTION

| | | |
|---|---|---|
| PATENT NO. | : 5,014,267 | Page 1 of 1 |
| APPLICATION NO. | : 07/335211 | |
| DATED | : May 7, 1991 | |
| INVENTOR(S) | : E. Neal Tompkins et al. | |

It is certified that error appears in the above-identified patent and that said Letters Patent is hereby corrected as shown below:

<u>Title page</u>
   Item [75] Inventors should read: --E. Neal Tompkins, Atlanta, GA (US); Thomas C. Arends, Eugene, OR (US); Michael W. Barry, Duluth, GA (US); David A. Monroe, San Antonio, TX (US); John R. Frassanito, Houston, TX (US)--.

Signed and Sealed this

Twenty-second Day of August, 2006

JON W. DUDAS
*Director of the United States Patent and Trademark Office*